United States Patent [19]
Santeler et al.

[11] Patent Number: 5,586,286
[45] Date of Patent: Dec. 17, 1996

[54] MEMORY CONTROLLER HAVING FLIP-FLOPS FOR SYNCHRONOUSLY GENERATING DRAM ADDRESS AND CONTROL SIGNALS FROM A SINGLE CHIP

[75] Inventors: Paul A. Santeler, Cypress; Gary W. Thome, Tomball, both of Tex.

[73] Assignee: Compaq Computer Corporation, Houston, Tex.

[21] Appl. No.: 404,935

[22] Filed: Mar. 13, 1995

Related U.S. Application Data

[63] Continuation of Ser. No. 34,287, Mar. 22, 1993, abandoned.

[51] Int. Cl.⁶ .............................. G06F 12/02; G11C 7/00; G11C 8/00
[52] U.S. Cl. .......................... 395/432; 395/494; 395/881; 365/193; 365/233
[58] Field of Search ...................................... 395/432, 404, 395/405, 855, 878, 881, 494, 550; 365/233, 193

[56] References Cited

U.S. PATENT DOCUMENTS

| 4,014,006 | 3/1977 | Sorensen et al. | 395/550 |
| 4,615,017 | 9/1986 | Finlay et al. | 395/550 |
| 4,694,197 | 9/1987 | Sprague | 327/153 |
| 5,179,667 | 1/1993 | Iyer | 395/494 |
| 5,218,686 | 6/1993 | Thayer | 395/550 |
| 5,289,584 | 2/1994 | Thome et al. | 395/325 |
| 5,303,364 | 4/1994 | Mayer et al. | 395/467 |
| 5,327,390 | 7/1994 | Takasugi | 365/230.06 |
| 5,333,293 | 7/1994 | Bonella | 395/494 |
| 5,353,423 | 10/1994 | Hamid et al. | 395/470 |

FOREIGN PATENT DOCUMENTS

| 0348113 | 12/1989 | European Pat. Off. . |
| 0380855 | 8/1990 | European Pat. Off. . |
| 0513519 | 11/1992 | European Pat. Off. . |
| 0525749 | 2/1993 | European Pat. Off. . |

OTHER PUBLICATIONS

C. H. Chan, et al., A CMOS Multi–Mode Data Acquisition System Implemented Using a Workstation Based VLSI Design Environment, IEEE, Electronicom '85, 10/6–11/85, pp. 28–31.
IBM Technical Disclosure Bull., Direct, Asynchronous and Synchronous Storage Card, vol. 29, No. 4, Sep. 1986, pp. 1452–1456.

Primary Examiner—Jack B. Harvey
Assistant Examiner—Ario Etienne
Attorney, Agent, or Firm—Pravel, Hewitt, Kimball & Krieger

[57] ABSTRACT

A memory controller which makes maximum use of any processor pipelining and runs a large number of cycles concurrently. The memory controller takes advantages of different speed memory devices by operating each memory device at optimal speed. The functions are performed by a plurality of simple, interdependent state machines, each responsible for one small portion of the overall operation. As each state machine has completed its function, it notifies a related state machine that it can now proceed and thereafter waits for its next start or proceed indication. The next state machine operates in a similar fashion. The state machines responsible for the earlier portions of a cycle have started their tasks on the next cycle before the state machines responsible for the later portions of the cycle have completed their tasks. The memory controller is logically organized as three main blocks, a front end block, a memory block and a host block, each being responsible for interactions with its related bus and components and interacting with the various other blocks for handshaking. The memory system includes a single chip comprising a plurality of flip-flops which provides all of the address and control signals to a memory device so that a clock cycle can be saved because of reduced skew of the signals. These flip-flops are synchronously clocked by a common clock and provide the final output of the address and control signals for the DRAM devices.

7 Claims, 55 Drawing Sheets

PPEND STATE MACHINE

DPOE_OK =
DSPADS & PWR* &
(CHIT_OK & PMIO)*

DPOE STATE MACHINE

MPROG STATE MACHINE

MPEND STATE MACHINE

MPMLE STATE MACHINE

PMDRDY STATE MACHINE

FIG. 21  MWEPBRDY STATE MACHINE

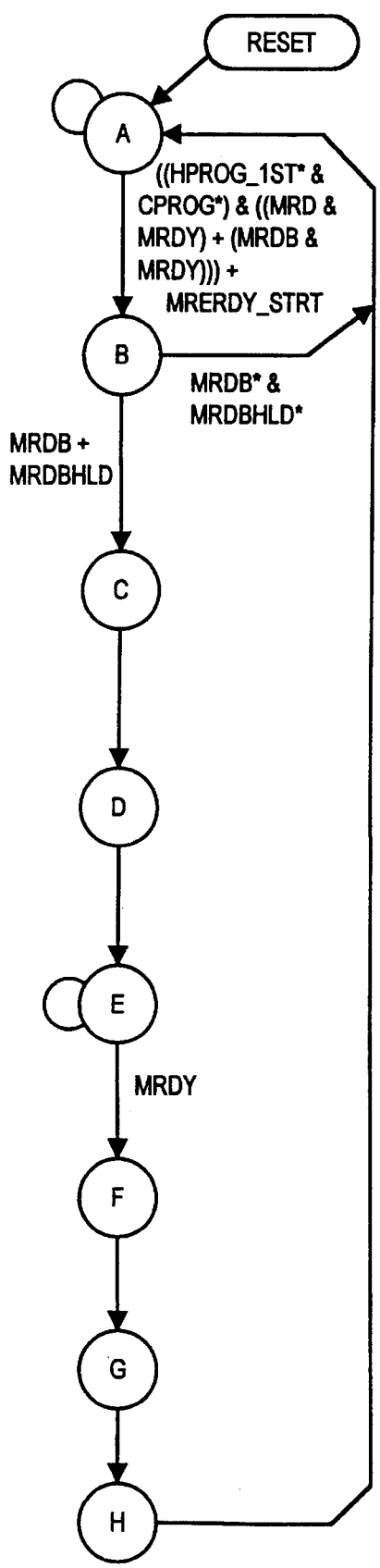
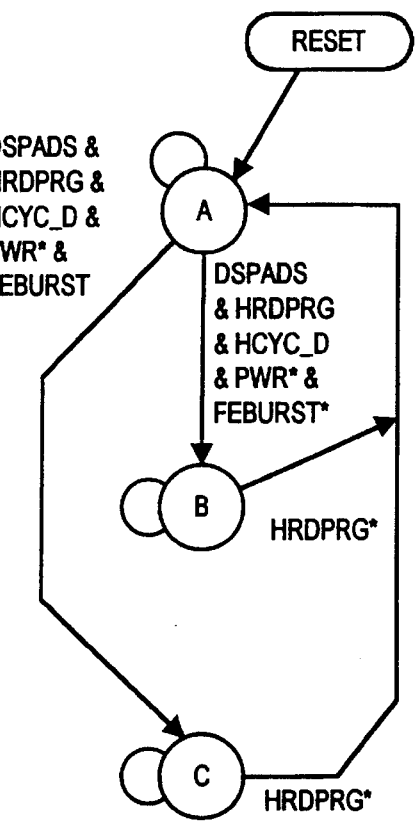
MREPBRDY STATE MACHINE
FIG. 22
HRDPND STATE MACHINE
FIG. 25

HRD STATE MACHINE

HWL1PND STATE MACHINE

HWL2PND STATE MACHINE

HREPBRDY STATE MACHINE

DPSEL STATE MACHINE

WPEPBRDY STATE MACHINE

PNA STATE MACHINE

RDPNA STATE MACHINE

WRPNA STATE MACHINE

MEM STATE MACHINE

BURST STATE MACHINE

REFRESH STATE MACHINE

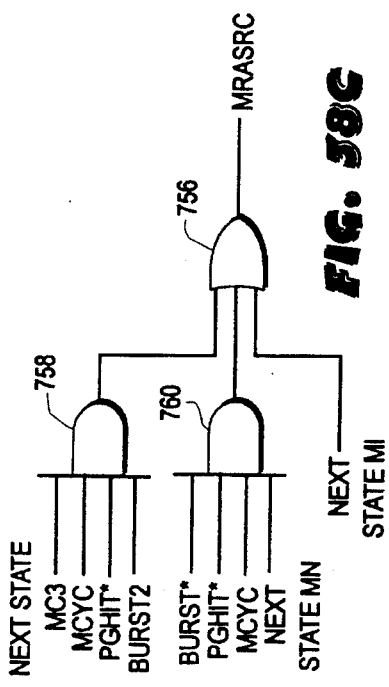
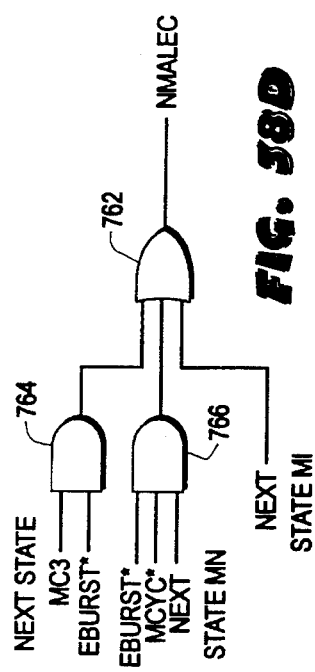
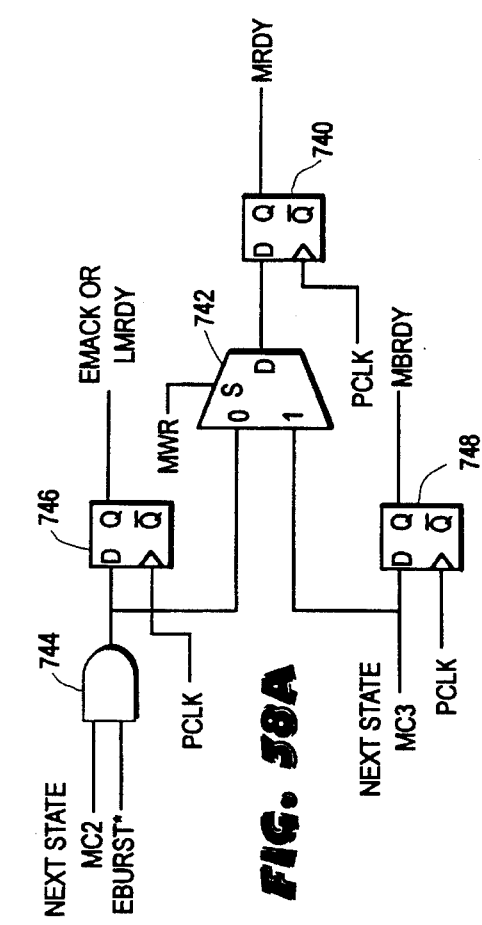
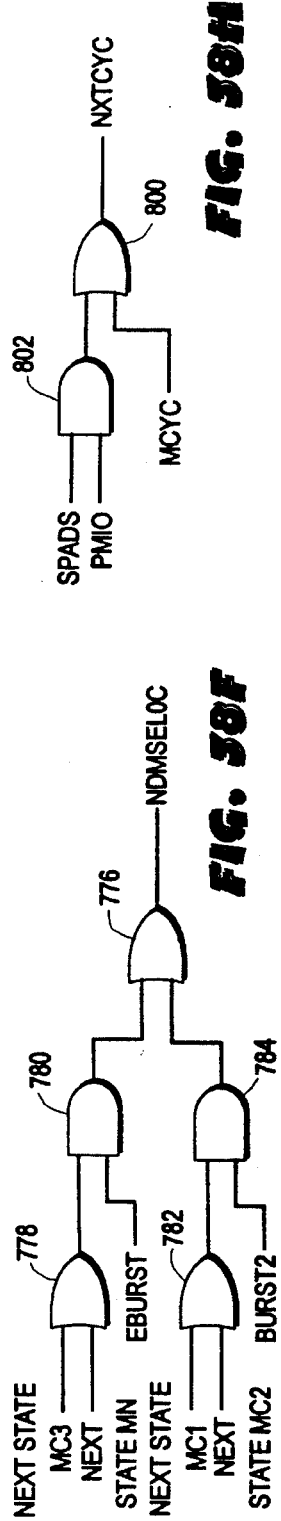

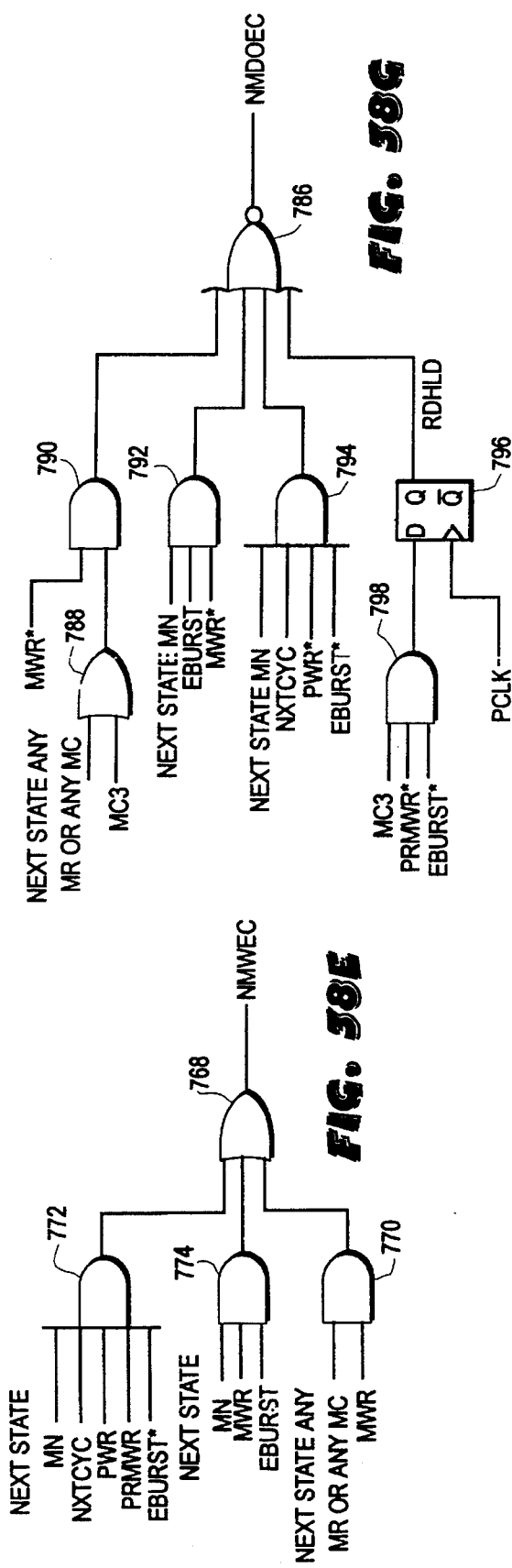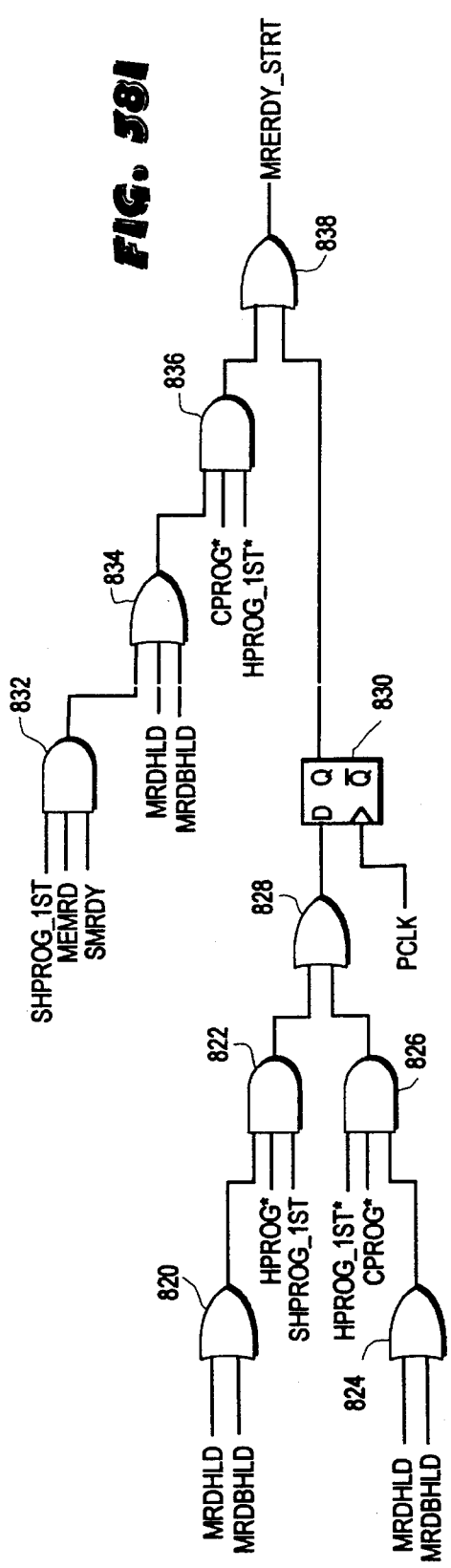
FIG. 58G
FIG. 58I
FIG. 58E

ISA STATE MACHINE

EISA STATE MACHINE

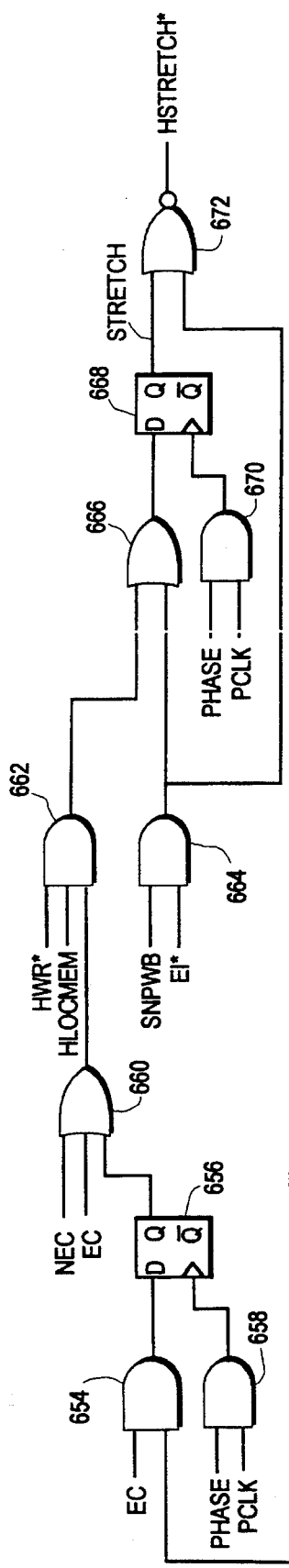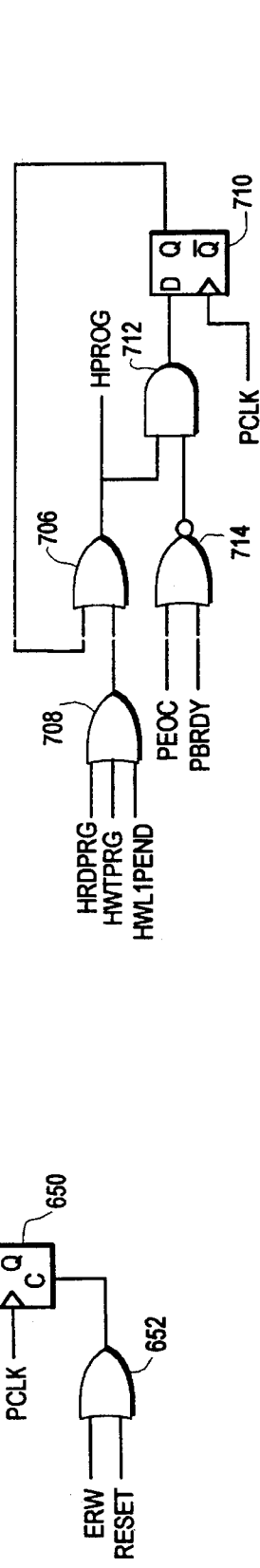
FIG. 45
FIG. 51

SNOOP STATE MACHINE

HSYNC STATE MACHINE

HADD STATE MACHINE

HOST STATE MACHINE

HDAT STATE MACHINE

HARB STATE MACHINE

MEMORY WRITE, PAGE HIT, w/60ns MEMORY

MEMORY READ, PAGE HIT, w/60ns MEMORY

MEMORY WRITE, PAGE MISS, w/80ns MEMORY

MEMORY READ, PAGE MISS, w/60ns MEMORY

MEMORY READ, PAGE MISS, w/80ns MEMORY

MEMORY READ BURST, PAGE HIT, w/60ns MEMORY

MEMORY WRITE BURST, PAGE MISS, w/60ns MEMORY

MEMORY WRITE TO WRITE PROTECTED MEMORY

HOST BUS READ CYCLE, PIPELINED

HOST WRITE CYCLE

FIG. 62 — MEMORY WRITE/HOST WRITE, FULLY PIPELINED

MEMORY READ/MEMORY READ, FULLY PIPELINED

FIG. 64 — HOST WRITE/MEMORY WRITE, FULLY PIPELINED

HOST WRITE/HOST WRITE/MEMORY READ/MEMORY WRITE

ISA BUS MASTER READ HIT TO MODIFIED

ISA BUS MASTER WRITE

EISA BUS MASTER WRITE CYCLE

EISA BUS MASTER READ HIT TO MODIFIED

MEMORY CONTROLLER HAVING FLIP-FLOPS FOR SYNCHRONOUSLY GENERATING DRAM ADDRESS AND CONTROL SIGNALS FROM A SINGLE CHIP

This is a continuation of application Ser. No. 08/034,287 filed on Mar. 22, 1993, now abandoned.

BACKGROUND OF THE INVENTION

1. Field of the Invention

The invention relates to memory controllers used with computers, and more particularly to memory controllers providing address, row address strobe (RAS), column address strobe (CAS) and write enable signals to dynamic random access memories (DRAMS).

2. Description of the Related Art

Microprocessor-based computer systems have been increasing in performance at a tremendous rate. Much of this increase has been based on the improvements in the microprocessor itself. For example, clock speeds are reaching those previously used only by mainframe computers. However, affordable memory device performance has not been increasing at the same rate. Indeed, dynamic random access memory (DRAM) performance has flattened out recently, with the majority of the effort being concentrated on increasing device storage size. Thus main memory has become a bottleneck.

Cache memory systems, where a small amount of very fast, expensive static RAM is used to store copies of the data, have made the problem somewhat less severe, but the designs are very complicated and expensive. Further, the poor memory performance returns when access must be made to main memory. So there still is a need to improve the performance of the main memory system.

Page mode memory devices provide one way to increase memory system performance. If consecutive accesses are made to the same row address, referred to as the same page, only column addresses need be provided. This allows a dramatic reduction in cycle time for those cases, referred to as page hits. This is a quick gain and relatively easily made by itself, but more performance is always desired.

In many processors, the address is provided before the data portion of the cycle. This is referred to as pipelining and allows a performance increase in the memory systems. All of the address decoding can be started before the data portion begins, so that partially parallel operations can occur.

In most cases this overlap is somewhat minimal, one or two clock cycles, as the related systems cannot handle much more complexity. For example, the memory controller is conventionally built as a synchronous controller, based on a major state machine to control events and advancing on the processor clock edge. As the complexities of the microprocessor and the computer system increase, the conventional memory controller design becomes very limiting. It is exceedingly difficult to build a major state machine to handle all the possible cases. The complexity is daunting, if not overwhelming. As a result, numerous potential performance improvements have to be limited. Usually this means that any pipelining is limited and there are very few parallel operations. While some designs allowed write operations to be posted, this just further increased complexity in other ways. As a result, some other feature was sacrificed, so potential gains were lost.

Memory system performance is also a trade off between cost and speed. While conventionally 80 ns DRAMs have been used, 60 ns devices are available, though at a slightly higher cost. While prior memory controllers could utilize differing speeds of DRAMs, allowing the user to make the speed versus cost tradeoff, a mixed speed system did not obtain any benefits. The memory controller could use different speed DRAMs, but only one actual speed of operation was allowed in the system. The memory controller thus ran at the speed of the slowest of the installed DRAMs. This did not allow the user to have fast memory areas, such as the base memory area, and slow memory areas, such as extended memory locations in the main system memory controlled by the memory controller. This limitation arose again because of the complexities of memory controllers.

One further limitation to memory system design has been timing skew and propagation delay problems in providing the actual address, RAS, CAS, and write enable signals to the memory devices. For DRAMs the address is provided in two portions, the row address and the column address. These addresses are typically developed by multiplexing the addresses provided to the memory system. A row address strobe or RAS signal is provided with the row addresses, while a column address strobe or CAS signal is provided with the column addresses. The particular RAS and CAS signals provided to individual devices are generally prepared from master signals, referred to as MRAS and MCAS. The master signals have the desired timing information in relation to the addresses and data, but they must be qualified by other signals so that only the proper memory devices are activated. Generally this is done by doing bank selection encoding of the MRAS signal, so that only the memory devices having in the proper address range receive RAS signals. The MCAS signal is typically encoded with the signals relating to the particular byte or bytes of the full width which are active. In read cases this is usually the full width, but in write cases must be properly qualified so that erroneous data is not written. Similarly, a master write enable or MWE signal is used and provided to the devices. This signal can be provided to all of the devices as the CAS signal is providing the necessary chip enabling signal.

Conventionally the address multiplexing has been performed in one device along with master signal development, such as the memory controller chip itself, while the various additional qualifying has been done on other chips external to the memory controller chip. In fact, the qualification has generally been done asynchronously, while some of the other development has been done synchronously. One problem with this arrangement is that with all of these operations, the multiplexing, the master signal development, the further qualifications, and the mixed asynchronous and synchronous development, timing skews and propagation delays become significant and must be considered when any timing margin analysis is performed. Indeed, when working with the very high clock rates present in current microprocessor systems, the skews and delays can add an entire clock cycle to each memory cycle, thus degrading system performance.

Thus there are memory system performance gains that could be achieved, but conventional design limitations render them only potential, not practical. Therefore it is clearly desirable to have a memory controller which makes maximum use of processor address pipelining, can run numerous cycles concurrently in the greatest number of cases, can effectively use different speed memory devices and minimizes any timing related problems in providing the various signals to the memory devices.

SUMMARY OF THE PRESENT INVENTION

A memory controller according to the present invention makes maximum use of any processor pipelining and allows a large number of cycles, up to five, to be running concurrently on the computer system. This allows a marked improvement in the performance of the memory system.

The primary way this improvement is obtained is by moving the memory control functions from a large, complicated master state machine to a plurality of simple, interdependent state machines. Basically each state machine is responsible for one small portion of the overall operation, generally one specific function. As each state machine reaches a point where it has completed its function, it notifies a related state machine that it can now proceed on its task and proceeds to wait for its next start or proceed indication. The second state machine operates in a similar fashion. This is repeated until a complete cycle is performed. But the state machines responsible for the earlier portions of a cycle, such as address and command decode, have started their tasks on the next cycle before the state machines responsible for the later portions of the cycle have completed their tasks. Thus the looser relationship allows each state machine to advance as far as possible in each cycle, until it reaches a point it needs another signal to proceed. This interdependent nature therefore allows very efficient handling of pipelined conditions.

The memory controller is further logically reorganized from a conventional case. The system memory is not located off an intermediate or host bus, but is located directly off the processor bus. The host bus is also located off the processor bus. Thus the three buses form a three point connection. A data buffer is located at this three point connection and is capable of handling data simultaneously on its three buses. The number of potential data routes is thereby increased over the conventional case, where all processor-memory operations need the use of the host bus, interfering with processor-host bus operations. With data capable of going on two separate paths, opportunities for concurrency are increased.

The memory controller is logically organized as three main blocks, one called the front end being connected to and responsible for processor bus interaction. A memory block is provided to handle interaction with the actual memory devices and communicates with the front end block to indicate cycle start and completion. Similarly, a host block is provided to handle host bus interaction and also communicates triggering events to the front end block.

The front end block decodes a cycle, determines whether it goes to the memory or the host bus and initiates the proper block. The front end block is then free to work on the next cycle, so pipelining is readily handled. If the next cycle is intended for the other of the memory or the host bus, that block can be activated and it begins its operations. Now full concurrency is developed. The front end block is free to decode yet another cycle, assuming one has been provided by the processor. Thus even more pipelining can be developed. In the preferred embodiment an extended industry standard architecture (EISA) bus is developed from the host bus. As write operations can be posted from the host bus to the EISA bus, it is apparent that even more concurrency can be obtained if an EISA-intended write operation is interposed.

The arrangement of the memory controller as a plurality of state machines simplifies this concurrency. Fewer states are needed in total as the possibilities are handled individually rather than as a group. Thus the overall complexity of the memory controller is greatly reduced, down to a manageable size, yet pipelining and concurrency are obtained and maximized.

In addition to the different logical arrangement, the memory controller is further segmented in to a different physical arrangement. The address multiplexing, MRAS and MCAS signal qualification and MWE signal transfer are all performed on a single chip or device to minimize interdevice concerns. Further, the signals are all provided synchronously from flip-flops clocked off the same signal, resolving the asynchronous versus synchronous problems. As a result, in the preferred embodiment a full clock cycle is saved on every memory cycle as compared to the conventional prior art arrangement.

The flexibility provided by the plurality of state machines also allows the memory controller to utilize differing speed memory devices, such as 60 ns and 80 ns, on an individual basis, with the memory controller running each memory device at its full designed rate, not the lowest of the rates in the memory system. The speed of the memory is stored for each 128 kbyte block of memory. This stored value is then used when the memory cycle is occurring to redirect a state machine, thus accomplishing a timing change of the memory devices. As this value is available for each 128 kbyte block, each memory device can be operated at its full speed.

Therefore a memory controller according to the present invention makes maximum use of any address pipelining provided by the processor, can run numerous cycles concurrently, dynamically adjusts its operation for differing speed memory devices and has reduced skew and propagation delay. This is done without extreme complexity, so that reliable operations under all possible operating conditions can be more easily determined.

BRIEF DESCRIPTION OF THE DRAWINGS

A better understanding of the present invention can be obtained when the following detailed description of the preferred embodiment is considered in conjunction with the following drawings, in which:

FIG. 3 is a block diagram of the input/output board of FIG. 1;

FIGS. 11–22, 24–34, 37–39, 42 and 44–50 are state machine diagrams for a number of the state machines in the memory controller of FIG. 4;

FIGS. 23, 35, 36, 38A–38I, 40, 41, 43 and 51 are schematic diagrams of portions of the memory controller of FIG. 4 used with various state machines.

DETAILED DESCRIPTION OF THE PREFERRED EMBODIMENT

Figure 1:
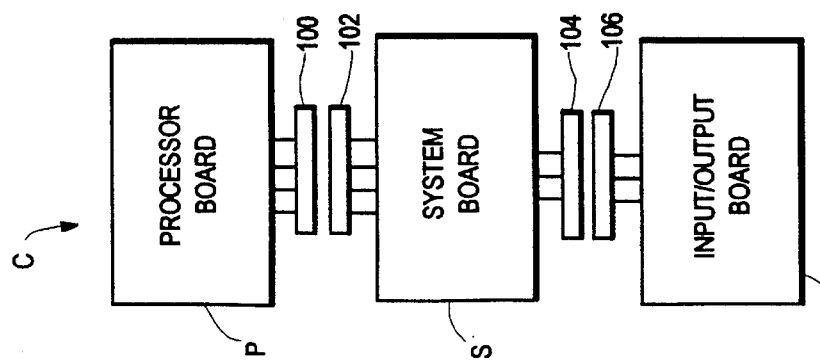
FIG. 1 is a block diagram of a computer system incorporating the present invention.

Referring now to FIG. 1, a computer system C according to the preferred embodiment is shown. A processor board P contains the processor, cache memory and main memory and associated equipment and a connector 100, preferably a card edge. A system board S includes a connector 102 to receive the connector 100, preferably a socket to receive a card edge. The system board S contains common system elements and slots or connectors for interchangeable circuit boards. The system board S also contains an additional connector 104. The connector 104 mates with a connector 106 on an input/output (I/O) board I. Preferably the I/O board I contains certain I/O related features of the computer C, such as the floppy and hard disk drive control units, an audio system and the parallel and serial ports. Additionally, the real time clock and complimentary metal oxide semiconductor (CMOS) memory is on the I/O board I. Each of the processor board P, system board S and I/O board I are detailed below.

This is noted to be an exemplary and preferred embodiment of the computer system C and it is understood that numerous other embodiments, such as having all of the components on a single system board or mother board as is common, could be readily developed.

Figure 2:
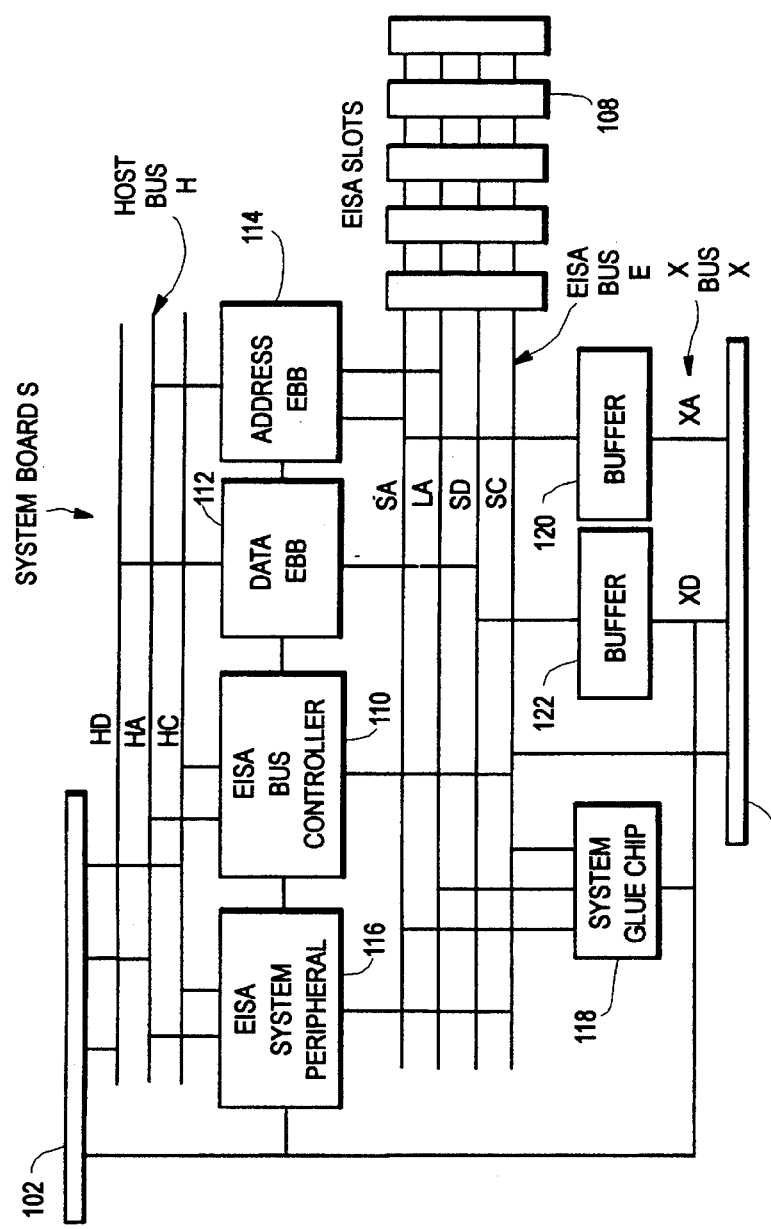
FIG. 2 is a block diagram of the system board of FIG. 1.

Referring now to FIG. 2, a block diagram of the system board S is shown. Two main buses, a host bus H and an EISA bus E, form the logical back bones of the system board S. The host bus H has three components, the host data or HD bus, the HA or host address bus and the HC or host control bus. Preferably the HD bus is 32 bits wide and the HA bus is provided for a 32 bit addressing space. Preferably the host bus H operates substantially according to an 80486 protocol, but including capabilities for pipelining as in the 80386. The EISA bus E has four major components, the SA and LA or system and early address buses, the SD or system data bus and the SC or system control bus. A plurality of EISA slots 108 are connected to the EISA bus E. An EISA bus controller 110 such as the Intel 82358, provides the necessary capabilities to convert between host bus H cycles and EISA bus E cycles and is connected between the HA and HC buses and the SC bus. The EISA bus controller 110 is connected to control a data EBB or EISA bus buffer 112, which provides the necessary data transceiving functions between the host bus H and the EISA bus E and provides the data assembly and disassembly requirements of an EISA system. Similarly, the EISA bus controller 110 provides the control function for an address EISA bus buffer or EBB 114. The address EBB 114 provides transceiving capabilities between the EISA bus E and the host bus H and in addition latches the HA bus signals to form the SA bus signals as appropriate.

The computer C includes certain fundamental components such as an interrupt system, a direct memory access (DMA) controller and a number of timers, as well as arbitration of the EISA bus E. These components are all contained in the EISA system peripheral 116, which is connected to the HA, HC and SC buses. A chip referred to as the system glue chip 118 is connected to the EISA bus E and to a bus referred to as the XD or X data bus and performs numerous miscellaneous functions necessary in the computer system C.

Finally, a third bus, referred to as the X bus X, is provided to the connector 104. The X bus X has address XA, data XD and control SC portions. The XA lines are developed from the SA bus by means of a buffer 120, while the XD bus is formed from the SD bus by means of a buffer or transceiver 122. Preferably the XD bus is 16 bits wide, while the XA bus is the same width as the SA bus. The host bus H and the XD bus are provided to the connector 102 for provision to the processor board P. In addition, the XD bus is connected to the EISA system peripheral 116.

Referring now to FIG. 3, the I/O board I is shown in more detail. The backbone of the I/O board I is the X bus X. Connected to the X bus X is a need only memory (ROM) or read only memory 124, which contains the basic operating sequences of the computer system C. The ROM 124 is preferably a flash erasable programmable read only memory (EPROM) to allow ease of changing of the basic operating sequences. A real time clock (RTC)/CMOS unit 126 is connected to the X bus X to provide real time clock functions and longer term memory capabilities. A floppy disk controller 128 is connected to the X bus X and receives a floppy disk unit 130. A keyboard controller 132, typically an 8042 device, is connected to the X bus X and receives a keyboard 134 and a mouse or pointing device 136. A multiple peripheral chip 138 is connected to the X bus X and provides an interface to a hard disk unit 140, a parallel port 142 and two serial ports 144 and 146. Finally, an audio system 148 is connected to the X bus X to provide audio functions, with a speaker 150 connected to the audio system. Other components could be provided on the I/O board I if desired. Preferably, the graphics system in the preferred computer system C is provided on a separate add in card located in an EISA slot 108 and is not necessarily located on the I/O board I.

Figure 4:
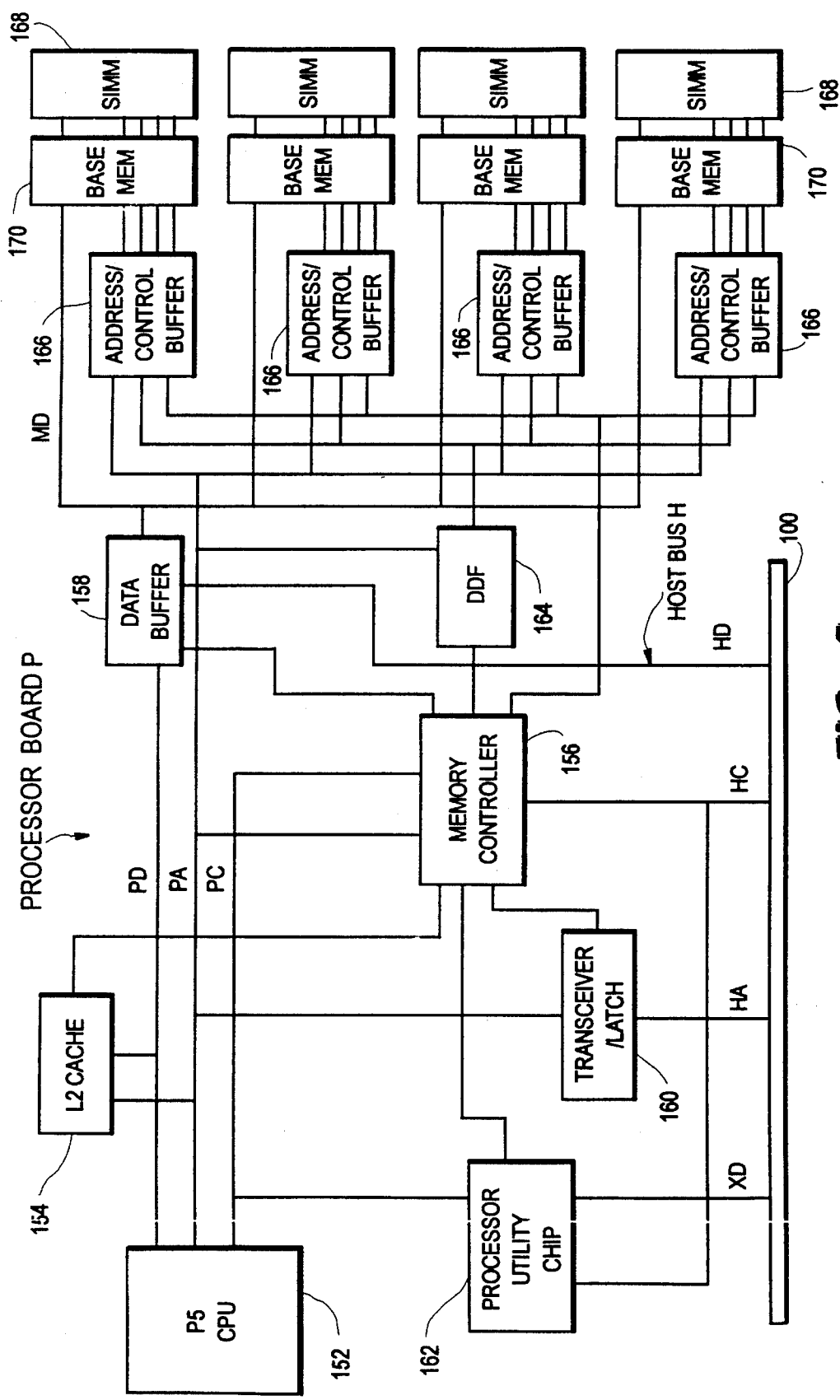
FIG. 4 is a block diagram of the processor board of FIG. 1.
Figure 5:
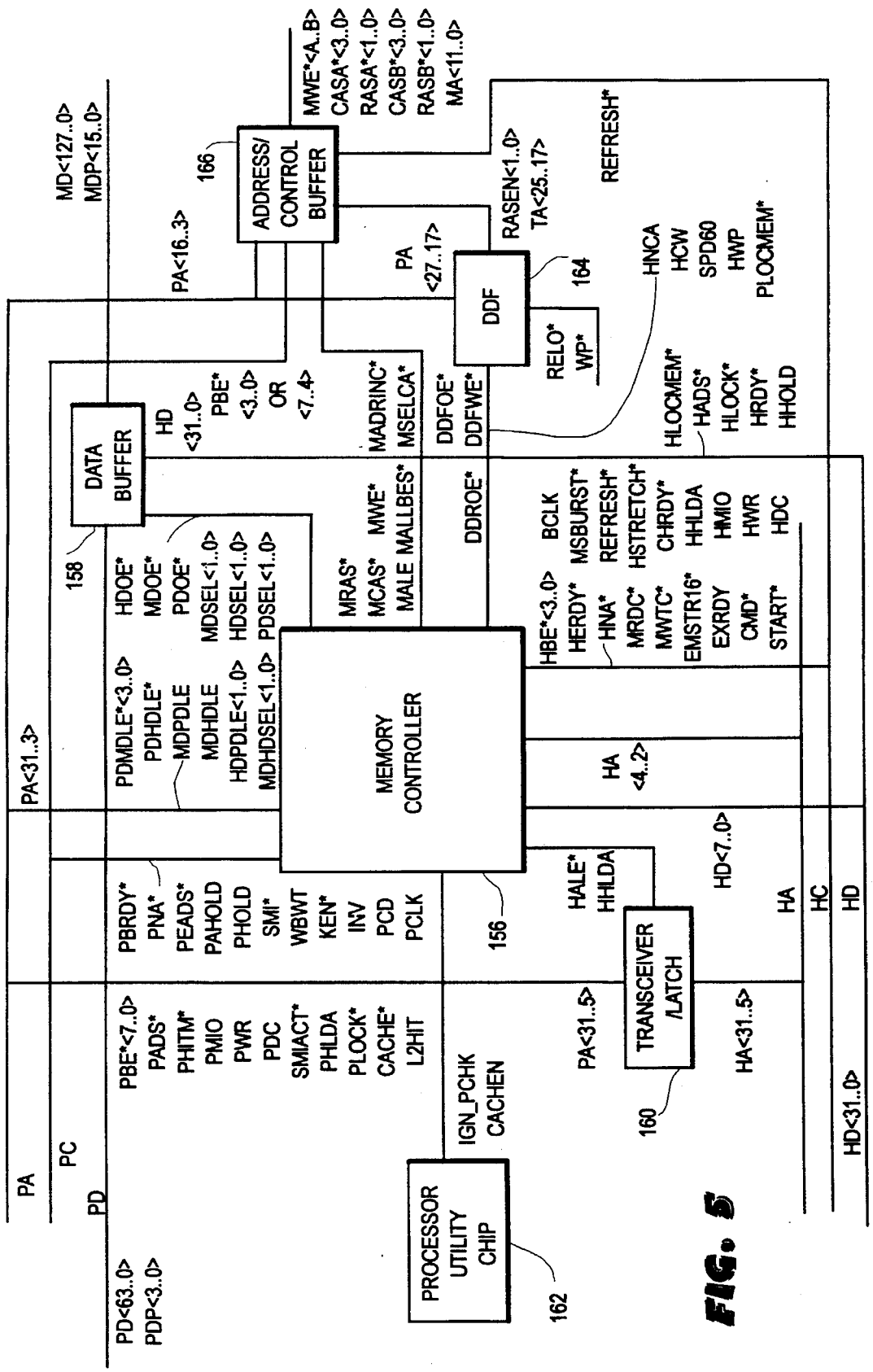

Referring now to FIG. 4, the processor board P is shown in more detail. The primary component on the processor board P is the processor or CPU 152, in the preferred embodiment preferably the P5 or Pentium microprocessor from Intel Corp., the next generation design after the 80486. In the preferred embodiment the 66 MHz version is utilized. Operation and interfacing of the 80386 and 80486 are assumed to be familiar to the reader. The P5 is a very high performance microprocessor having a superscalar architecture and integrated and separate code and data caches. The data bus is 64 bits wide and 8 parity bits are provided. The data cache is a write-back design having a 64 byte line width. Many of the signals of the P5 have a similar function as in the 80386 and 80486 and only those signals have a changed or new function will be described in detail herein. One signal is CACHE, which is used to indicate whether the cycle is cacheable by the processor 152. An additional signal used to indicate cacheability is the PCD or page cache disable signal, which is used to disable caching of selected pages of memory. If the CACHE signal is present and the PCD signal is not asserted during a read or write cycle, they are burst cycles, namely cache line fill or write-back. Further, the P5 has only a PBRDY* or processor burst ready input and does not have a PRDY* or single cycle ready input, so the PBRDY* input is used for all ready indications to the processor 152. The P5 does include a PNA* or next address input to allow address pipelining. One additional feature in the P5 is System Management Mode or SMM. This is similar to that in the Intel 80386SL and 80486SL processors. An SMI pin is used to enter SM mode and a signal referred to as SMIACT* is provided to indicate operation in SM mode.

Three buses are connected to the P5 CPU 152, the PD or processor data bus, the PA or processor address bus and the PC or processor control bus. A level two (L2) or external cache 154 is connected to the PD and PA buses and receives control signals from a memory controller 156. In the preferred embodiment the memory controller 156 is a single application specific integrated circuit (ASIC) which contains the memory controller functions and additionally includes the cache controller capabilities necessary to operate the L2 cache 154.

A data buffer 158 is connected to the PD bus and develops two new buses, the HD or host data bus and the MD or memory data bus. The HD bus is connected to the connector 100 for connection to the system board S. The data buffer 158 is controlled by the memory controller 156. A transceiver/latch unit 160 is connected between the PA bus and the HA bus to provide latching and transceiving capabilities of addresses between the P5 CPU 152 and the host bus H. The transceiver/latch 160 is controlled by the memory controller 156 to allow posting of cycles from the processor bus to the host bus H.

A processor utility chip 162 provides certain necessary utility operations for use with the CPU 152. The processor utility chip 162 is connected to the XD and the HC bus and is controlled by the memory controller 156. The output of the processor utility chip 162 is preferably provided to the PC bus to provide control functions of the P5 CPU 152.

The memory controller 156 is also connected to a unit referred to as the DDF or data destination facility 164. The DDF 164 performs memory module enabling, address translation and memory segment or page property storage. The DDF 164 provides memory capabilities to indicate which particular bank of memory is to be enabled, performs address translation on a 128 kbyte boundary and provides indications of certain characteristics of each 128 k block, such as whether it is located in the main memory on the processor board P or is external, write protected, high speed, and/or cacheable and whether that portion can be utilized by a write-back cache. Operation of the DDF 164 is more completely explained in U.S. Pat. No. 5,341,494 issued to Thayer, et al. and hereby incorporated by reference. The outputs of the DDF 164 are a series of RASEN or RAS enable signals for enabling a particular memory module, certain translated addresses to indicate the address bits above 128 k, and the page characteristic bits, such as HNCA, HCW, HWP, PLOCMEM*, and SPD60.

The memory portion of the processor board P is provided as four identical modules, each module containing an address/control buffer 166, one socket for receiving an individual single in-line memory module (SIMM) unit 168 and base memory 170. The address/control buffer 166 receives the PA bus, the address and enable outputs of the DDF 164 and control signals from the memory controller 156. The outputs of the address/control buffer 166 are the addresses provided to the SIMMs 168 or base memory devices 170 and the RAS*, CAS* and WE* signals. These signals are provided to each of the SIMMs 168 and the base memory devices 170. Additionally, each SIMM 168 or base memory device 170 is connected to the memory data bus MD. As indicated, there are four like modules. Other configurations of the processor board P could be developed, with variations obvious to one skilled in the art, with certain details provided below.

Figure 5:
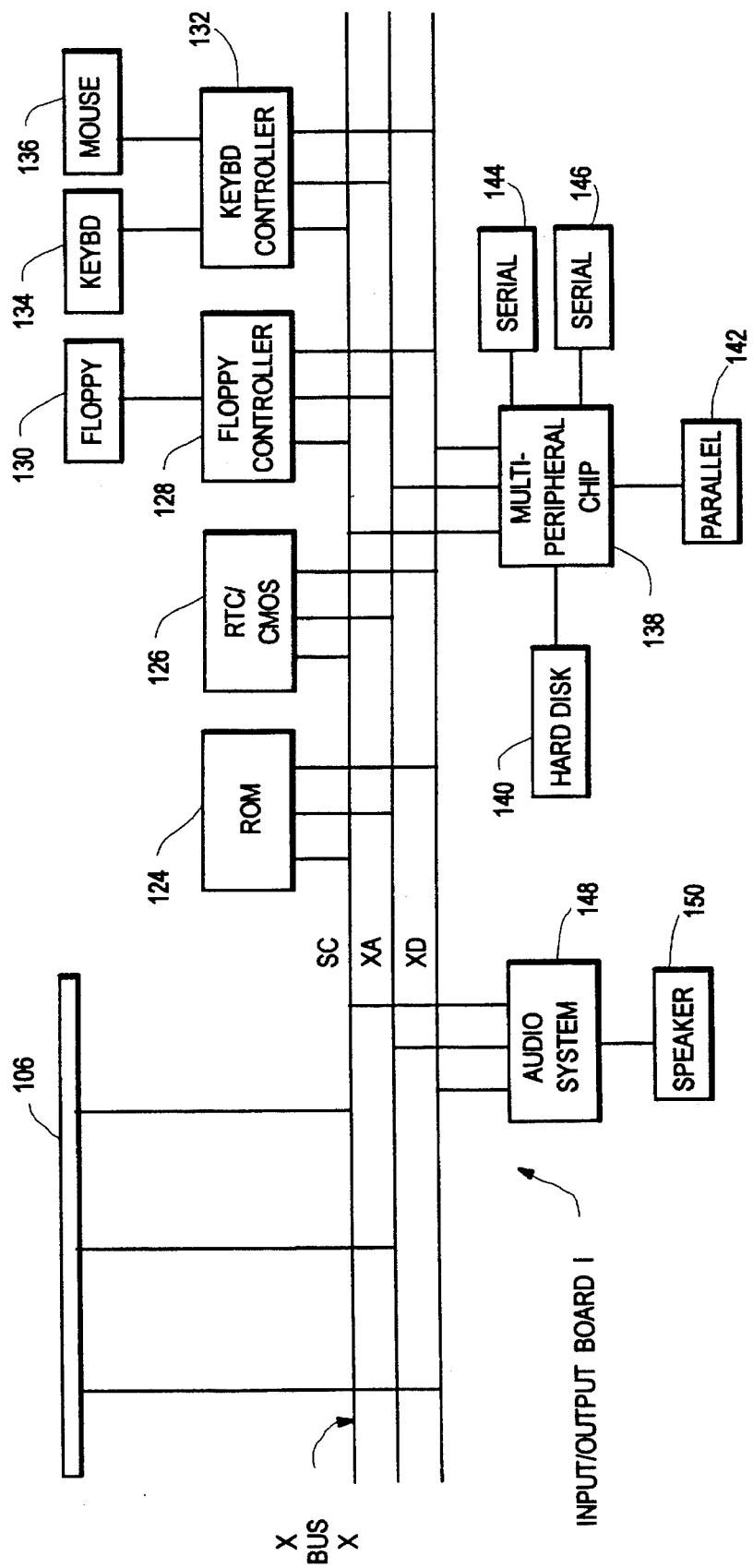
FIG. 5 is a more detailed block diagram of portions of the processor board of FIG. 4.

Referring now to FIG. 5, the various control signals utilized by or provided by the memory controller 156 are shown, with their appropriate connections to the related bus or block. FIG. 5 is useful for an overview of the connections of the memory controller 156 to the remaining components of the computer system C.

Figure 6:
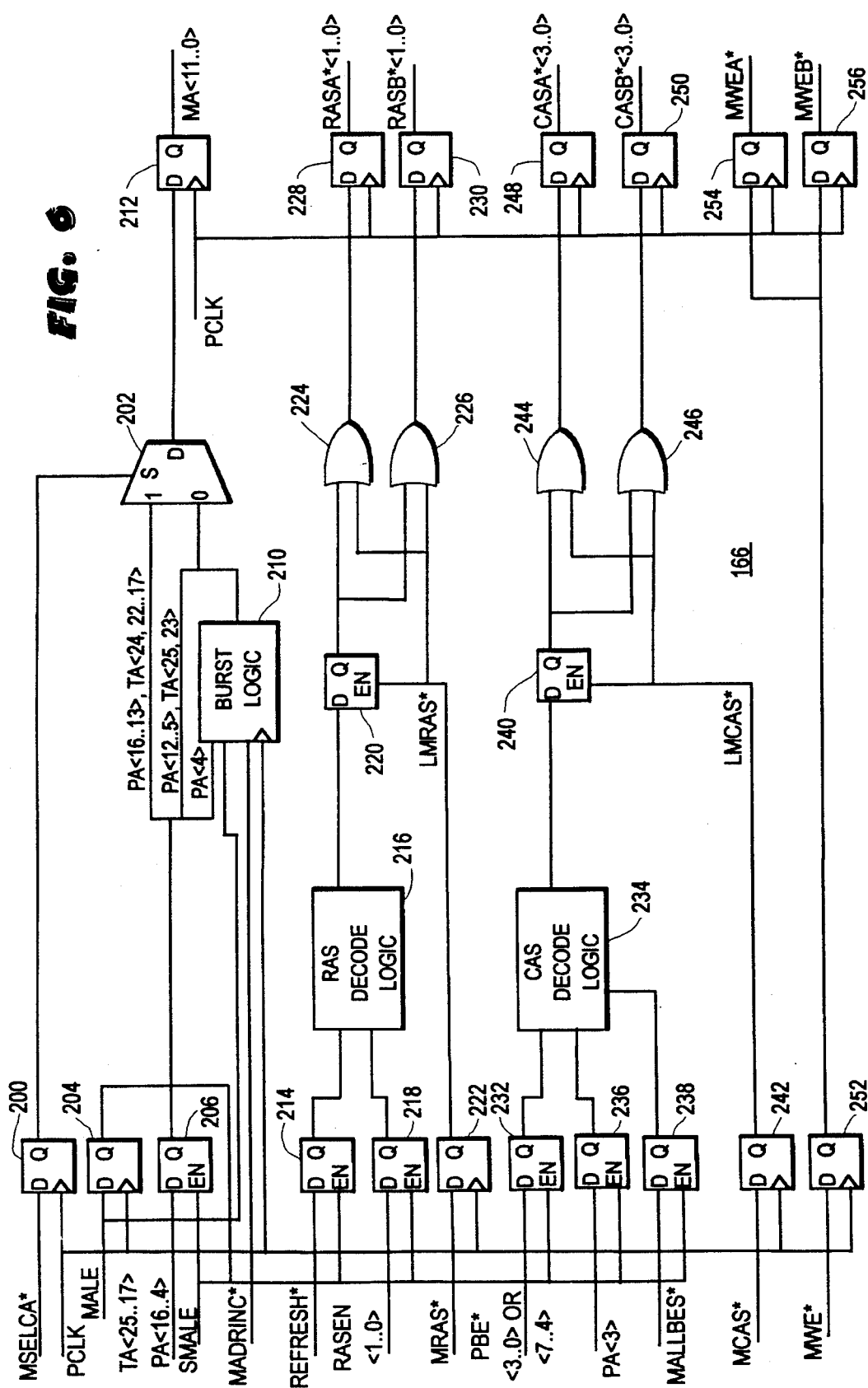
FIG. 6 is block diagram of the address/control buffer of FIG. 4.

Referring now to FIG. 6, a block diagram of the address/control buffer 166 is shown. The address/control buffer 166 is made as a single chip, for reasons discussed below. The MSELCA* or memory select column address signal is provided to a D-type flip-flop 200. The clock of the flip-flop 200 is provided by the PCLK signal, which is preferably the 66 MHz signal used as the clock by the processor 152. The noninverted output of the flip-flop 200 is provided to the select input of a 12 bit 2:1 multiplexor 202. The MALE or memory address latch enable signal is provided to the D input of a D-type flip-flop 204, the flip-flop being clocked by the PCLK signal. The noninverted output of the flip-flop 204 is the SMALE signal and is provided to the enable input of a 21 bit latch 206. The D inputs of the latch 206 receive the PA<16 . . 4> signals from the PA bus and the TA<25 . . 17> translated address signals from the DDF 164. The noninverted outputs of the portions of the latch 206 receiving signals PA<16 . . 13> and TA<24, 22 . . 17> are provided to the one input of the multiplexor 202. The noninverted outputs of the portions of the latch 206 receiving signals PA<12 . . 5> and TA<25,23> are provided as inputs to the zero input of the multiplexor 202. The noninverted output of the latch 206 portion receiving the PA<4> signal is provided to the address input of a burst logic block 210. The burst logic block 210 is used to increment, effectively invert, the address being applied to the memories during burst operations, that is, cache line fill and writeback operations, of the processor 152. The burst logic 210 also receives the MALE signal to indicate when to load an address and the MADRINC* signal to increment the address when active. Further, the PCLK signal is provided to the burst logic 210 to perform the actual clocking operation. The output of the burst logic 210 is the least significant bit of the column addresses and is provided to the zero input of the multiplexor 202. The output of the multiplexor 202 is provided to the D input of a 12 bit D-type flip-flop 212. The PCLK signal clocks the flip-flop 212 and the Q or noninverted outputs are the MA<11 . . 0> signals.

The REFRESH* signal is provided to the D input of a latch 214 whose enable input receives the SMALE signal. The output of the latch 214 is provided as one input to a RAS decode logic block 216. The RASEN<1 . . 0> signals from the DDF 164, which indicate which bank of memory is to be activated, either the base memory 170 or the SIMMs 168, are provided to the D inputs of a two bit latch 218. The enable input to the latch 218 is the SMALE signal. The output of the latch 218 is provided as the other inputs to the RAS decode logic 216. A further input to the RAS decode logic 216 is the LMRAS* signal described below. The output of the RAS decode logic 216 is a four bit signal which is active to indicate that either a proper RAS has been selected or in the case of REFRESH operation that all row addresses needed to be provided. The output of the RAS decode logic 216 is provided to a four bit latch 220 whose enable input receives the LMRAS* signal which is provided by the noninverted output of a D-type flip-flop 222. The MRAS* signal is provided to the D input of the flip-flop 222, which is clocked by the PCLK signal. In this case the master RAS or MRAS* signal is thus used to enable the decoded RAS signals. The two noninverted outputs of the latch 220 related to a first set of decoded RAS signals are provided to one input of two OR gates 224 and the other two noninverted outputs of the latch 220 related to a second set of decoded RAS signals are provided to one input of two OR gates 226. The second input to the OR gates 224 and 226 is provided by the LMRAS* signal. The outputs of the OR gates 224 are provided to the D inputs of a two bit D-type flip-flop 228, which is clocked by the PCLK signal and whose output are the RASA*<1 . . 0> signals. The outputs of the OR gates 226 are provided to the D inputs of two bit D-type flip-flop 230, which is clocked by the PCLK signal and whose outputs are the RASB*<1 . . 0> signals. The RASEN<1 . . 0> signals to RASA*<1 . . 0> and RASB*<1 . . 0> signals decoding is shown below, with memory banks 0 and 1 corresponding to the base memory 170 and banks 2 and 3 corresponding to the SIMMs 168.

| RASEN<1...0> | RASA*<1> | RASA*<0> | RASB*<1> | RASB*<0> | Bank |
|---|---|---|---|---|---|
| 11 | 1 | 0 | 1 | 1 | 0 |
| 10 | 0 | 1 | 1 | 1 | 1 |
| 01 | 1 | 1 | 1 | 0 | 2 |
| 00 | 1 | 1 | 0 | 1 | 3 |

Four of the processor byte enable signals, that is PBE*<3 . . 0> or PBE<7 . . 4> depending upon which address/control buffer 166 is being referenced, each address/control buffer 166 handling 32 bits of memory, are provided to the D inputs of a 4 bit latch 232. The enable signal for the latch 232 is the SMALE signal. The outputs of the latch 232 are four inputs to CAS decode logic 234. The PA<3> signal is provided to the D input of a latch 236, which is enabled by the SMALE signal. The output of the latch 236 is provided to the CAS decode logic 34. The MALLBES* memory or all byte enables signal from the memory controller 156 is provided to the D input of a latch 238, which is enabled by the SMALE signal. The output of the latch 238 is provided to the CAS decode logic. The CAS decode logic 234 has four outputs, namely the four lines which are to activate the particular bytes of memory to be provided by this address control buffer 166. The PA<3> signal is used to do selection between the upper and lower 64 bits of the memory system and the PBE* signals are used for specific byte lane encoding of the 32 bits. In the preferred embodiment, the memory is 128 bits wide but each address/control buffer 166 only controls 32 bits, so two address/control buffer chips each receive the same PBE, signals. To resolve interleaving problems, an input (not shown) is used to indicate whether the particular address/control buffer 166 is for the upper or lower 64 bits. This signal is compared with the PA<3> signal for effective chip selection to prevent aliasing problems. The four outputs of the CAS decode logic 234 are provided to the D input of a 4 bit latch 240. The enable signal to the latch 240 is the LMCAS* or latched master CAS signal which is provided by the noninverted output of a D-type flip-flop 242. The D input of the flip-flop 242 receives the master CAS or MCAS* signal and is clocked by the PCLK signal. The four outputs of the latch 240 are provided as inputs to four two input OR gates 244 and as inputs to four two input OR gates 246. The other inputs to the OR gates 244 and 246 are provided by the LMCAS* signal. The outputs of the OR gates 244 are provided to a 4 bit D-type flip-flop 248 which is clocked by the PCLK signal and whose noninverted outputs are the CASA*<3 . . 0> signals. Similarly, the four outputs of the OR gates 246 are provided to the D-type inputs of a 4 bit D-type flip-flop 250 which is clocked by the PCLK signal and whose noninverted outputs provide the CASB*<3 . . 0> signals. The CASA*<3 . . 0> signals are provided to the base memory 170, while the CASB*<3 . . 0> signals are provided to the SIMMs 168.

The MWE* signal is provided to the D input of a D-type flip-flop 252, which is clocked by the PCLK signal. The noninverted output of the flip-flop 252 is provided to the D input of D-type flip-flops 254 and 256. The flip-flops 254 and 256 are clocked by the PCLK signal and produce, respectively, the MWEA* and MWEB* signals, which are the memory write enable signals provided to the base memory 170 and the SIMMs 168, respectively.

Thus by properly providing the MRAS*, MCAS*, MALE, MALLBES*, MADRINC* and MWE* and MSELCA* signals to the address/control buffer 166, the memory controller is able to properly provide the RAS, CAS and write enable signals in conjunction with the proper memory addresses to allow page mode operation as well as interleaved operation.

Thus it can be seen that all of the signals necessary to control the memory devices are provided to the memory devices from the address/control buffers 166. As the address/control buffers 166 are formed from a single chip, the skew between signals is greatly reduced from the conventional case where the signals are provided from multiple chips, each potentially having different delays even if of the same integrated circuit technology. Secondly, as the signals are all output synchronously from the output flip-flops, skew between the paths taken by the signals is also greatly reduced versus the conventional case which includes both synchronous and asynchronous signal development.

In the system of the preferred embodiment, it has been determined that a full cycle of the 66 MHz clock can be saved for every memory cycle in this manner. The chart below indicates the timing margin calculations for a system according to the prior art, such as the one disclosed in Bonella, U.S. Pat. No. 5,333,293 and hereby incorporated by reference, and a system according to the preferred embodiment. The example is for the row address hold (RAH) from RAS timing parameter for the preferred 60 ns DRAMs, but similar examples can be developed for the other more critical timing parameters.

|  |  | MIN | MAX |
|---|---|---|---|
| Prior Art Example |  |  |  |
| Budget - 2 Clock cycles |  | 30ns | 30ns |
| Memory Controller Clock to MRAS valid |  | −4.9ns | −12.7ns |
| MRAS derating to RAS buffers | max | −2ns | −2ns |
| MRAS to RAS (prop delay) | max | −8ns | −8ns |
| RAS derating | max | −2ns | −2ns |
| Memory Controller Clock to MA valid |  | +5.5ns | +14.1ns |
| Memory controller MA derating | min | +0.5ns | +0.5ns |
| MA buffer delay | min | +2ns | +2ns |
| MA derating | min | +0.5ns | +0.5ns |
| $t_{RAH}$ - DRAM Row Address Hold | min | −12ns | −12ns |
| Margin |  | 6.6ns | 8.4ns |
| Preferred Embodiment Example |  |  |  |
| Budget - 1 Clock cycle |  | 15ns | 15ns |
| Address/control buffer clock to RAS valid |  | −2.8ns | −8.9ns |
| RAS derating | max | −2ns | −2ns |
| Address/control buffer clock to MA valid |  | +3.2ns | +12.9ns |

|  | MIN | MAX |
| --- | --- | --- |
| MA derating min | +0.5ns | +0.5ns |
| $t_{RAH}$ - DRAM Row Address Hold min | −12ns | −12ns |
| Margin | 1.90ns | 5.5ns |

MIN refers to minimum timing, when the intergrated circuit is made using its fastest process, is at its lowest low temperature and is at its highest voltage. MAX refers to maximum timing, when the integrated circuit is made using its slowest process, is at its highest temperature and is at its lowest voltage.

While in the preferred embodiment the address multiplexor 202 is located in the address/control buffer 166, it is understood that the actual multiplexor could be provided external to the address/control buffer 166, but the multiplexed form of the addresses would still be provided to the address/control buffer 166 to allow driving and synchronization by a single chip. The presence of the multiplexor 202 on the address/control buffer 166, along with the address latches 206 and byte enable latches 232 is preferred as this variation reduces pin counts of other chips and more easily allows operation in a pipelined format.

Figure 7:
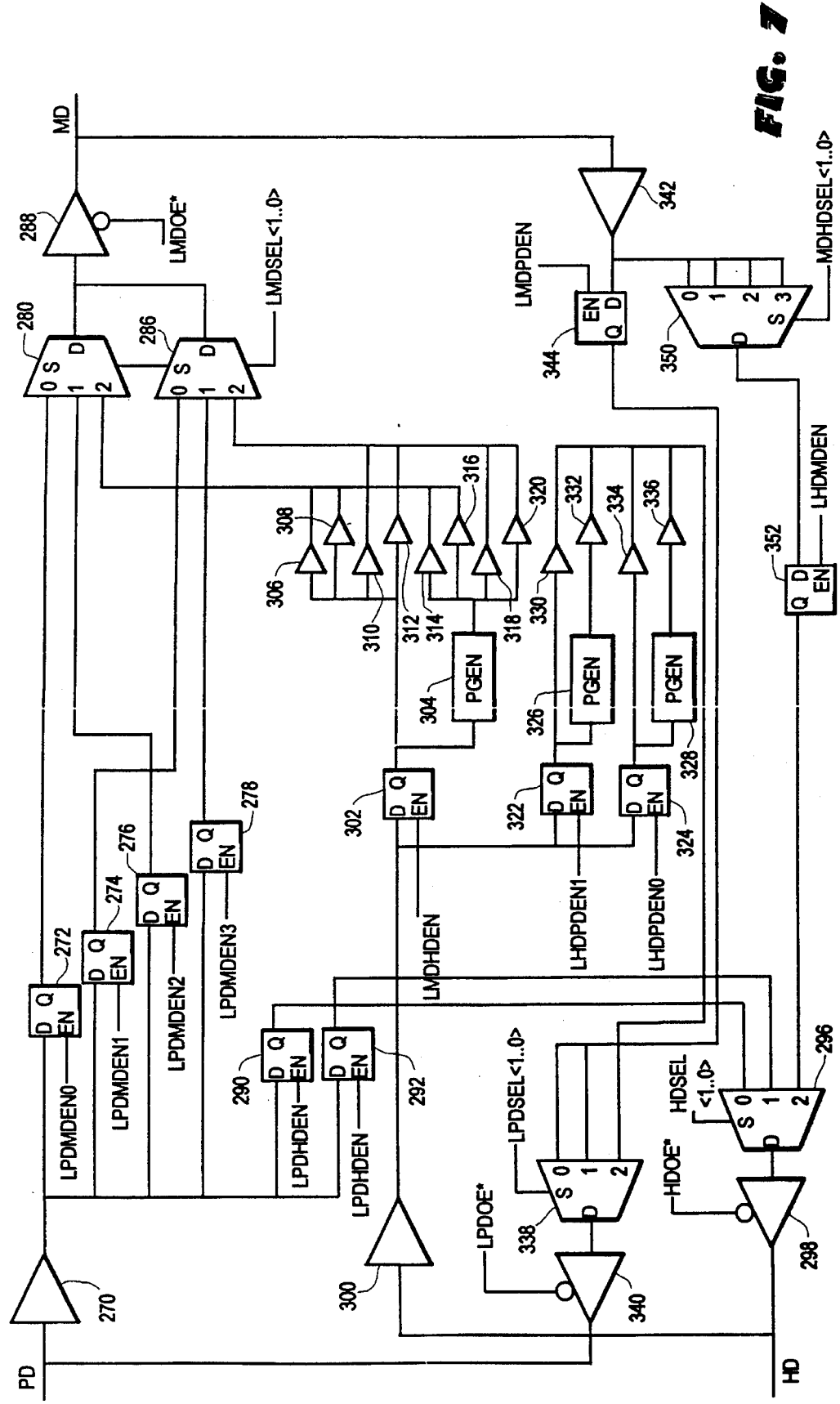
FIGS. 7, 8 and 9 are block diagrams of the data buffer of FIG. 4.
Figure 9:
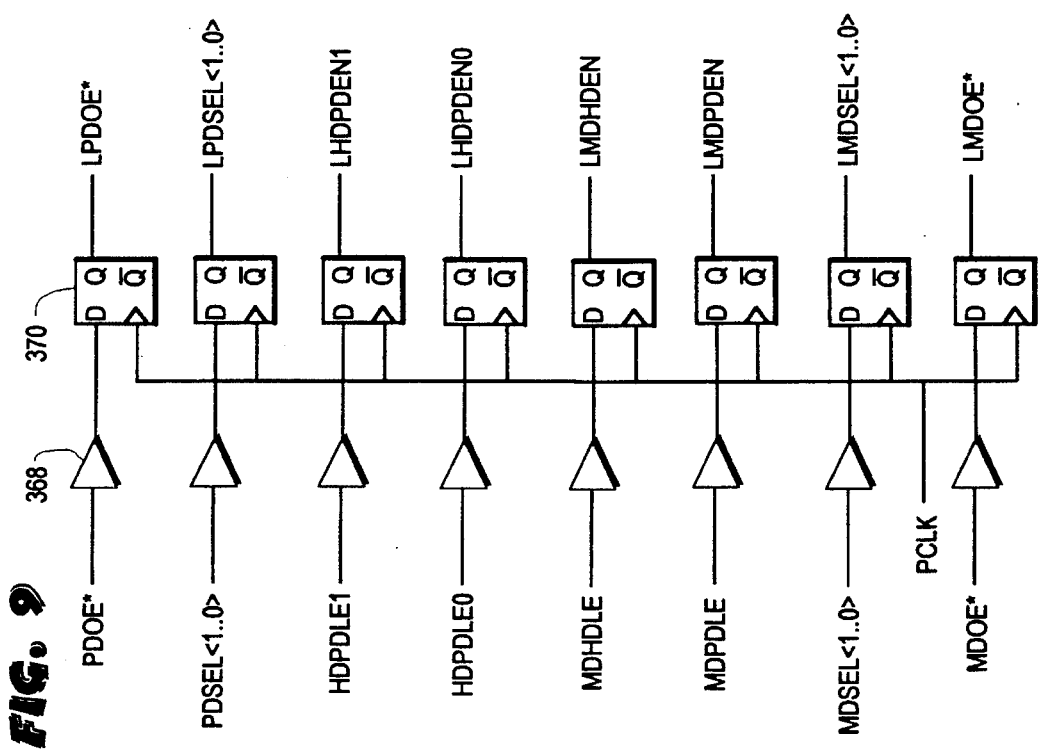
Figure 8:
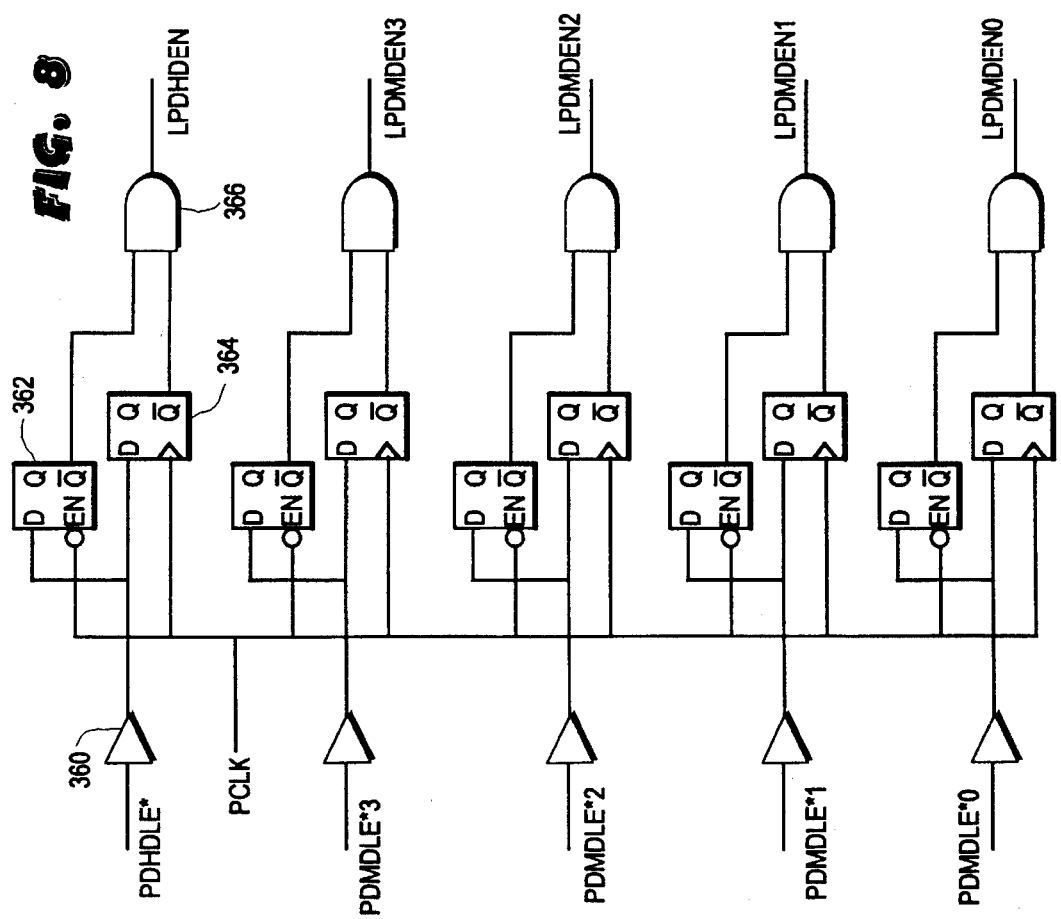

FIGS. 7, 8 and 9 disclose more details on various portions of the data buffer 158. Referring now to FIG. 7, the PD bus bits 63 to 0 and the parity bits associated with these lines are provided to the inputs of a 72 bit buffer 270. The outputs of the buffer 270 are provided to the D inputs of four 72 bit latches 272, 274, 276 and 278. These four latches receive as enable inputs the LPDMDEN0, LPDMDEN1, LPDMDEN2 and LPDMDEN3 signals. The use of four latches 272–278 allows an entire burst from the processor 152 to be stored in a write posting operation. The outputs of the latch 272 go to the zero input of a 3:1 72 bit multiplexor 280. The outputs of the latch 276 go to the one input of the multiplexor 280. The outputs of the latch 274 go to the zero input of a second 72 bit 3:1 multiplexor 286. The outputs of the latch 278 similarly go to the one input of the multiplexor 286. The select inputs to the multiplexors 280 and 286 are connected to the LMDSEL<1 . . 0> signals. The outputs of the multiplexors 280 and 286 are combined in parallel to produce a 144 bit wide path which is provided to the input of a 144 bit tri-state buffer 288. The output control for the buffer 288 is inverted and is connected to the LMDOE* signal. The output of buffer 288 is the memory data bus, bits 127 to 0 of memory data and 16 bits of parity.

A 36 bit latch 290 and a second 36 bit latch 292 are connected in parallel to the output of the buffer 270. The enable inputs to the latches 290 and 292 are provided by the LPDHDEN or latched processor data to host data enable signal. The output of the latch 290 is provided to the zero input of a 32 bit 3:1 multiplexor 296. Parity data is not provided to multiplexor 296. The outputs of the latch 292 are provided to the one input of the multiplexor 296. The select input to the multiplexor 296 receives the HDSEL<1 . . 0> signals or host data select signals. The outputs of the multiplexor 296 are provided to a 32 bit tri-state buffer 298 whose inverted control input receives the HDOE* signal. The output of the buffer 298 is connected to the 32 bits of the HD bus.

A channel is also necessary to go from the host data bus to the memory data bus. To this end a 32 bit buffer 300 is connected to the HD bus and has its outputs connected to the D inputs of a 32 bit latch 302. The LMDHDEN or latched memory data-host data enable signal is provided to the enable input of the latch 302. The outputs of the latch 302 are provided to a parity generator 304 which provides a 4 bit parity output. The outputs of the latch 302 are also provided to four 32 bit buffers 306, 308, 310 and 312. Similarly, the outputs of the parity generator 304 are provided to four 4 bit buffers 314, 316, 318 and 320. The outputs of the buffers 306, 308, 314 and 316 are paralleled to provide inputs to the third channel of the multiplexor 280 while the outputs of the buffers 310, 312, 318 and 320 are paralleled to provide the inputs to the third channel of the multiplexor 286. Thus, it is apparent that the same data from the host data bus is provided four times across to the memory data bus, but this is acceptable because the RAS decode logic 216 and the CAS decode logic 234 in the address control buffer 166 actually control which data bytes and which memory devices are actually active and receive the data.

It is also necessary to get data from the host data bus to the processor data bus. To this end the output of the buffer 300 is provided to the D inputs of two 32 bit latches 322 and 324. The LHDPDEN1 signal is the enable input to the latch 322 and the LHDPDEN0 signal is the enable input to the latch 324. Parity generators 326 and 328 are connected to the outputs of the latches 322 and 324 respectively. The outputs of the parity generator 326, the latch 322, the parity generator 328, the latch 324 are provided to appropriately sized buffers 332, 330, 336 and 334 so that a 72 bit wide value of 64 data bits and 8 parity bits is provided to the third input of a 72 bit 3:1 multiplexor 338. The selection control for the multiplexor 338 is provided by the LPDSEL<1 . . 0> or latched processor data select signals. The output of the multiplexor 338 is provided to the inputs of a 72 bit tri-state buffer 340 whose inverted tri-state control receives the LPDOE* signal. The output of the buffer 340 is connected to the 72 bits of the processor data and parity bus. By use of the two latches 322 and 324, two complete accesses on the host data bus can be combined in parallel to provide a 72 bit word which is provided to the processor.

A path must also be provided from the memory data bus to the processor data bus. To this end a 144 bit wide buffer 342 is connected to receive the memory data bus and the memory parity values. The outputs of the buffer 342 are provided to 144 bit latch 344 whose enable input receives the LMDPDEN signal. The outputs of the latch 344 are provided to the zero and one inputs of the multiplexor 338, with the lower 64 bits and associated parity to the zero input and the upper 64 bits and associated parity to the one input. In this manner the multiplexor 338 can be used to select between banks or interleaved portions of the memory system.

The data portions of the outputs of the buffer 342 are also provided in 32 bit segments to 4 inputs of a 4:1 32 bit multiplexor 350. The selection control for the multiplexor 350 is provided by the MDHDSEL<1 . . 0> signal, which indicates which 32 bit portion of the memory data is to be provided to the host data bus. The output of the multiplexor 350 is provided to a 32 bit latch 352, whose enable input receives the LMDHDEN signal. The output of the latch 352 is connected to the third input of the multiplexor 296.

As can be seen, the data buffer 158 contains the necessary linkages and connections to allow data to be transferred between any two of the buses in either direction. Additionally, the buffer 158 contains sufficient latching to allow an entire burst write operation from the processor to be posted. Similarly, the multiple operations from the host bus can be posted or gathered until assembled for provision to the processor system if necessary. Further, a write operation from the processor to the host bus can be posted.

Referring now to FIG. 8, the latching logic is shown for the processor data to host or memory data bus signals. The PDHDLE* signal is provided to a buffer 360, whose output provided to the D inputs of a latch 362 and of a D-type flip-flop 364. The PCLK signal is provided to the inverted enable input of the latch 362 and to the clock input of a flip-flop 364. The inverted outputs of the latch 362 and flip-flop 364 are provided as the two inputs to a two input AND gate 366, whose output is the LPDHDEN signal. Similar arrangements of buffers, latches, flip-flops and AND gates are utilized with the PDMDLE*<3 .. 0> signals to produce the LPDMDEN<3 .. 0> signals.

Referring now to FIG. 9, the PDOE* signal is provided to a buffer 368 whose output is provided to the D input of a D-type flip-flop 370. The PCLK signal clocks the flip-flop 370. The noninverted output of the flip-flop 370 is the LPDOE* signal. Again, similar buffer and flip-flop arrangements are used with the PDSEL<1 .. 0>, HDPDLE<1 .. 0>, MDHDLE, MDPDLE, MDSEL<1 .. 0> and MDOE* signals to produce respectively, the LPDSEL<1 .. 0>, LHDPDEN<1 .. 0>, LMDHDEN, LMDPDEN, LMDSEL<1 .. 0> and LMDOE* signals.

Figure 10:
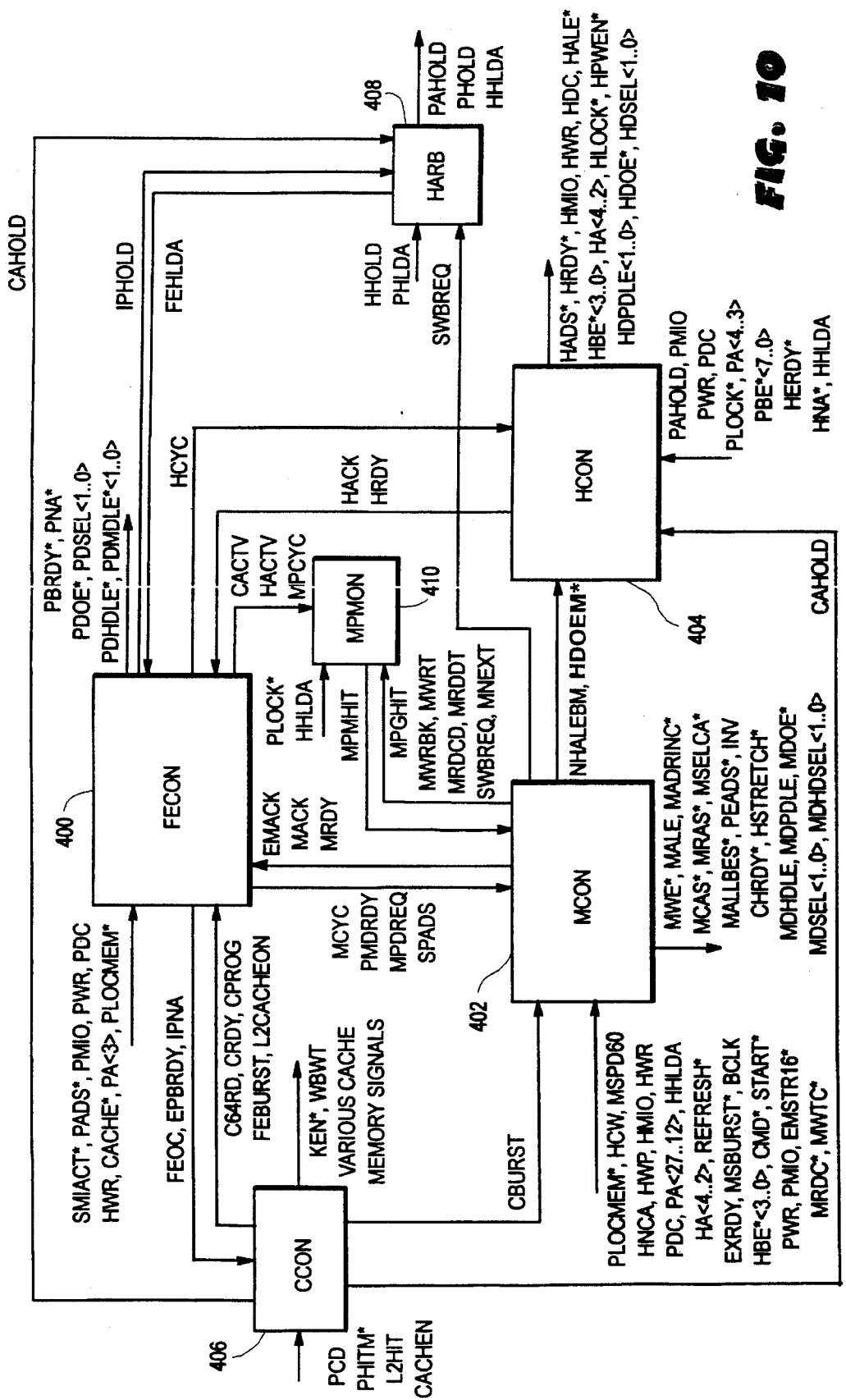
FIG. 10 is a block diagram of the major portions of the memory controller of FIG. 4.

Referring now to FIG. 10, portions of the memory controller 156 are shown. Preferably the memory controller 156 is organized as a series of interdependent blocks. Each of these blocks is logically organized to relate to a particular external unit, such as the L2 cache 154, the processor 152, the memory, the host bus H or arbitration, to which it is related. A first block is referred to as FECON or the front end controller 400. The FECON block 400 interacts with the processor 152 for receipt of cycle start signals from the processor 152 and provides signals which activate the MCON block 402 and the HCON block 404. Similarly, the FECON block 400 provides completion signals to the processor 152 when appropriate upon receipt of handshake signals from the MCON block 402 and the HCON block 404. The FECON block 400 also provides signals to the data buffer 158 to latch processor write data and enable processor read data. The MCON block 402 is the second major block and is the memory controller portion. The MCON block 402 interfaces with the address/control buffers 166 to provide the necessary control signals and the data buffer 158 to latch data from the memory and enable data to the memory. The HCON block 404 is the host bus control block and interfaces with the host bus H to provide the necessary signals for its operation. The HCON block 404 further communicates with the data buffer 158 to latch data from the host bus H and enable data to the host bus H. Both the MCON block 402 and the HCON block 404 have handshake communications with the FECON block 400 as will be more apparent in the description below.

A CCON block 406 is the L2 cache controller and interfaces with the FECON block 400 and the cache 154 to provide complete cache controller functions. Preferably the cache controller is a 256 kbyte, direct mapped, write through, lookaside cache for simplicity of logic and operations. A block 408 referred to as HARB or host arbitration block interfaces with the FECON block 400 to provide processor and host bus arbitration. The final block shown in FIG. 10 is the MPMON block 410 or memory performance monitor. In memory controller 156 of the preferred embodiment the memory performance monitor 410 is utilized to determine the state of the MRAS* signal at the end of a memory cycle. Effectively the MPMON block 410 is performing next operation prediction so that the MRAS* signal can be properly held low or raised high, depending upon whether the next operation has a probability of being a memory page hit or memory page miss. More of this will be described with the state machines described below.

Another block not shown in FIG. 10 for simplicity is the DDFCON or data destination facility control block. This is omitted for simplicity but provides the necessary and conventional signals to operate with the DDF 164 to allow it to be programmed and read. This operation will be apparent based on the previously referenced patent applications and the operation of the FECON 400.

Preferably the FECON block 400, MCON block 402 and HCON block 404 are comprised of a plurality of state machines, each acting independently and interdependently, and certain loose logic. Each state machine receives certain signals to commence its operation and proceeds according to the receipt of other signals. The various tasks necessary for the memory controller operation are split between these numerous state machines and between the control blocks as indicated, to allow pipelining and multiple concurrent cycles without requiring an overly complex single master state machine. By the use of the plurality of individual state machines each operation is allowed to proceed at its greatest possible rate, stopping only when another signal or information is necessary to allow it to proceed. This arrangement and operation will become apparent as the numerous state machines are described below and by reference to include timing diagrams. A number of these signals provided and utilized internal to the memory controller 156 and between the various control blocks are shown in FIG. 10. The listing is not necessarily complete but shows the more important signals. Further details of the CCON or cache controller 406 will not be provided as it is not particularly relevant to this operation except as necessary when certain cache operations are occurring.

Figure 11:
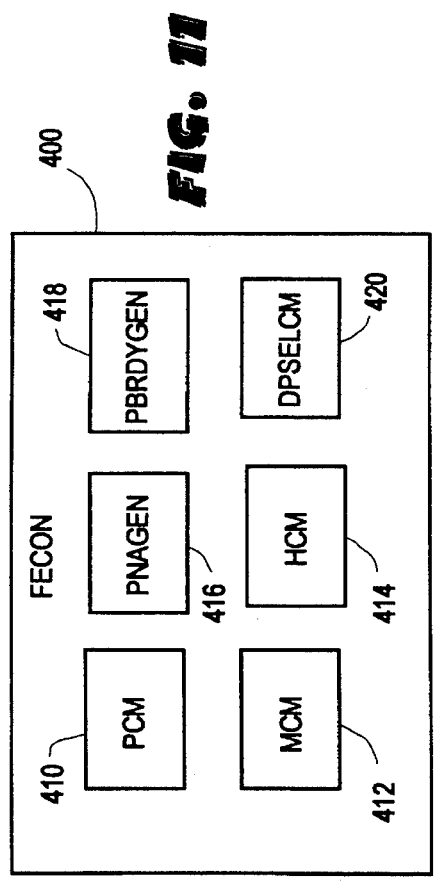

Referring now to FIG. 11, the FECON block 400 itself is made up of a series of sub-blocks or modules. The first block is the PCM or processor control module 410. This module 410 primarily receives the status signals from the processor 152 and starts operation of a cycle. A second block is the MCM or memory control module 412, which interfaces more directly with the MCON block 402. An HCM block 414 is used to interface with the HCON block 404. A block referred to as PNAGEN or processor next address generation 416 is utilized to provide the next address or NA* signal to the processor 152 to allow full use of address pipelining. A block 418 referred to as PBRDYGEN or processor burst ready generation is used to provide the ready signal to the processor 152 to indicate that the data portion of a cycle is completed and the next data portion can proceed. The final block is the DPSELCM block 420 which is used to select the data path from the MD bus or the HD bus to the PD bus.

Figure 12:
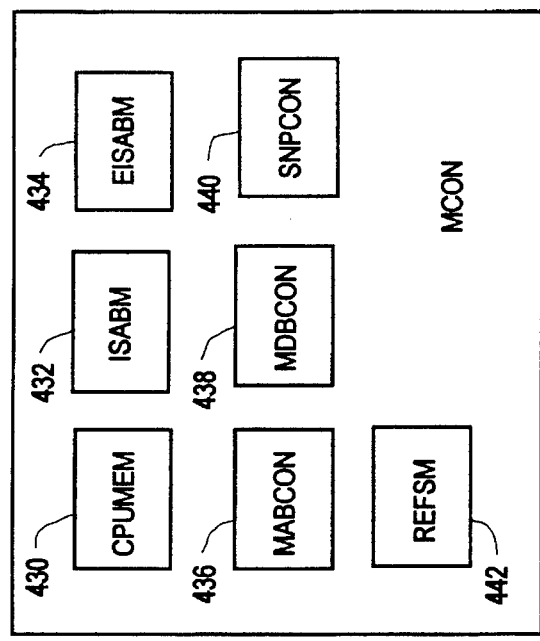

Referring to FIG. 12, the MCON block 402 is shown with its constituent sub-blocks. A block 430 is a CPUMEM block which effectively interfaces the processor 152 with the memory itself. Included in the CPUMEM block 430 is the processor memory state machine which is utilized to develop the RAS and CAS and other signals for processor cycles. Unless otherwise indicated, all state machines advance on rising edges of the PCLK or processor clock signal. A block 432 referred to as the ISABM or ISA bus master block is used to interface with ISA bus masters and it contains the memory state machine used with ISA bus masters. Similarly, a block 434 referred to as EISABM or EISA bus master provides the state machine and memory control when an EISA bus master is in control and is requesting memory operations. A block 436 referred to as the MABCON or memory address bus control block is utilized to handle the memory addressing related signals. A MDBCON or memory data bus controller block 438 is used to handle the latch enable and output enable signals of the data buffer 158 for memory and host transfers. A block 440 referred to as SNPCON or snoop control is used to indicate to the level 2 cache 154 and the processor 152 when snooping of a processor bus operation is appropriate to allow proper cache coherency and write-back operation. The final block is the REFSM or refresh state machine block 442 which controls refresh operations to the memory devices.

Figure 13:
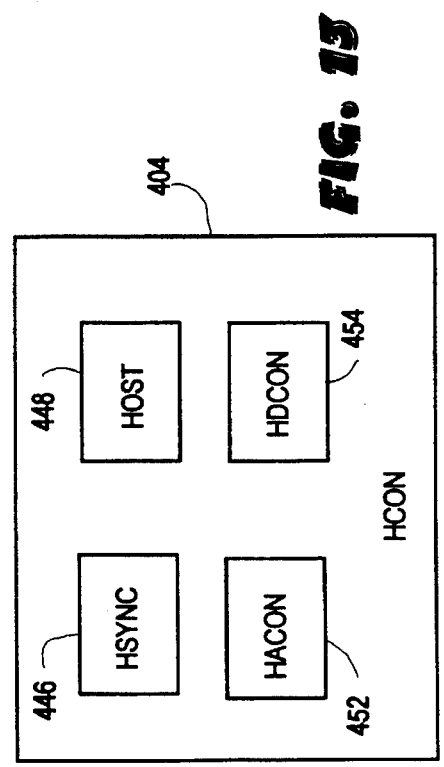

FIG. 13 is yet another similar block breakdown for the HCON block 404. The HSYNC or host synchronization sub-block 446 is used to track the host bus H to determine cycle operations. The HOST or host state machine block 448 is a host bus master used to drive operations from the processor 152 to the host bus H. A block 452 referred to as HACON or host address control handles address related signals, while a block 454 referred to as HDCON or host data control controls the data operations. It is understood that each of the blocks 400, 402 and 404 include other miscellaneous logic besides those sub-blocks shown.

Figure 14:
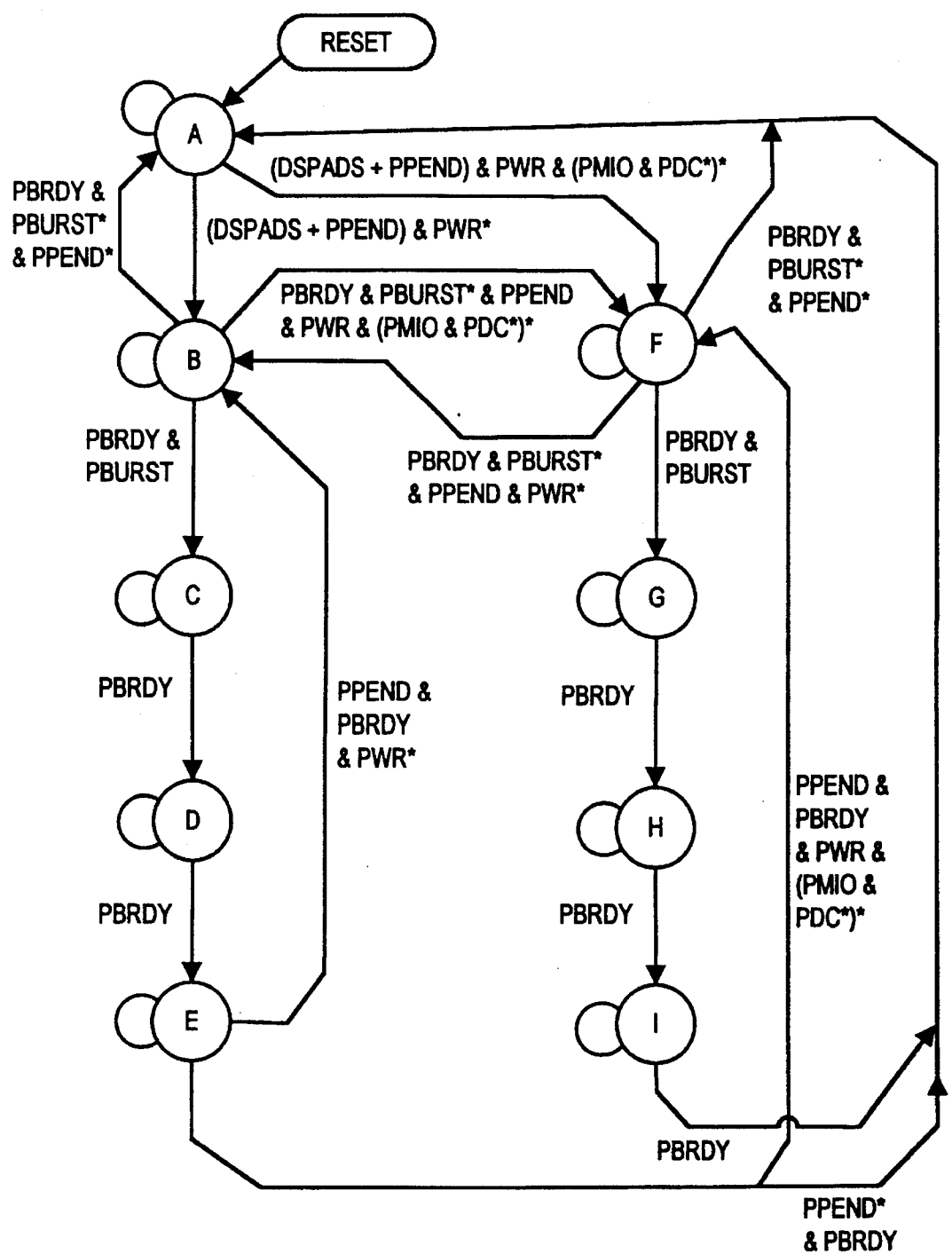

Proceeding now to FIG. 14, the first state machine in the PCM block 410 is shown. As previously noted, unless otherwise indicated, all of the state machines described herein advance on rising edges of the PCLK signal. This is the PPROG or processor cycle in progress state machine and is used for basic cycle tracking of the processor bus and provides two primary signals, the PPROG or processor cycle in progress in the memory controller 156 signal and the PEOC or processor end of cycle signal. Variations on these particular signals are provided for various modules. On reset, the PPROG state machine starts at state A, the idle state. The PPROG state machine proceeds from state A to state B when read operations, as indicated by the state of the PWR or processor write/read signal when a processor cycle is pending, as indicated by the PPEND signal as it has been pipelined, or upon receipt of the DSPADS or delayed synchronized processor ADS signal. The SPADS signal is the ADS* signal from the processor 152 which has been synchronized to the PCLK signal and inverted. The DSPADS signal is the SPADS signal delayed one PCLK signal cycle. Under these conditions control proceeds to state B. If the processor 152 is not performing a burst cycle in state B, the PEOC signal is provided during that state. Control proceeds from state B to state C while burst operations are occurring, as indicated by the PBURST signal, and when the previous data cycle is completed, as indicated by the PBRDY signal. Control proceeds from state B to state F when a cycle is pending, it is not a burst, the previous cycle has completed and the cycle that is pending is a valid write cycle, that is, it is not a memory code write. Control returns from state B to state A if no further cycles are pending, if a burst operation is not occurring and after the data transfer has been completed as indicated by the PBRDY signal, thus indicating an idle condition. In all other cases, particularly when the PBRDY signal has not been asserted, control remains at state B.

Control proceeds from state C to state D when the PBRDY signal is asserted to indicate that a data operation has been completed and otherwise remains in state C. Control proceeds from state D to state E when the next data operation has been completion as indicated by the PBRDY signal. Otherwise control remains at state D. There are three possible exits from state E and a looping at state E. The PEOC signal is asserted in state E. If the final data value of the burst has been indicated as being transmitted, another cycle is pending, and it is a read operation which is pending, control proceeds from state E back to state B and the next cycle proceeds. If the data value is indicated as being provided and a cycle is not pending, control returns to state A. If a cycle is pending, it is a valid write cycle and the data transfer has been completed, control proceeds to state F to begin a write operation. In all other cases, particularly until the data operation has been completed, control remains at state E.

Control proceeds from state A to state F if a valid write operation is indicated and a cycle is pending or the DSPADS signal is active. Control remains in state A during all cycles which are not transfers to states B or F. In state F the PEOC signal is asserted if a burst operation is not occurring. If a burst operation is not occurring, the data transfer has been completed as indicated by the PBRDY signal and no cycle is pending, control proceeds from state F to state A and idles until the next cycle. If the data has been transferred as indicated by the PBRDY signal and a burst operation is occurring, control proceeds to state G. If a read cycle is pending, a burst is not occurring and the data transfer has occurred, control proceeds to state B. Otherwise control remains at state F, particularly until data is ready. Control proceeds from state G to state H if the PBRDY signal is provided and otherwise remains in state G. Control proceeds from state H to state I upon receipt of the PBRDY signal and otherwise remains at state H. In state I the PEOC signal is asserted. Control proceeds from state I to state A when the PBRDY signal is asserted and otherwise remains in state I. In all states other than state A the PPROG or processor cycle in progress signal is asserted.

Figure 15:
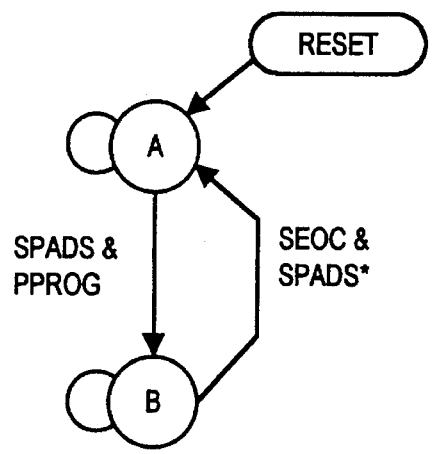

As indicated in discussing the PPROG state machine, the signal referred to as PPEND or processor cycle pending is necessary to allow full use of pipelining. This signal is provided by the PPEND state machine shown in FIG. 15. This is a simple two state state machine which is used to indicate that a processor cycle has been requested while one is currently in progress. Upon reset, the PPEND state machine proceeds to state A, the idle state. Control proceeds from state A to state B if the SPADS or synchronized processor ADS signal is received and the PPROG signal is true. In state B the PPEND signal is asserted. Control proceeds from state B back to state A upon receipt of the SEOC signal, which is a PCLK synchronized version of the ANDing of the PBRDY signal and PEOC signal, when the SPADS signal is not asserted. Otherwise control remains in state B.

Figure 16:
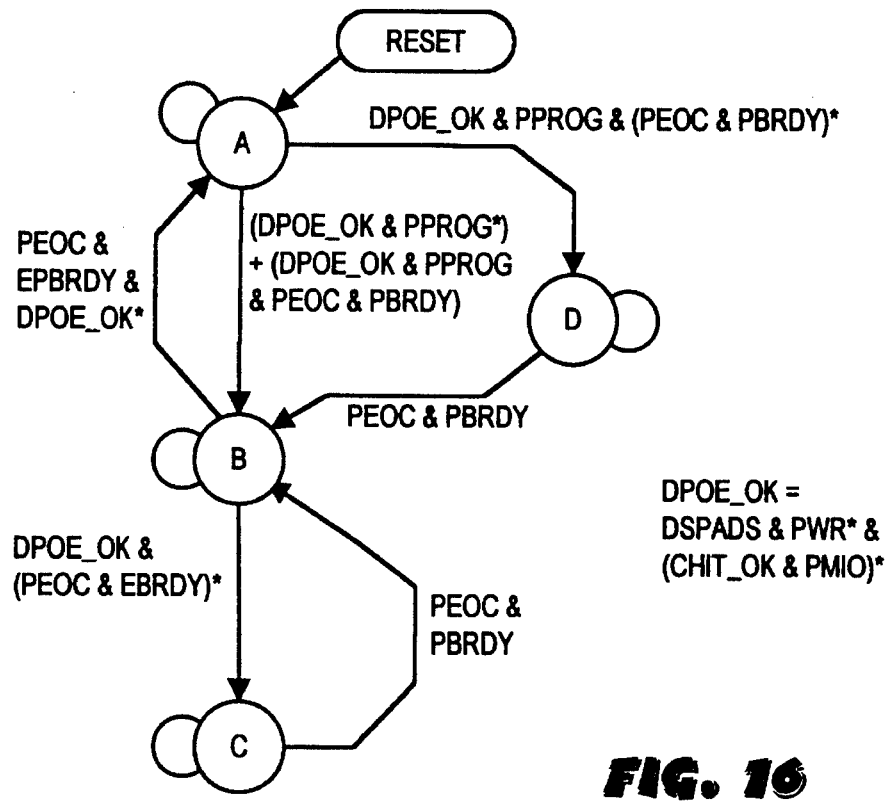

The PCM module 410 is also responsible for developing the PDOE* signal. This is done in the DPOE state machine as shown in FIG. 16. Control initiates at state A upon reset. Control proceeds to state D, a wait state, if the memory system was currently providing an output as indicated by the DSPADS signal occurring during a read cycle which is not a memory cache hit when a cycle is in progress (this being the DPOE_OK signal definition) and the data transfer has not completed as indicated by the PEOC and PBRDY signals. Thus in this mode in state D the DPOE state machine is waiting for the PD bus to become ready. Control proceeds from state D to state B upon receipt of the PEOC and PBRDY signals to indicate that the data operation is completing, or from state A to state B if this is a non-cache hit memory read cycle and a cycle is not currently in progress or if it is a DPOE_OK condition, a cycle is in progress and the end of that cycle is indicated by the PEOC and PBRDY signals. In all other cases control remains at states A and D, as appropriate.

Control proceeds from state B to state A if this is other than a DPOE_OK cycle, an end of cycle has occurred and upon receipt of a signal referred to as EPBRDY or early processor bus ready, which indicates that in the next clock cycle the PBRDY signal will be asserted. In this case the cycle is effectively completed and the output control will be able to be turned off because as indicated in the data buffer 158, the DPOE signal which actually controls output is one PCLK signal cycle delayed because of the internal synchronizing flip-flop. Control proceeds from state B to state C if it is proper to provide an output as indicated by the DPOE_OK signal being active and the cycle is not completed or an early ready has not been received. In all other cases control remains at state B. Control returns from state C to state B upon receipt of the PEOC and PBRDY signals and otherwise remains at state C. It is noted that when the next state will be state B or state C or the state machine is in state C, the PDOE* signal is active, that is asserted low. Thus in this manner for non-cache hit read cycles by the processor 152 the output enable is active at the proper time. In general when referring to signals in this description, an asterisk (*) after a signal mnemonic indicates that it is logically true when a low voltage level is present and is the inverse of the signal mnemonic without an asterisk and angle brackets with included numbers after a signal mnemonic are used to indicate single or multiple bit positions in a wider logical signal, such as the data or address fields. Also for this description, state machine transition conditions are based on the level of the indicated signal, not its logical state.

Certain miscellaneous signals are also produced in the PCM module 410. The first of these is the FEHLDA or front end hold acknowledge signal. This is the output of a D-type flip-flop clocked by the PCLK signal which has an input of the output of an AND gate which receives as inputs signals indicating none of processor, cache, memory, host bus read and host bus write cycles are in process and a processor bus hold request has been received. The second signal of interest is the PBURST signal which is provided by the output of a D-type flip-flop clocked by the PCLK signal and is provided at the beginning of cycles which are processor cachable, such as cache line fills and write-backs, or are L2 cache 154 read allocations, and is removed at the end of the final one of the series of such cycles.

Figure 17:
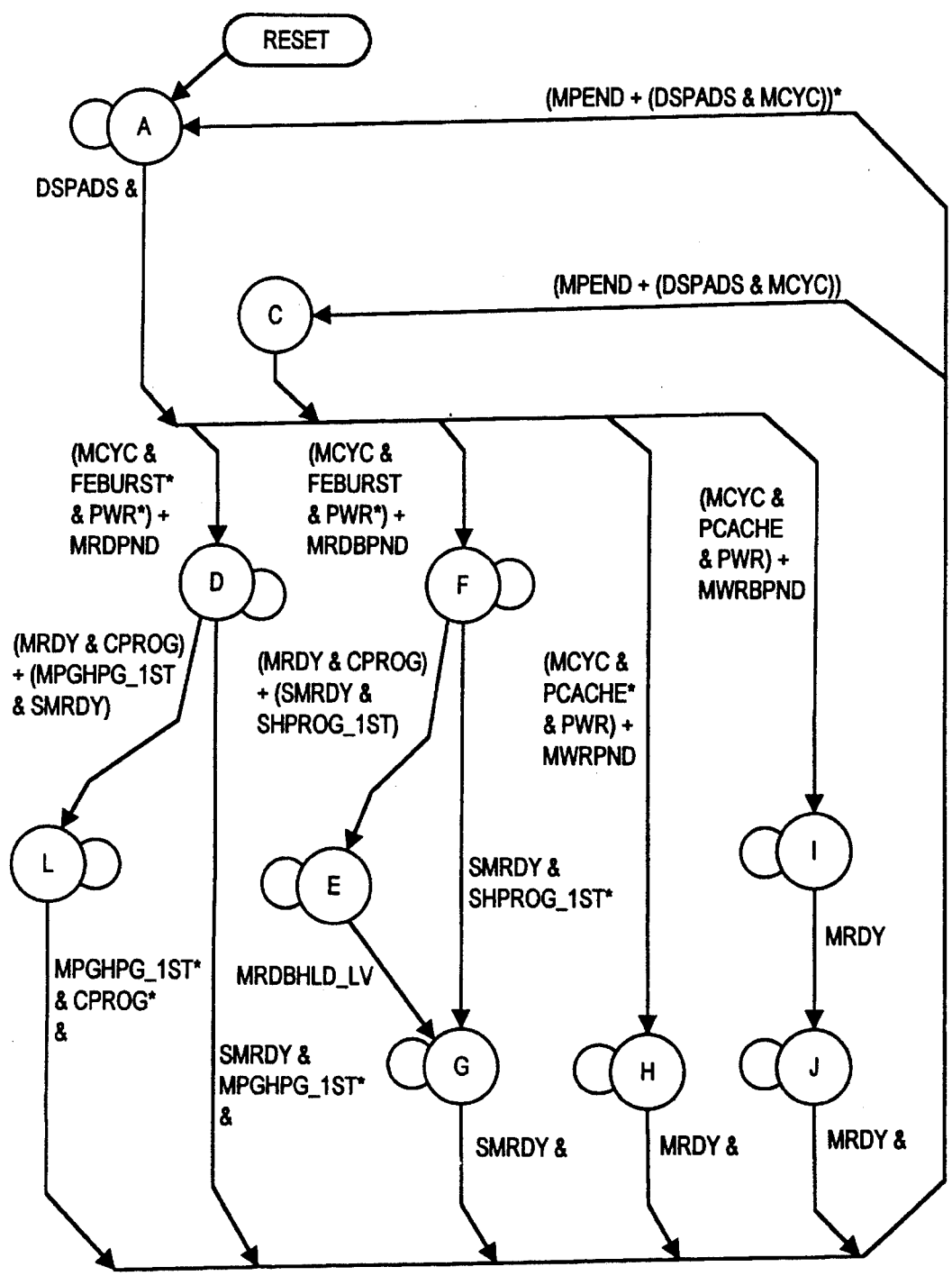

Proceeding now to FIG. 17, the first state machine in the memory control module 412 is the MPROG or memory in progress state machine. The state machine begins at state A upon reset. There are four basic paths out of state A, relating to single memory read cycles, burst memory read cycles, single memory write cycles and memory write-back or burst write cycles. Control transfers from state A to state D, which is used for single memory read cycles, when DSPADS signal is active, a memory cycle is indicated by the MCYC signal, a L2 cache line fill burst cycle is not in progress as indicated by the FEBURST* signal and a read is indicated. An L2 cache line fill operation is always also a processor 152 cache line fill as a processor 152 cache line fill miss is the cause of the L2 cache 154 line fill. A processor 152 cache line fill supplied by the L2 cache 154 is not an operation directed to the the main memory and is treated as any other cache hit. Control returns from state D to state A if the SMRDY or synchronized memory ready signal is provided and a cycle was not already in progress on the host bus prior to this memory cycle, as indicated by the MPGHPG_1ST signal, and neither a memory cycle is pending nor is another memory cycle starting. The MPGHPG_1ST signal is used to delay the return of data so that concurrent read cycles to the host bus H and memory do not get out of order. Control proceeds from state D to state L if the memory is ready and a cache cycle is in progress or if the SMRDY signal has been received and a host bus cycle was started first. Control proceeds from state D to state C if the memory indicates ready, a host bus cycle was not already in progress and either another memory cycle is pending or another memory cycle is being initiated. Otherwise control remains at state D.

Control proceeds from state L to state C if a host cycle was not already in progress, a cache cycle is not in progress and either another memory cycle is pending or another memory cycle is commencing. Control proceeds from state L to state A if an uncompleted host cycle was not already in progress, a cache cycle is not in progress and neither a memory cycle is pending nor is another memory cycle commencing. In all other cases, control remains at state L.

If a memory burst read is occurring, control proceeds from state A to state F as indicated by the DSPADS signal being true, a memory cycle being indicated, a L2 cache line fill burst cycle being indicated and a read cycle being indicated. Control proceeds from state F to state E if either the memory operation has indicated that it is ready and a cache cycle is in progress or if the ready has previously indicated and a host bus cycle was in progress first. Otherwise, if the memory control has indicated that it was ready as indicated by the SMRDY signal and a host bus cycle was not already in progress, control proceeds from state F to state G. Otherwise control remains at state F. Control transfers from state E to state G when a signal referred to as MRDBHLD_LV or memory read burst hold leave is active, indicating completion of the burst. The development of the MRDBHLD_LV signal is described below. Otherwise, control remains at state E.

Control transfers from state G to state C if the memory has indicated that it was ready and either a memory cycle is pending or a memory cycle is being indicated as commencing. Control transfers from state G to state A if the memory has indicated its completion and there is neither a memory cycle pending nor a memory cycle commencing. In other cases, control remains at state G pending the memory completion.

For single memory write cases, control transfers from state A to state H based on the DSPADS signal, MCYC and PWR signals being high and an indication that this is not a processor cachable cycle. Control proceeds from state H to state C when the memory indicates that it is ready and either a memory cycle is pending or is commencing. Control proceeds from state H to state A if the memory indicates that it is ready and there is neither another memory cycle pending nor a cycle commencing. In all other cases control remains at state H, generally awaiting completion of the memory operation.

In the final case for exiting state A, control proceeds from state A to state I for memory write-back cycles. This is indicated by the DSPADS signal being true, a memory cycle start is indicated by the MCYC signal, the PCACHE or processor cachable signal is present, and a write is occurring. Control proceeds from state I to state J when the memory indicates that it is ready. Otherwise control remains at state I. Control proceeds from state J to state C if the memory is ready and either another memory cycle is pending or another memory cycle is commencing. Control proceeds from state J to state A if the memory cycle is completed as indicated and neither another memory cycle is pending nor commencing. Two readys are necessary in the preferred embodiment in this case as the processor data cache line size is 256 bits or two memory operations. Otherwise control remains at state J.

Control proceeds from state C to state D if a memory cycle is indicated by the MCYC signal, it is not a burst and it is a read or if a signal referred to as MRDPND or memory read pending is indicated as true. The MRDPND signal development is described below. Control proceeds from state C to state F for read burst cases as indicated by a memory cycle indication, a burst indication and a read or by the presence of the signal MRDBPND for memory read burst pending. Control proceeds from state C to state H on the indication of a memory cycle, the fact that it is not processor cacheable and that it is a write, that is a single write cycle, or the MWRPND signal is active indicating a memory write has been presented. In all other cases, that is cache write-backs, control proceeds from state C to state I.

The MPROG state machine produces several signals. These signals are as follows:

MRD=MPROG STATE D
MRDHLD=MPROG STATE L
MRDBHLD=MPROG STATE E
MRDB1=MPROG STATE F
MRDB2=MPROG STATE G
MWR=MPROG STATE H
MWRB1=MPROG STATE I
MWRB2=MPROG STATE J
MPDREQ=(MPROG STATE E+MPROG STATE L)*
MPROG=(MPROG STATE A+MPROG STATE C)*
EMPROG=(MPROG STATE A+MPROG STATE C+MPROG NEXT STATE A+MPROG NEXT STATE C)*
MEMRD=(MCYC & PWR*)+MRD+MRDB1+MRDB2+MRDHLD+MRDBHLD
MEMWR=MWR+MWRB1+MWRB2

Thus it can be seen that the MPROG state machine indicates when memory cycles are present in the memory system by providing the MPROG, MEMRD, MEMWR and other signals.

Figure 18:
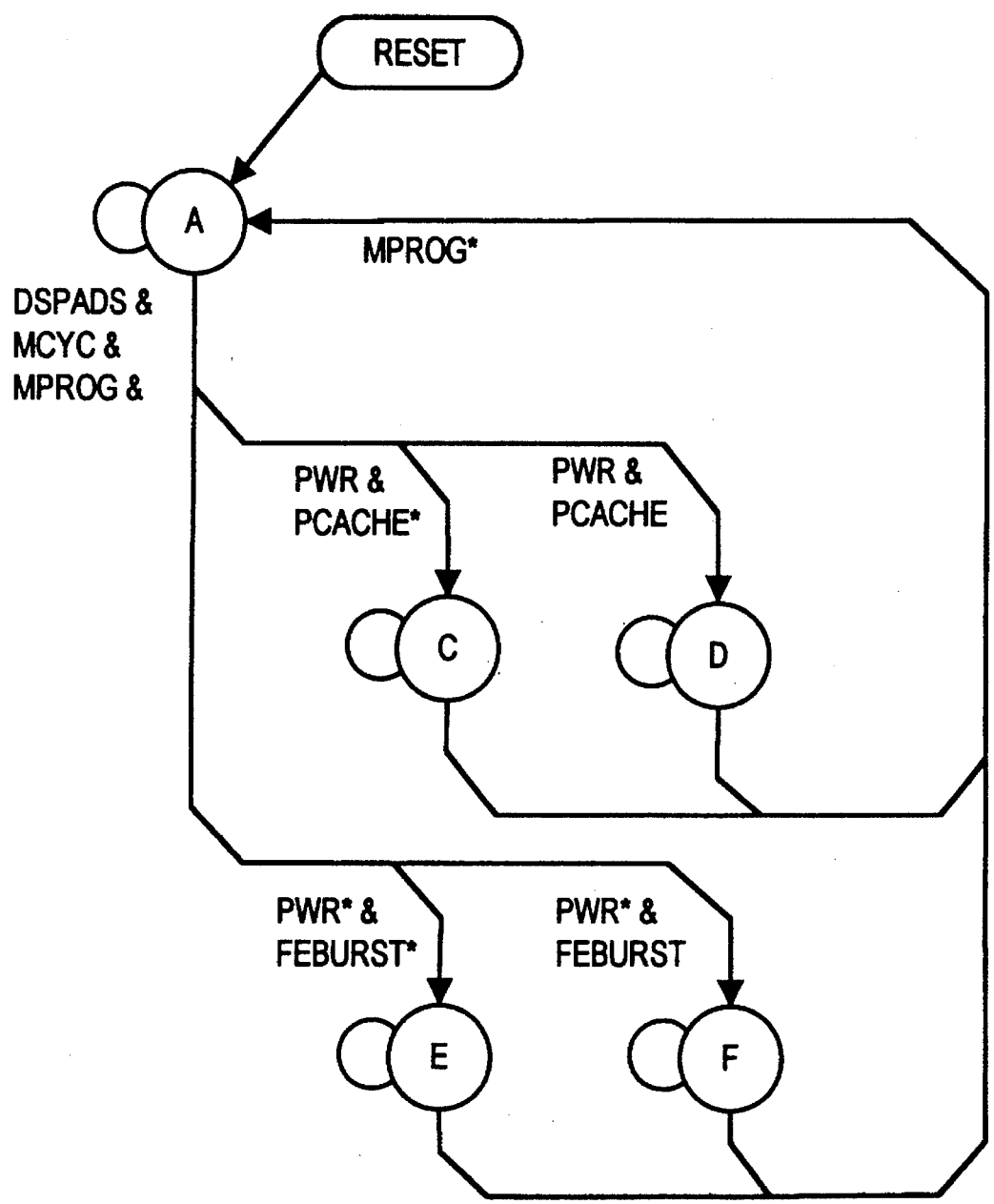

Referring now to FIG. 18, the MPEND or memory pending state machine is shown. As noted above, the MPROG state machine utilizes as one of its branching conditions the fact that a memory cycle is pending. This signal is provided by the MPEND state machine. Upon reset the MPEND state machine proceeds to the idle state or state A. There are four exits from state A, one for each of single memory read cycle, burst memory read cycle, single memory write cycle and memory write-back cycle cases. Control proceeds from state A to state C when the DSPADS signal, the MCYC signals and the MPROG or memory in progress signals are true and a write is indicated and it not a processor cacheable operation. Thus this is the single write case. Control remains in state C while a memory cycle is in progress as indicated by the MPROG state machine. Otherwise control proceeds to state A.

Control proceeds from state A to state D for memory write-back cycles as indicated by the DSPADS, MCYC and MPROG signals being true and a write indication and an indication that it is processor cacheable. Control proceeds from state D to state A when a memory cycle is not active and otherwise remains in state D. Control proceeds from state A to state E for memory cycles which are reads while a memory cycle is in progress and which are not bursts. This is indicated by the DSPADS, MCYC and MPROG signals being true and a read being indicated in a non-burst case. Control proceeds from state E to state A when the memory cycle in progress has been completed and otherwise remains at state E pending completion. Control proceeds from state A to state F if the DSPADS, MCYC and MPROG signals are true, indicating a memory cycle is in progress and another one is requested, it is a read cycle and bursting is indicated. Control proceeds from state F to state A when the current memory cycle in progress is completed. Otherwise control remains at state F. The MPEND or memory cycle pending signal is true when states C or D are to be entered as the next state or when the state machine is in states C, D, E or F. The MWRPND signal is true when the next state is state C or the current state is state C. The MWRBPND signal is true when the next state is state D or the current state is state D. The MRDPND signal is true during state E, while the MRDBPND signal is true during state F.

The MCM module 412 is also responsible for indicating when data is to be latched into the data buffer 158 from the processor data bus on write cycles. In the case of single write operations data is latched into latches 272 and 274, while in burst operations all four latches are utilized. However, it is noted that in a single write case the DPMLE1 signal is actually not generated as the decode later indicates that only a single write is necessary.

Figure 19:
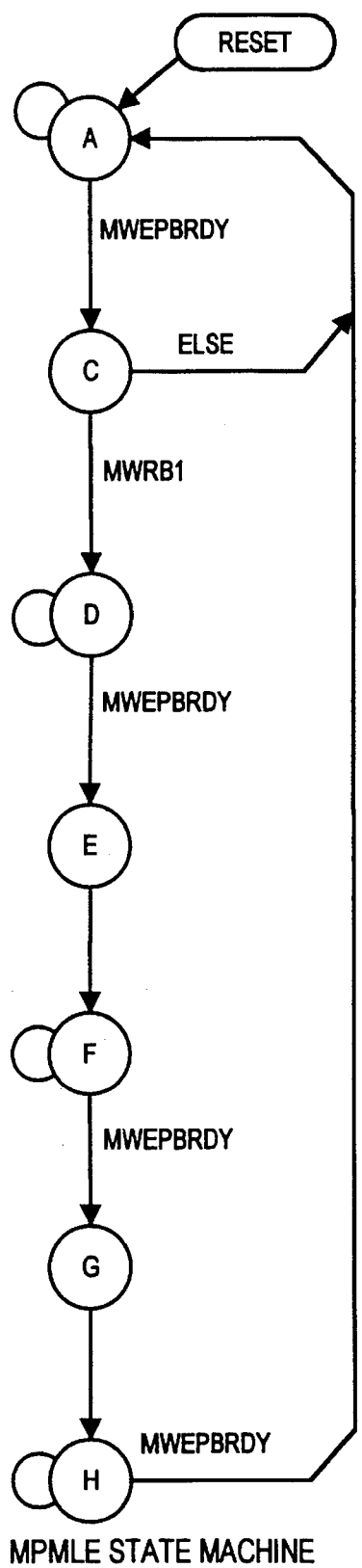
Figure 21:
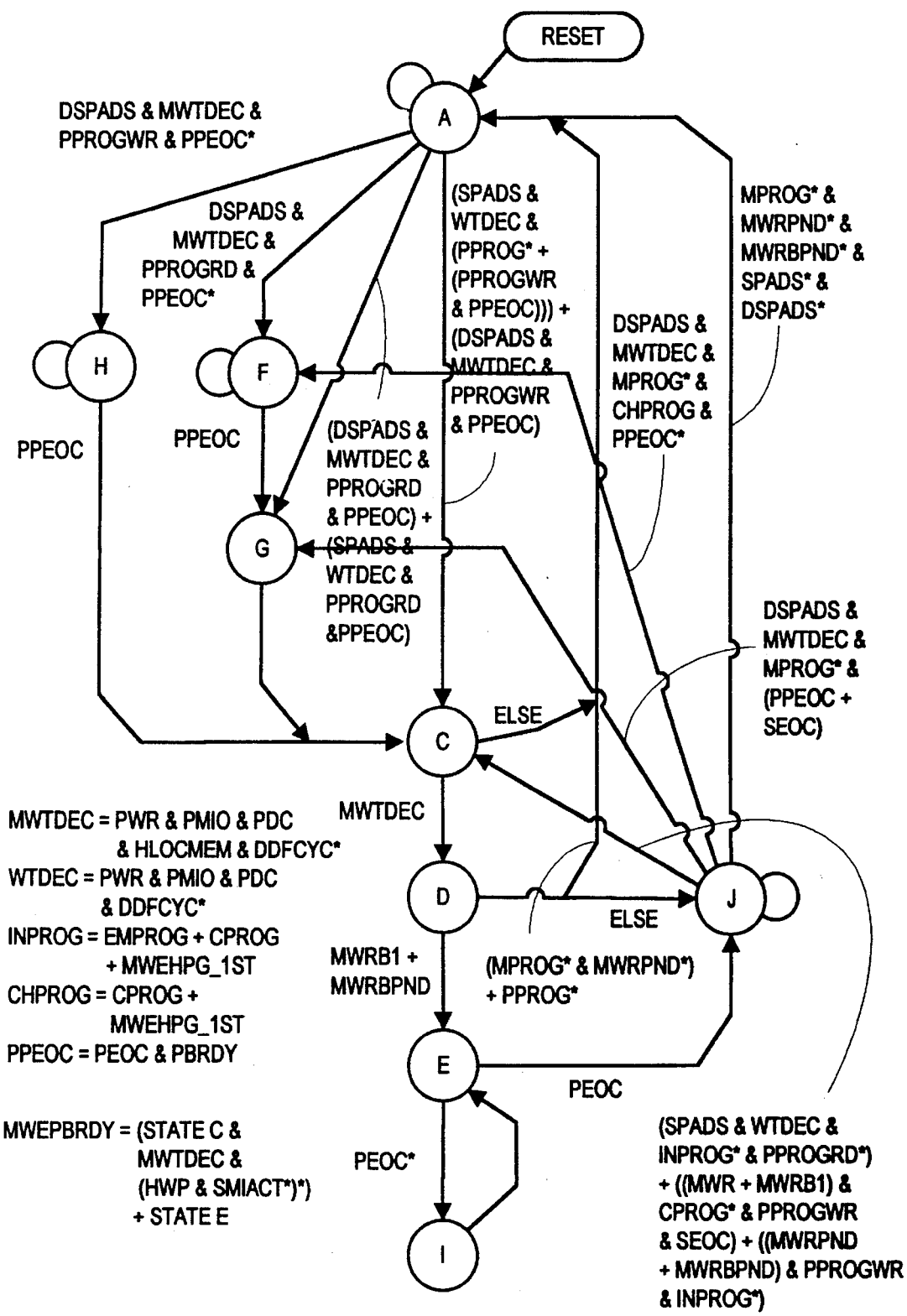

Upon reset of the system the MPMLE or processor to memory latch enable state machine shown in FIG. 19 starts at state A. The signals referred to as SET_DPMLE0 and SET_DPMLE1 are active in state A when the MWEPBRDY signal or memory write early PBRDY signal is provided. Additionally, the DPMLE1 signal is provided in state D when the MWEPBRDY signal is active. Control proceeds from state A to state C when the MWEPBRDY signal is received from the MWEPBRDY state machine (FIG. 21) indicating that this write cycle has been posted and it is appropriate to proceed to the next cycle. When the MWEPBRDY signal has not been received, control remains at state A so that the first two latches remain open. Control proceeds from state C to state D if the MPROG state machine has indicated that this is a burst write situation and the first portion is proceeding as indicated by the MWRB1 signal. Otherwise control proceeds from state C back to state A. If the burst operation is occurring, the CLR DPMLE1 signal is asserted in state C so that the latch signal is inactivated so that it can be made active again in state D. Control remains in state D until the MWEPBRDY signal is provided, indicating that the next of the write cycles has been posted. Otherwise control remains in state D. Additionally in state D the SET_PMDRDY signal or set processor memory ready signal is provided when the MWEPBRDY signal is indicated so that a PMRDY signal can be provided to commence the actual write cycle to the memory. Control proceeds from state E to state F in all cases. State F is utilized for the third write cycle in the burst sequence and control remains at state F while the MWEPBRDY signal is not being asserted, that is, to indicate that this cycle has not been successfully posted. When state F is active and the MWEPBRDY signal is asserted the SET_DPMLE2 signal is asserted so that the latch 276 will be closed. Control proceeds from state F to state G when the posting of the cycle has been indicated. Control proceeds from state G to state H after a single PCLK signal cycle. State H is the final of the four write cycles in the write-back operation and control remains in state H until the MWEPBRDY signal is asserted, at which time control proceeds to state A. The SET_DPMLE3 signal is asserted in state H when the MWEPBRDY signal is provided. Additionally, the SET_PMDRDY signal is provided in state H when the MWEPBRDY signal is provided to indicate full width memory data can be provided to the memory.

Figure 20:
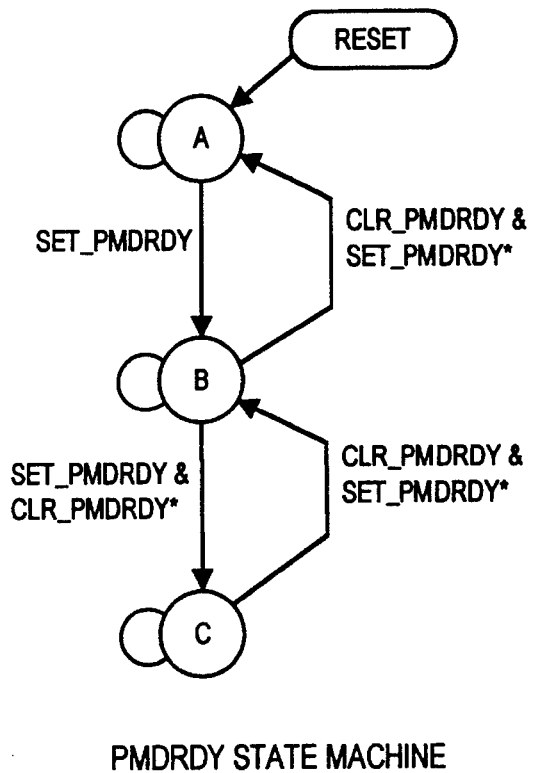

As indicated in the discussion of the MPMLE state machine, the signal SET_PMDRDY indicates that data has been transferred into the posting buffers and can be transferred. This signal is utilized by the PMDRDY state machine shown in FIG. 20. This state machine commences operation in state A after reset. If the SET_PMDRDY signal is received, control proceeds from state A to state B. Otherwise control remains in state A. From state B, control proceeds to state C if the SET_PMDRDY signal is active and there is no indication to clear PMRDY signal as being provided by the CLR_PMRDY, signal. The CLR_PMRDY signal is the ANDing of the MRDY signal and the OR of the MWR, MWRB1 and MWRB21 signals. Thus, clearing the PMRDY signal is appropriate if the memory has indicated that it is ready and a write operation, either single or burst, is indicated as being in progress. Control proceeds from state B to state A if clearing of the PMDRDY signal is appropriate and the SET_PMDRDY signal is not active. Otherwise control remains in state B. Control proceeds from state C to state B if it is appropriate to clear the PMDRDY signal and its not set. Otherwise, control remains in state C. The PMDRDY state machine thus provides PMDRDY signal to indicate to the memory control section that the write posting buffer has been filled. The PMDRDY signal is active in states B and C or when the MWR_PMDRDY signal is provided by the MPMLE state machine, which is true when that state machine is in state A, the MWEPBRDY signal has been received and this is a single write operation. Thus the operation commences in state A and proceeds to state B when the first 128 bits is available and to state C if a second 128 bits is available and the first 128 bits has not been actually written to the memory system. As each 128 bits is actually written the PMDRDY state machine backtracks from state C to state B to state A.

As noted above, the transitions in the MPMLE state machine are based primarily on the presence of the MWEPBRDY signal. This signal is provided by the MWEPBRDY state machine shown in FIG. 21. Upon reset this state machine starts in state A, the conventional idle state. Control proceeds from state A to state C if the SPADS signal is active, a memory data write cycle is decoded and either a processor cycle is not in progress or a processor write cycle is completing or, in a second alternative, if the DSPADS signal is present, a main memory data write cycle is decoded and a main memory data write cycle is in progress and completing. Control proceeds from state A to state F if the DSPADS signal is active, a local memory data write cycle is decoded, a read cycle is in progress and has not completed. Control proceeds from state A to state G if the DSPADS signal is active, a main memory data write cycle has been decoded and a memory read cycle is completing, or if the SPADS signal is active, a memory data write cycle has been decoded and a read cycle is completing. Control proceeds from state F to state G when the PPEOC signal is received and otherwise remains in state F. Control always proceeds from state G to state C. Control proceeds from state A to state H if the DSPADS signal is active, a main memory data write cycle has been decoded and a memory write cycle is active but not completing. In all other cases control remains at state A. Control proceeds from state H to state C when the PPEOC or end of cycle signal is received and otherwise remains in state H.

Control proceeds from state C to state D if a main memory data write cycle is decoded and otherwise returns to state A. Control proceeds from state D to state E if the first portion of a write-back is in progress as indicated by the MWRB1 signal or if a write-back is pending. Control proceeds from state D to state A if a memory cycle is not in progress and a memory write cycle is not pending or if a processor cycle is not in progress. In all other cases control proceeds from state D to state J. Control proceeds from state E to state J if the PEOC signal is active, indicating that the cycle is completing. In all other cases control proceeds from state E to state I. Control always proceeds from state I to state E.

There are numerous exits from state J. Control proceeds from state J to state C if the SPADS signal is active, a memory data write is decoded and a memory cycle is not about to commence, a cache cycle is not occurring, and a host bus cycle is not occurring and if a processor read cycle is not occurring or, as a second condition, if a single write cycle or a first portion of a write-back cycle is occurring, a cache cycle is not in progress and the currently in progress write cycle is about to complete or, as a third condition, if a memory write cycle or memory burst write cycle is pending, a write cycle is in progress and no other cycles are in progress. Control proceeds from state J to state F if the DSPADS signal is active, a main memory data write cycle is decoded, a memory cycle is not in progress, the cycle is not completed to the processor and either a cache cycle is in progress or a host bus cycle is in progress. Control proceeds from state J to state G if the DSPADS signal is true, a main memory write data cycle has been decoded, a memory cycle is not in progress and the current cycle is completing. Control proceeds from state J to state A if a memory cycle is not in progress, a memory write cycle is not pending, a memory burst write cycle is not pending and both the SPADS and DSPADS signals are not asserted. In all other cases, control remains at state J.

The MWEPRDY signal is asserted by this state machine when the state machine is in state C, a main memory data write cycle is decoded and the write cycle is not to a write protected memory location as indicated by the HWP signal being low or the SMIACT signal being high. Further, the MWEPBRDY signal is also active during state E. The MWEPBRDY signal is considered an early ready signal for local memory write operations and it will be combined with other early ready signals and resynchronized to actually provide the PBRDY signal. As a result, it is provided one PCLK signal cycle earlier then the PBRDY signal and so is considered early. The assembly of these early ready signals is described below.

Figure 38:
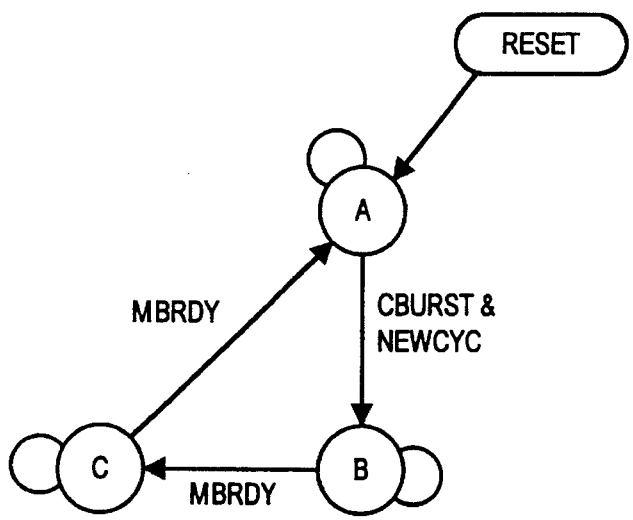

The memory control module 412 is also responsible for developing an early ready signal for main memory read operations. This signal is provided by the MREPBRDY state machine as shown in FIG. 22. This state machine begins operation on reset at state A. Control proceeds from state A to state B if a host bus cycle has not already started, a cache cycle is not in progress and either the memory is ready and a single memory read cycle has occurred or the memory is ready and a memory read burst cycle is occurring or, as a second alternative, if a memory early ready start signal has been received. In all other cases control remains at state A. The development of the MRERDY_STRT signal is shown in FIG. 38I.

The MRDHLD and MRDBHLD signals are provided to an OR gate 820. The output of the OR gate 820 is combined with the SHPROG_1ST and HPROG* signals by AND gate 822. The MRDHLD and MRDBHLD signals are also provided to an OR gate 824. The output of the OR gate 824 and the CPROG* and HPROG_1ST* signals are combined by AND gate 826. An OR gate 828 receives the outputs of the AND gates 822 and 826 and provides an output to the D input of a D-type flip-flop 830, which is clocked by the PCLK signal. The SHPROG_1ST, MEMRD and SMRDY signals are combined by an OR gate 832, whose output is combined with the MRDHLD and MRDBHLD signals by OR gate 834. The output of the OR gate 834 is combined with the CPROG* and HPROG_1ST* signals in an AND gate 836. The noninverted output of the flip-flop 830 and the output of the AND gate 836 are the inputs to an OR gate 838, whose output is the MRERDY_STRT signal.

Control proceeds from state B to state C if this is a memory read burst cycle or a memory read burst cycle is being held for host or cache bus operations. In all other cases control proceeds from state B to state A. Control proceeds from state C to state D in all cases and from state D to state E in all cases. Control remains at state E until the MRDY or memory ready signal is received from the memory controller block 402 and at that time proceeds to state F. Control then proceeds sequentially from state F to state G to state H to state A on successive PCLK signal cycles.

The MREPBRDY or memory read early PBRDY signal is asserted in state B, D, F and H as appropriate for single and burst operations. The MRDBHLD exiting signal, referred to as MRDBHLD_LV, is provided in state C to the MPROG state machine as previously described.

In addition, certain miscellaneous logic is present in the memory control module 412. One of the functions of this miscellaneous logic is to produce the PDMDLE*<3 .. 0> signals from the SET_DPMLE<3 .. 0> signals. The development of these signals is shown in FIG. 23. The MWR signal, asserted in state H of the MPROG state machine, is an input to a two input OR gate 500 and a two input OR gate 502. The MWRB1 signal or first portion of a write-back cycle is provided to the second input of the OR gate 500. The MWRB2 or second write-back cycle portion signal, asserted in state J of the MPROG state machine, is provided to the second input of the OR gate 502 and indicates the second 128 bits of a write-back cycle. The MRDY or memory ready signal from the memory controller block 402 is provided as one input to two NAND gates 504 and 506. The second input to the NAND gate 504 is the output of the OR gate 500, while the second input to the NAND gate 506 is the output of the OR gate 502. The output of the NAND gate 504 is one input to an AND gate 508, whose second input is the noninverted output of a D-type flip-flop 510. The output of the AND gate 508 is provided to one input of a two input OR gate 512, whose second input receives the SET_DPMLE0 signal. The output of the OR gate 512 is provided to the D input of the flip-flop 510. The noninverted output of the flip-flop 510 is the PDMDLE*<0> signal.

The output of the NAND gate 504 is also provided to an inverted input of a two input NOR gate 514, whose second input is not inverted and receives the CLR_DPMLE1 signal. The output of the NOR gate 514 is provided as one input to a two input AND gate 516, whose second input receives the noninverted output of a D-type flip-flop 518. The output of the AND gate 516 is provided as one input to a two input OR gate 520, whose second input receives the SET_DPMLE1 signal. The output of the OR gate 520 is provided to the D input of the flip-flop 518. The noninverted output of the flip-flop 518 is the PDMDLE*<1> signal.

The output of the NAND gate 506 is provided as one input to a two input AND gate 522, with the second input to the AND gate 522 provided by the noninverted output of a D-type flip-flop 524. The output of the AND gate 522 is provided as one input to an OR gate 526, whose second input is the SET_DPMLE2 signal. The output of the OR gate 524 is provided to the D input of the flip-flop 524. The noninverted output of the flip-flop 524 is the PDMDLE*<2> signal. The output of the NAND gate 506 is also provided to one input of a 2 input AND gate 528, whose second input receives the inverted output of a D-type flip-flop 530. The output of the AND gate 528 is provided to one input of a two input OR gate 532, whose second input receives the SET_ DPMLE3 signal. The output of the OR gate 532 is provided to the D input of the flip-flop 530. The noninverted output of the flip-flop 530 is the PDMDLE*<3> signal. The PCLK signal is provided as the clocking input to the flip-flops 510, 518, 524 and 530.

Figure 24:
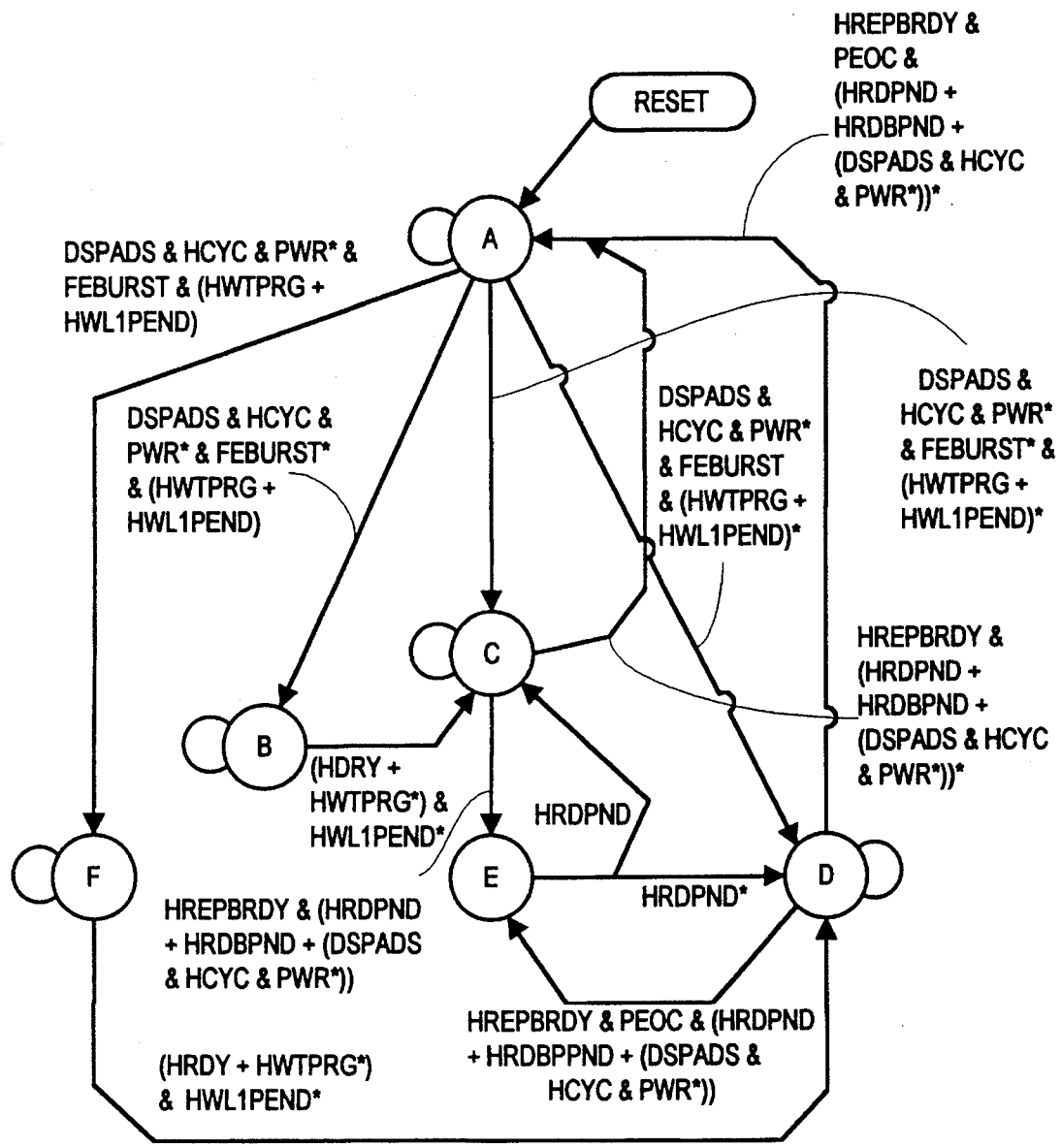

In a manner similar to the memory control module 412, the host control module 414 also includes a series of state machines. The first of these is the HRD or host read state machine shown in FIG. 24. The state machine tracks the read cycles, either single or burst, that are running or executing on the host bus H. The HRD state machine starts at state A upon reset. Control proceeds from state A to state B when the DSPADS signal is active, a host cycle read which is not a burst is requested and either a host write cycle is in progress or one is pending. Control proceeds from state A to state F if the DSPADS signal is active, a host read cycle is requested, it is a burst cycle and either a host write cycle is in progress or one is pending. Control proceeds from state A to state C for requested host read, non-burst cycles when the DSPADS signal is active and neither a host write cycle is in progress nor is one pending. Control proceeds from state A to state D on requests for host read, burst cycles when the DSPADS signal is asserted and a host write cycle is not in progress and one is not pending. In all other cases control remains at state A.

Control proceeds from state B to state C if the host ready signal has been provided or a host write is not in progress and a host write is not pending. In all other cases control remains at state B. Control proceeds from state F to state D if either a ready signal is received from the host controller block 404 or a write cycle is not in progress, and a host write cycle is not pending. In all other cases control remains at state F.

Control proceeds from state C to state E if the HREPBRDY or host read early PBRDY signal is asserted and either a host read cycle is pending, a host read burst cycle is pending, or the DSPADS signal is asserted and a host read cycle is being asserted. Control proceeds from state C to state A if the HREPBRDY signal is asserted and it is none of the further conditions mentioned for transfer to state E. In all other cases control remains at state C. Control proceeds from state E to state C if a host read is pending and otherwise proceeds to state D. Control proceeds from state D to state E if the HREPBRDY signal is present, the PEOC signal is active and either a host read is pending, a host burst read is pending or a host read cycle has been sampled on the processor bus. Control proceeds from state D to state A if the HREPBRDY signal is present, the PEOC signal is present and none of the additional conditions in the transfer from state D to state E are present. In all other cases control remains at state D. Host cycles are identified as either I/O cycles or memory cycles where the HLOCMEM* signal is high, indicating a non-main memory location.

Two signals are provided by the HRD state machine. These are the HRDPRG signal or host read in progress signal, which is active during states B, C and D, and the HOSTRD or host read signal, which is active during states B, C or D and when a host cycle is active and the processor is indicating a read request.

Figure 25:
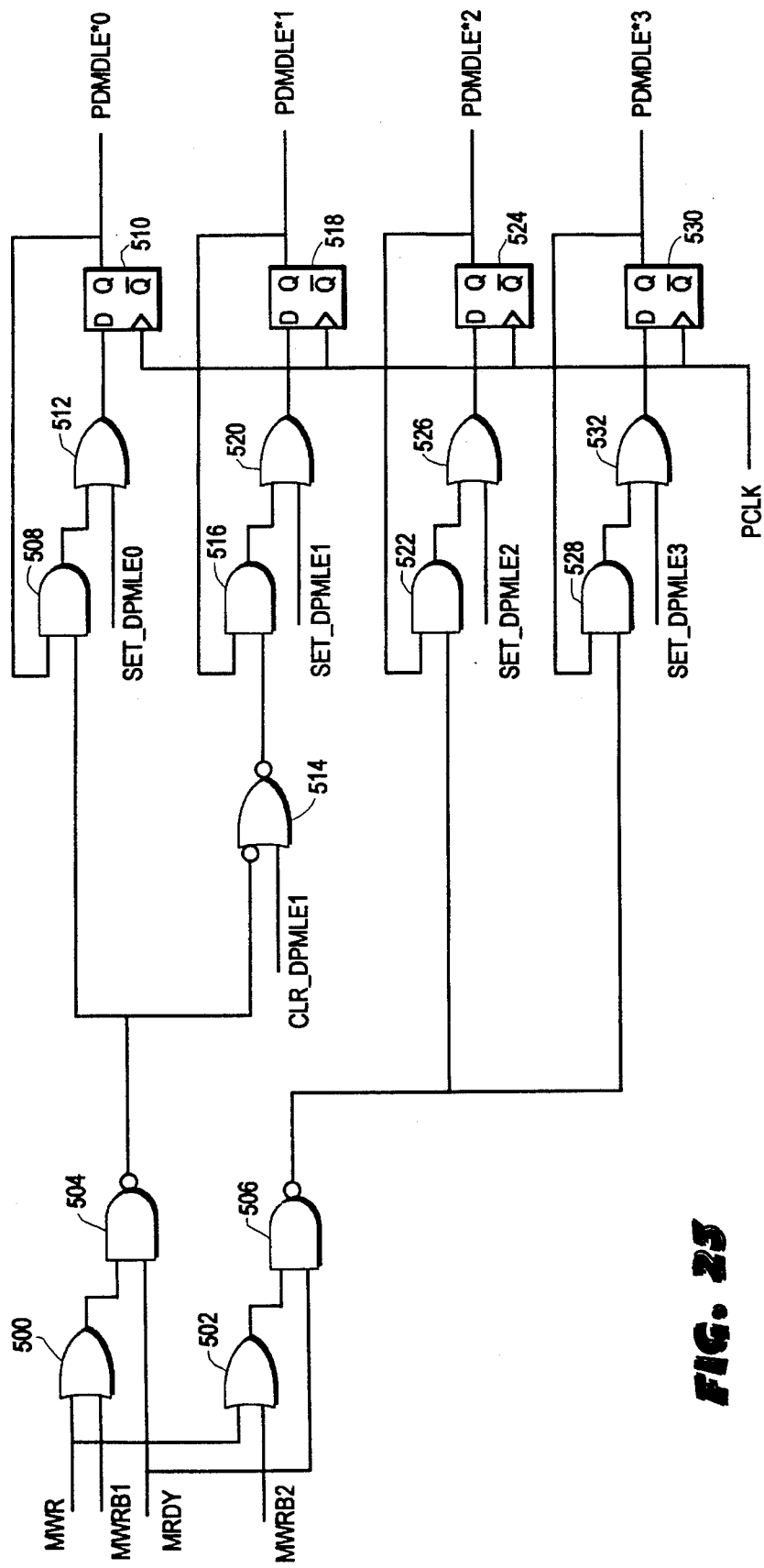

As noted, the HRD state machine utilizes as two of its conditions the HRDPND and HRDPBND or host read pending and host read burst pending signals. These are provided by the HRDPND state machine of FIG. 25. The HRDPND state machine commences at state A at reset. Control proceeds from state A to state B when the DSPADS signal is asserted, a host read cycle is in progress and a host non-burst read cycle is being requested by the processor 152.

Control proceeds from state A to state C if the DSPADS signal is asserted, a host read cycle is in progress and a host burst read cycle is being requested by the processor 152 to the host bus H. In all other cases control remains at state A. Control proceeds from state B to state A when the HRDPRG or host read in progress signal is deasserted. In all other cases control remains at state B. Control proceeds from state C to state A when the HRDPRG signal is deasserted. In all other cases control remains at state C. The HRDPND or host read pending signal is asserted in state B, while the HRDBPND signal is asserted in state C.

Figure 26:
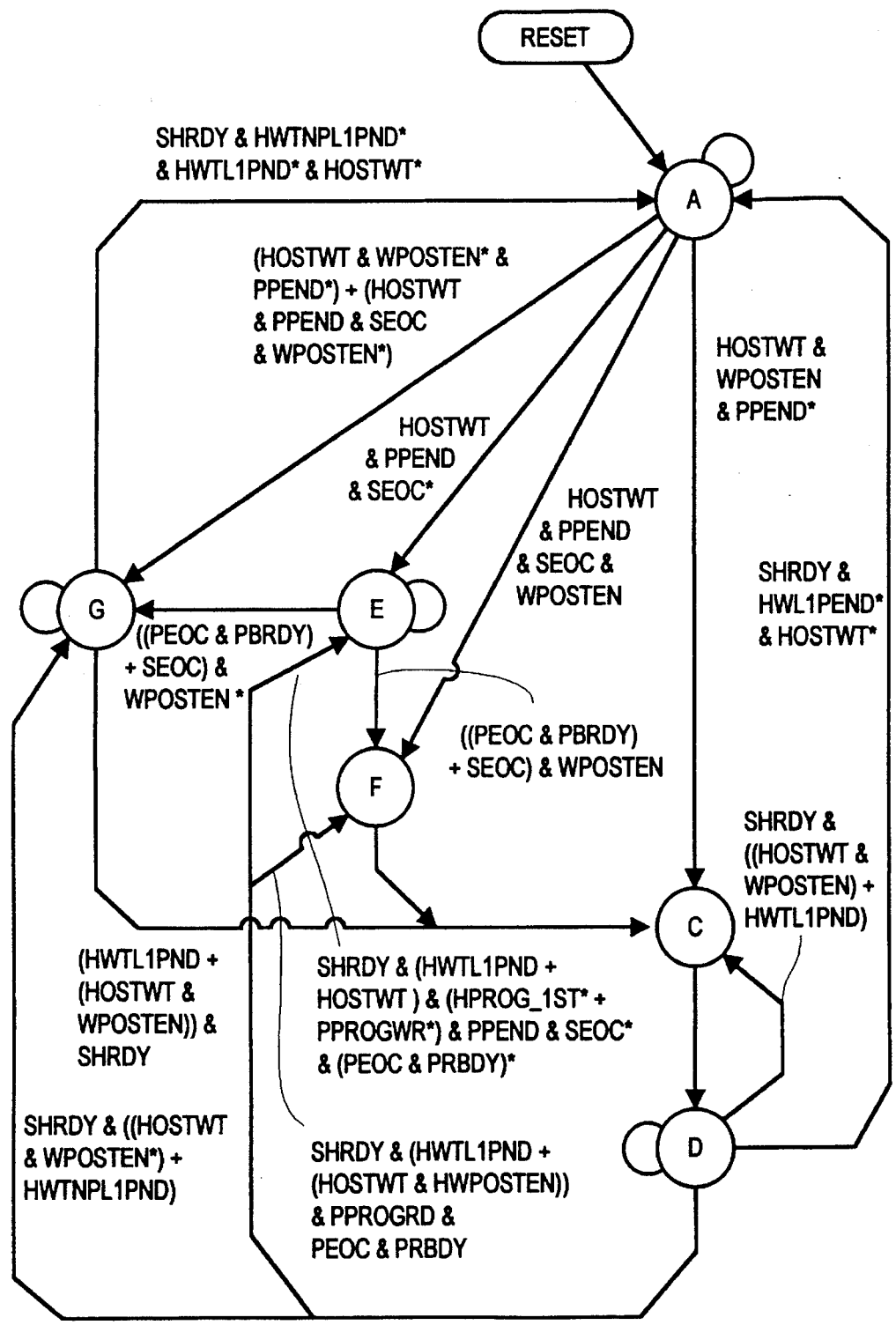

Just as the HRD state machine is used to track host read cycles, similarly a state machine is used to track host write cycles. This is the HWT state machine as shown in FIG. 26. The machine enters state A at reset and proceeds from state A to state C if a host write cycle is decoded, the previous cycle has been acknowledged as indicated by the HACK signal being low, write posting is enabled and a processor cycle is not pending. Control proceeds from state A to state G if a host write cycle is indicated, posting is not enabled and a processor cycle is not pending, or if a write to the host bus is requested, a processor cycle is pending and ending, and posting is not enabled. Control proceeds from state A to state F if a host write cycle is requested, a processor cycle is pending and ending, and posting is enabled. Control proceeds from state A to state E if a host write cycle is requested and a processor cycle is pending and has not ended. In all other cases control remains at state A.

Control proceeds from state G to state C if a host write cycle pending or if a host write cycle is requested and posting is enabled, and in either case if an SHRDY or synchronized HRDY signal is indicated, so that the host bus is ready to receive the write operation. The HRDY signal is provided at the noninverted output of a D-type flip-flop, which is clocked by the PCLK signal. The output of a multiplexor is connected to the D input, with the PHASE signal providing the selection. The zero input receives the noninverted output of the flip-flop, while the one input receives the HERDY signal, which is the inverted version of the HERDY* signal present on the host bus H to indicate a single cycle early ready indication. Control proceeds from state E to state G if a processor cycle is ending, as indicated by the PEOC and PBRDY of SEOC signals and posting has been disabled. Control proceeds from state E to state F when the processor cycle is completing and posting is enabled. In all other cases control remains at state E. Control proceeds from state F to state C in all cases. Control proceeds from state C to state D in all cases.

There are several exits from state D. The first exit is from state D to state E, which occurs when a ready is received, the host write cycle is being requested or is pending, either a processor write cycle is not in progress or the host write cycle was not first, and if the processor cycle which is pending is not completed. Control proceeds from state D to state F upon receipt of the SHRDY signal, either a write is pending or a write is requested and posting is enabled, and a read cycle which is in progress by the processor is ending. Control proceeds from state D to state C when ready is received and either another write cycle is pending or is being requested and posting is enabled. Control proceeds from state D to state G if the ready is received and a non-posted write cycle is pending or a write cycle is pending and posting is disabled. Control proceeds from state D to state A if the ready is received, no write cycle is pending and no write cycle is being requested. The HWT state machine also indicates when host write cycles are in progress and when the ready signal is to be provided. The HWTPRG or host write in progress signal is present, when the HWT state machine is in other than state A. The HWEPBRDY or host write early processor ready signal is provided in state C or in state G when the HRDY or host ready signal has been returned. The SET_DPHLE signal is active during state C.

Figure 27:
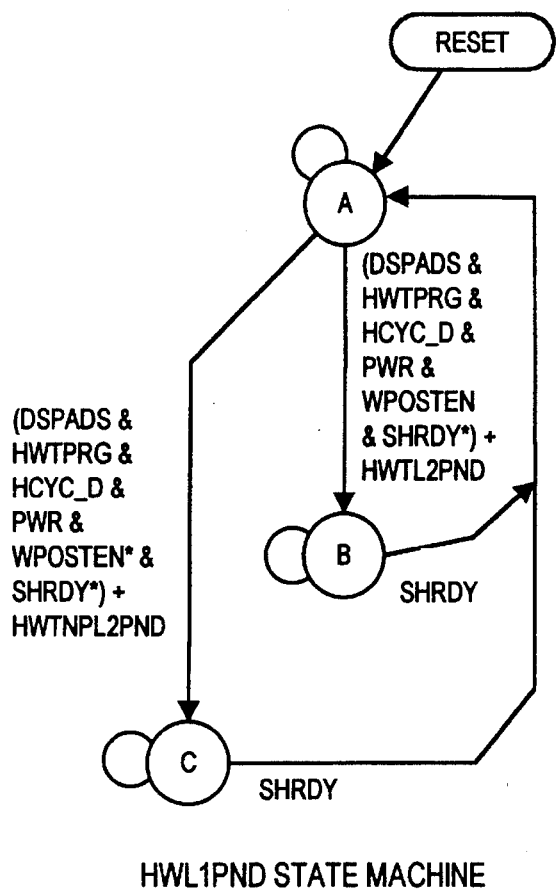

As noted, the HWT state machine needs to know if a write cycle is pending. This is done by the HWL1PND state machine of FIG. 27. The state machine commences at state A upon reset. Control proceeds from state A to state B if a host write cycle is in progress, a host write cycle is being requested, posting is enabled and the previous write cycle has not completed or if a second level of write cycle is posted and pending. Control proceeds from state A to state C when the DSPADS signal is true, a write cycle is in progress, a write cycle is being requested, the write cycle in progress has not completed and posting is disabled or if a second non-posted write cycle is pending. In all other cases control remains at state A. Control proceeds from state B to state A when a ready is received from the host controller 404. In all other cases control remains at state B. Control proceeds from state C to state A when a ready is returned and otherwise remains at state C. The HWTL1PND or first level host write pending signal is active during state B, while the HWTNPL1 ND or host first level not posted write cycle pending is true in state C.

Figure 28:
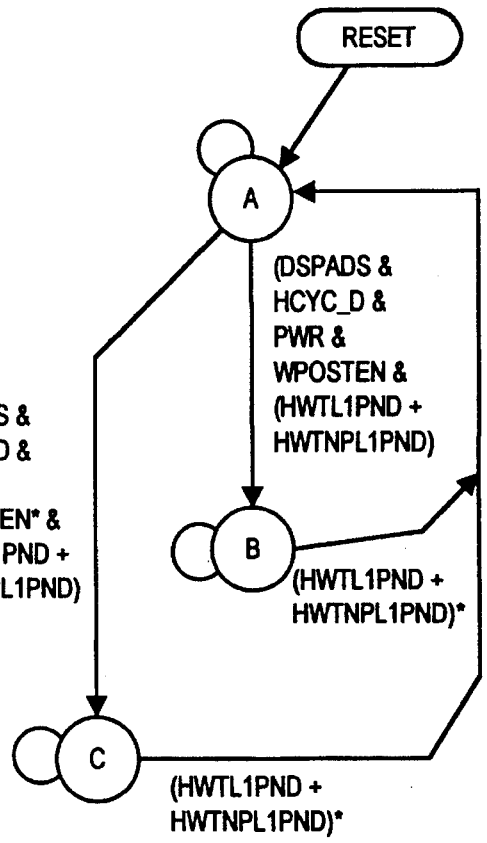

As just mentioned, it is possible to have three host bus write cycles pending at one time. This is possible because one cycle can be posted to the host bus H, one cycle can be posted to the EISA bus E from the host bus H and another one can be pending from the processor 152. Therefore it is necessary to track to two levels. This tracking is done by the HWL2 PND state machine of FIG. 28. This state machine commences at state A upon reset and proceeds to state B when the DSPADS signal is active, a write cycle to the host bus is being requested and posting is enabled and either a first write cycle, either posted or not posted, is pending. Control proceeds from state A to state C if the DSPADS signal is active, a host write cycle is being requested, posting of that cycle is not enabled and a cycle is already pending. In all other cases, control remains at state A. Control proceeds from state B to state A when a posted or non-posted write cycle is not pending. That is, the previously pending cycle is no longer pending but has completed. In other cases control remains at state B. Similarly, control proceeds from state C to state A if the prior pending signal has been performed. Control remains at state C otherwise. The HWTL2 PND or host write posted level 2 pending signal is active in state B, while the HWTNPL2 PND or level 2 write pending non-posted signal is active in state C.

Figure 29:
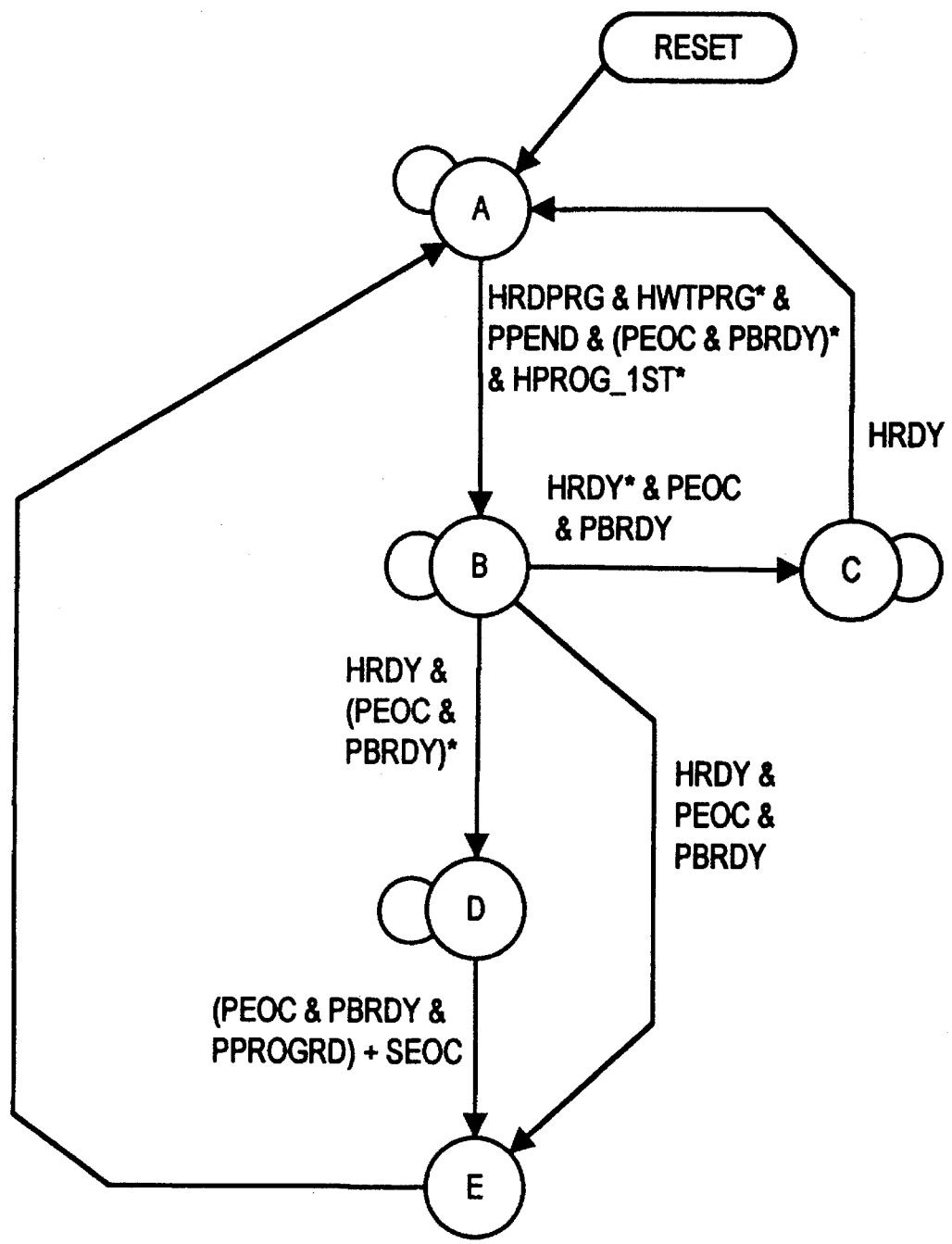

Just as a processor ready signal is provided in write cases, it is also necessary to provide an early processor ready in read cases. This is done by the HREPBRDY state machine of FIG. 29. This state machine commences at state A upon reset. Control proceeds to state B if a host read is in progress, a host write is not in progress, a processor cycle is pending, the current processor cycle is not ending and the host bus cycle which is in progress was not commenced prior to the processor cycle which is in progress. In all other cases control remains at state A. Control proceeds from state B to state C if the current processor cycle is completing and the host bus cycle has not completed. Control proceeds from state B to state D if the host bus cycle is completing and the processor cycle is not completing. Control proceeds from state B to state E if both the host and processor cycles are completing. Control otherwise remains at state B. Control proceeds from state C to state A when the host cycle is completing. Otherwise control remains at state C. Control proceeds from state D to state E when the processor cycle is completing. Otherwise control remains at state D. Control always proceeds from state E to state A.

The HREPBRDY or host read early PBRDY signal is provided in state E, in state C if the host bus cycle is being completed or in state A if a host write cycle is not in progress, the host cycle that was in progress was first and it is being completed.

Certain miscellaneous logic also contained in the host control module 414 is shown in FIG. 51. The PDHDLE* signal is provided as the inverted output of a D-type flip-flop 700. The PDHDLE* signal is also connected to an OR gate 702. The OR gate 702 receives the SET DPHLE signal from the HWT state machine as its other input. The output of the OR gate 702 is ANDed with an indication of the inverted HRDY signal in NAND gate 704. The output of the NAND gate 704 is provided to the D input of the flip-flop 700. The flip-flop 700 is clocked by the PCLK signal. The logic also develops the HPROG or host bus cycle in progress signal. This is developed as the output of an OR gate 706. The OR gate 706 receives the output of an OR gate 708 and the noninverted output of a D-type flip-flop 710. The OR gate 708 receives the HRDPRG host read in progress signal, the HWTPRG host write in progress signal and the HWL1PEND host write pending signals. The output of the OR gate 706 is one input to an AND gate 712, with the second input receiving the output of a NOR gate 714 which in turn receives the PEOC and PBRDY signals to indicate that the current processor cycle is not completing. The output of the AND gate 712 is provided as the D input of the flip-flop 710. The flip-flop 710 is clocked by the PCLK signal. The final signal of interest produced by the HCM module 414 is the ignore parity check or IGNPCHK signal. This signal is utilized by the processor 152 during read operations from the host bus H because parity is not maintained on the host bus H. The IGNPCHK signal is provided as the noninverted output of a flip-flop 716 whose input receives the output of a two input OR gate 718. One input to the OR gate 718 is provided by the noninverted output of a D-type flip-flop 720. The second input is provided by the noninverted output of a D-type flip-flop 722, which is also connected to the D input of the flip-flop 720. The HREPBRDY signal is provided to the D input of the flip-flop 722 and all three flip-flops 716, 720 and 722 are clocked by the PCLK signal.

Figure 30:
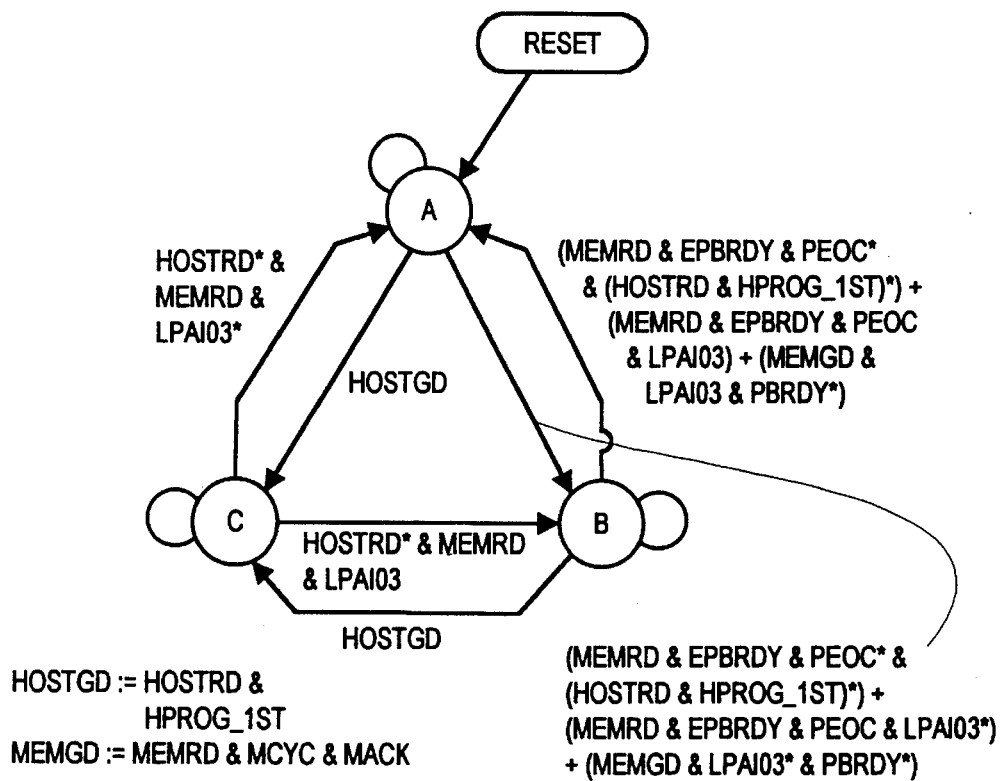

Upon reviewing the data buffer 158 it is seen that the FECON module 400 must also provide the PDSEL<1 .. 0> signals to allow proper control of the multiplexor 338 during read cases. This is done primarily by the use of the DPSEL state machine shown in FIG. 30. This state machine commences at reset in state A and proceeds to state C if a host read cycle is in progress (as indicated by the HRD state machine being in states B, C or D or if a host read cycle is occurring) and will be returning its data first because the host cycle was started first as indicated by the HPROG_1st signal. Control proceeds from state A to state B under several different conditions. The first of those is if a memory read cycle is in progress, the early PBRDY signal has been provided, the cycle has not completed and there is not a host read cycle in progress which was in progress first. A second condition for a transfer from state A to state B is if a memory read cycle is occurring, the early PBRDY is provided, the cycle is ending and the cycle which is being completed had the PA<3> bit cleared, as indicated by the LPAI03 signal. The final condition of transfer from state A to state B is if a memory read cycle is occurring as indicated by the MEMRD and MCYC signals, the memory cycle has been acknowledged by the memory controller block 402, the PA<3> signal was cleared to indicate the lower 64 bits and the PBRDY signal has not been asserted. In all other cases control remains at state A.

Control proceeds from state B to state C if a host read cycle which was started first is occurring. Control proceeds from state B to state A for the same conditions which were true for transfers from state A to state B except that the PA<3> bit would be set as utilized in those particular conditions. Otherwise control remains at state B. Control proceeds from state C to state A when a host read cycle is not occurring, a memory read cycle is occurring and bit PA<3> is not set. Control proceeds from state C to state B if a host read cycle is not occurring, a memory read cycle is occurring and the PA<3> bit is set. Otherwise control remains at state C.

The particular state of the DPSEL state machine determines the selection of the multiplexor. In state A the signals referred to as NPDSEL<1 .. 0> are set to indicate the first channel. In state B the NDPSEL<1 .. 0> signals are set to indicate the second channel, while in state C the NDPSEL<1 .. 0> signals are set to indicate the third input of the multiplexor 338. The NDPSEL<1 .. 0> signals are provided to the inputs of two D-type flip-flops, with the PDSEL<1 .. 0> signals produced by the non-inverting outputs of the flip-flop, with the flip-flops being clocked by the PCLK signal.

Figure 31:
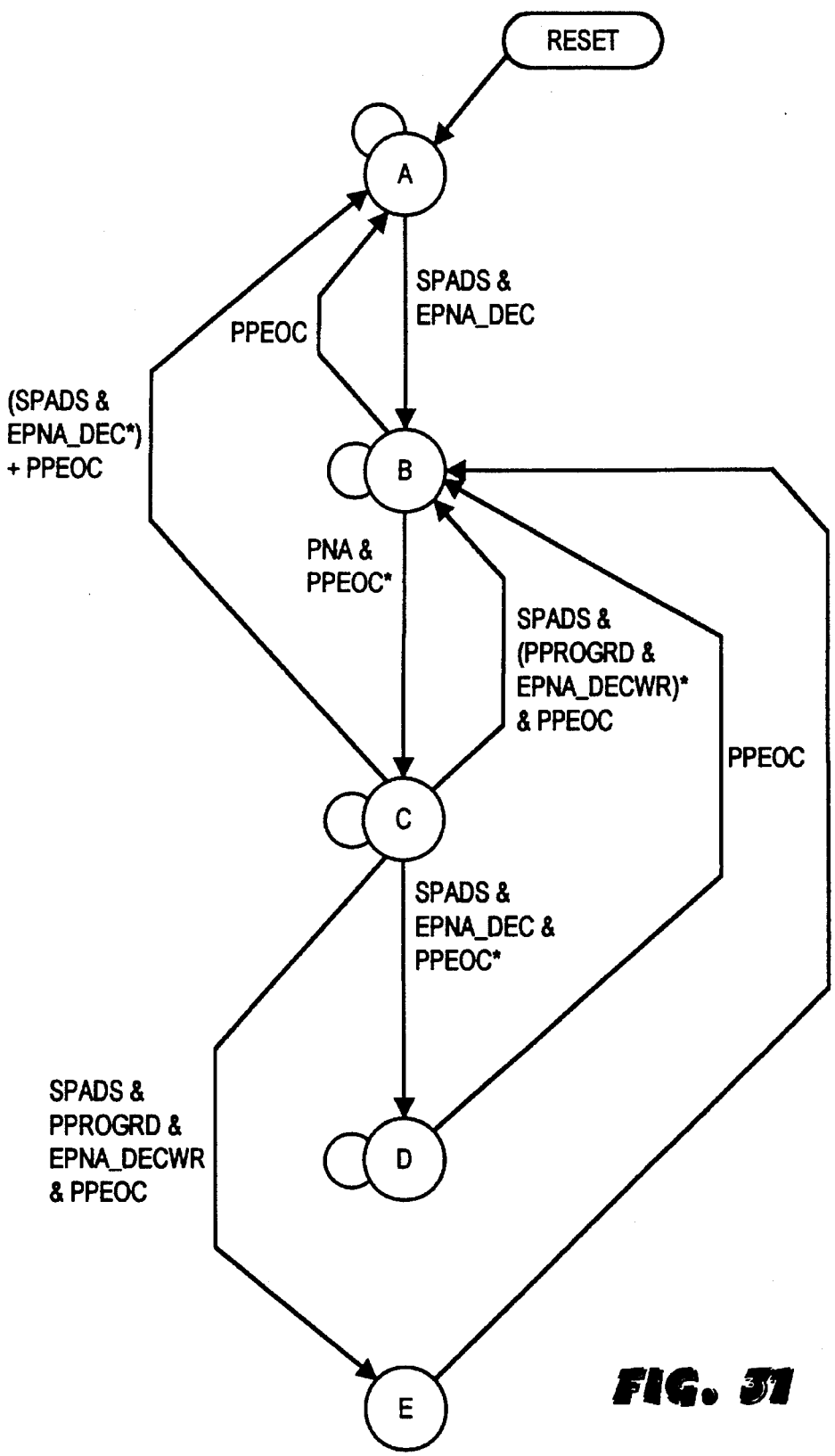

One signal which must be provided to the processor 152 to allow pipelining is a signal referred to as PNA or processor next address. The processor 152 sees this signal and knows that it can provide the next address in a pipelined mode. Therefore it is necessary to properly generate the PNA signal. A series of state machines and random logic are utilized to provide this signal. The first state machine is the PNA state machine of FIG. 31. This state machine is used to provide an indication that a PNA signal can be provided within a given window. The state machine begins at state A upon reset. Control proceeds from state A to state B if the SPADS signal is true and a signal referred to as EPNA DEC or early PNA decode is provided. The EPNA DEC signal is developed under two conditions. The first is a processor read cycle which is not to a local, i.e. processor bus, location and is not a special cycle. The second is that a non-special, non-local processor write cycle which is not being responded to by the L2 cache 154 and is not a code write is being requested. Otherwise control remains at state A. Control proceeds from state B back to state A if the PPEOC signal is asserted, indicating that the cycle is completing. Control proceeds from state B to state C if the PNA signal is asserted and the cycle is not completed. Control remains at state B in all other cases. Control proceeds from state C back to state A if the SPADS signal is asserted and the EPNA_DEC signal is not asserted or if the cycle is ending. Control proceeds from state C back to state B if the SPADS signal is asserted, the current cycle is ending and the EPNA_DECWR signal or write condition noted above is not true or a read is not in progress. Control proceeds from state C to state E if the SPADS signal is active, the current cycle is completing and the EPNA_DEC signal is active. Control proceeds from state C to state D if the SPADS signal is active, the cycle currently in progress is not completing and the EPNA_DEC signal is asserted. In all other cases control remains at state C. Being in state D is an indication that the operation is pipelined. Control proceeds from state D to state B if the PPEOC signal is asserted, indicating that a cycle is completing. Otherwise control remains at state D. Control proceeds from state E to state B in all cases.

The PNA state machine provides one signal and this is the PNA_OK signal when the state machine is in state B. This is an indication that it is possible to receive another address as one cycle is not currently pipelined or is effectively completing.

Figure 32:
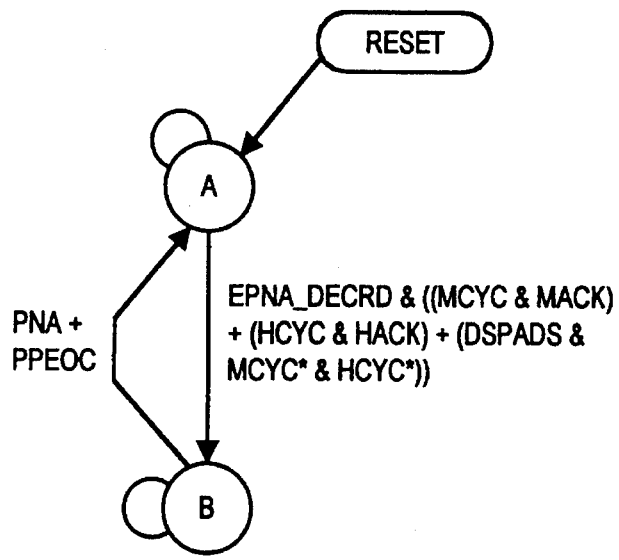

A state machine referred to as the RDPNA state machine is shown in FIG. 32 and is used to indicate that the PNA signal can be generated for the current read cycle. Control commences at state A upon reset. Control proceeds from state A to state B if the signal EPNA_DECRD, the read term of the EPNA_DEC signal, is true and any of the following sets of conditions is true. First, if a MCYC or memory cycle is indicated and an acknowledgement has been received from the memory control block 402. Second, if a host cycle is active and an acknowledgement has been received from the host control block 404. Third, if the DSPADS signal is active and the cycle is neither a memory cycle or a host cycle. In all other cases control remains at state A. Control proceeds from state B back to state A if the PNA signal is asserted or if the current cycle is completing as indicated by the PPEOC signal. Otherwise control remains in state B. The RDPNA_OK signal is generated in state B or when the next state is going to be state B.

Figure 33:
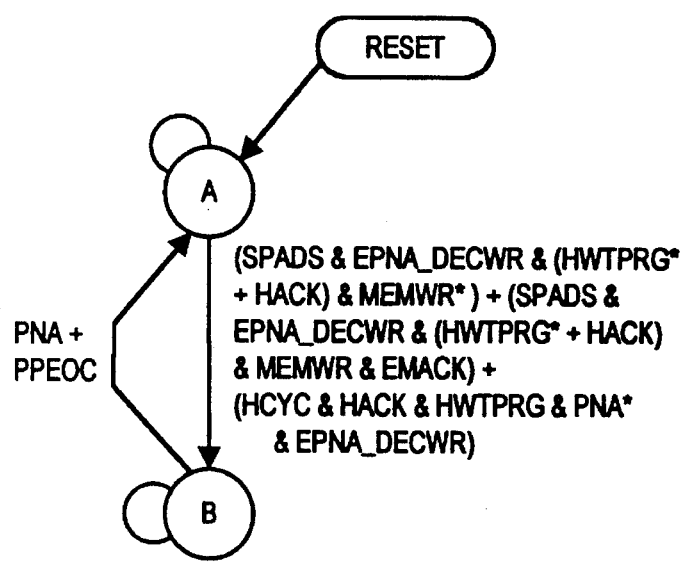

A similar state machine, the WRPNA state machine, is shown in FIG. 33 and is used to generate the WRPNA_OK signal for write cycle cases. This state machine begins at state A on reset and proceeds to state B under one of three conditions. The first is that the SPADS signal is asserted, the EPNA_DECWR signal is asserted, a memory write is not occurring and either a host write is not in progress or the host control block 402 has acknowledged an operation. The second condition is if the SPADS signal and the EPNA_DEC signals are both asserted, a memory write cycle is in progress and has been acknowledged as completing soon by the EMACK signal and either a host bus write is not in progress or it has been acknowledged. The final condition is if a host cycle is occurring, it is has been acknowledged, it is a host write which is in progress, a PNA signal has not been sent and the EPNA_DECWR signal has been asserted. In all other cases control remains at state A. Control returns from state B to state A if the PNA signal has been asserted or if the cycle has ended as indicated by the PPEOC signal. Otherwise control remains at state B. The WRPNA_OK signal is developed if the state machine is in state B or if the next state is state B.

The PNAGEN module 416 includes some random logic to generate the actual PNA signal. The PNA signal is generated by the non-inverting output of a flip-flop, with the PNA* signal generated by the inverted output of the flip-flop. The flip-flop is clocked by the PCLK signal. The input to the flip-flop is provided by the output of an OR gate which has inputs of the PNA_OK signal, the HPNA_OK signal and the output of an OR gate which combines the RDPNA_OK and WRPNA_OK signals. The HPNA_OK signal is the output of a NAND gate which has as its inputs a signal indicating that host write cycle is in progress and the output of an OR gate, which has as one of its inputs a signal indicating that a host read cycle is in progress and as its second input an AND gate which has as its inputs a signal which indicates that a host cycle is present and the EPNA_DECRD signal.

Figure 34:
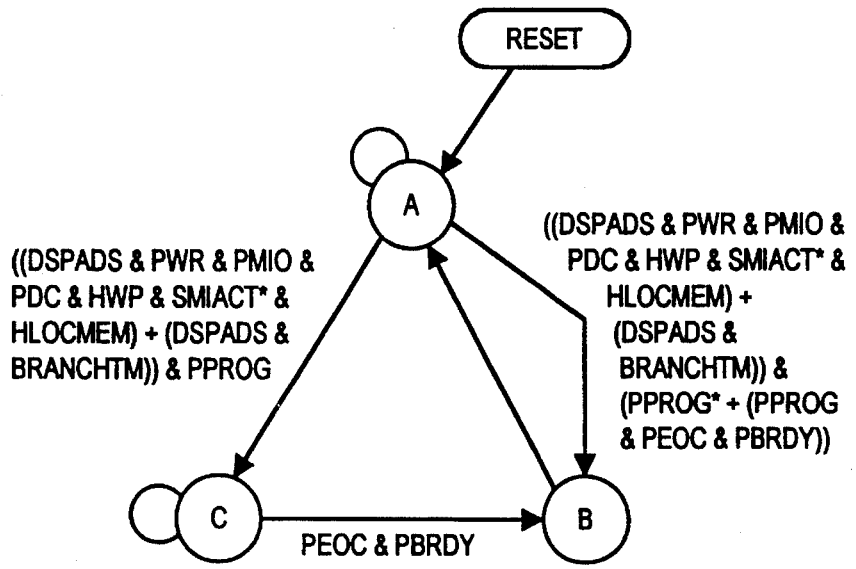

As indicated above, numerous of the state machines use the PBRDY or processor burst ready signal to advance. Certain special cycles such as branch trace messages as provided by the processor 152 must not be provided to the host bus H to prevent errors, but ready indication must be provided. Additionally, the processor 152 must receive ready indication for write operations to write-protected areas, even though no actual operation will occur. The EPBRDY signal for these particular cases is provided by the WPEPBRDY state machine shown in FIG. 34. The state machine begins at state A upon reset and transfers to state B if the DSPADS signal is true, a data write to local or main memory is indicated, SMI mode is not active and write protect status is indicated from the DDF 164 or if the DSPADS signal is true and a branch trace message has been decoded, with the additional condition in both cases that a processor cycle is not in progress in the memory controller 156 or that a cycle which is in progress is ending and the PBRDY signal is asserted. Control proceeds from state A to state C if the DSPADS signal is asserted, a local memory write data operation is indicated, SMI mode is not active and the write protect indication is received from the DDF 164 or if the DSPADS signal is true and a branch trace message has been decoded, both of these combined with the fact that a processor cycle is in progress. Otherwise control remains at state A. Control always proceeds from state B to state A. Control proceeds from state C to state B when the cycle in progress is completed as indicated by the PEOC and PBRDY signals being asserted. Otherwise control remains at state C. The WPEPBRDY signal is asserted in state B. Thus this state machine is used to provide the processor BRDY indications in the case of writes to write protected memory or on branch trace messages. In the case of the writes to write protected areas none of the other state machines perform this operation and the data is actually ignored. Similarly, the data is ignored for branch trace messages and they are not passed to the host bus H.

With the development of this final EPBRDY signal, it is appropriate to describe the logic which develops the PBRDY signal. The signal referred to as EPBRDY signal is developed by ORing together the MREPBRDY, MWEPRDY, HREPBRDY, HWEPBRDY and WPEPBRDY signals. This signal is ANDed with an indication that the cache controller is not performing a cache line fill and provided to the input of a D-type flip-flop. The noninverted output of the flip-flop is the PBRDY signal, while the inverted output of the flip-flop is the PBRDY* signal which is provided to the processor 152.

As previously noted, two signals referred to as MCYC and HCYC have been utilized. As indicated in FIG. 10 the MCYC signal is provided to MCON block 402 and HCYC signal is provided the HCON block 404 to indicate that they have cycles to perform. This decoding is done by certain logic.

Figure 35:
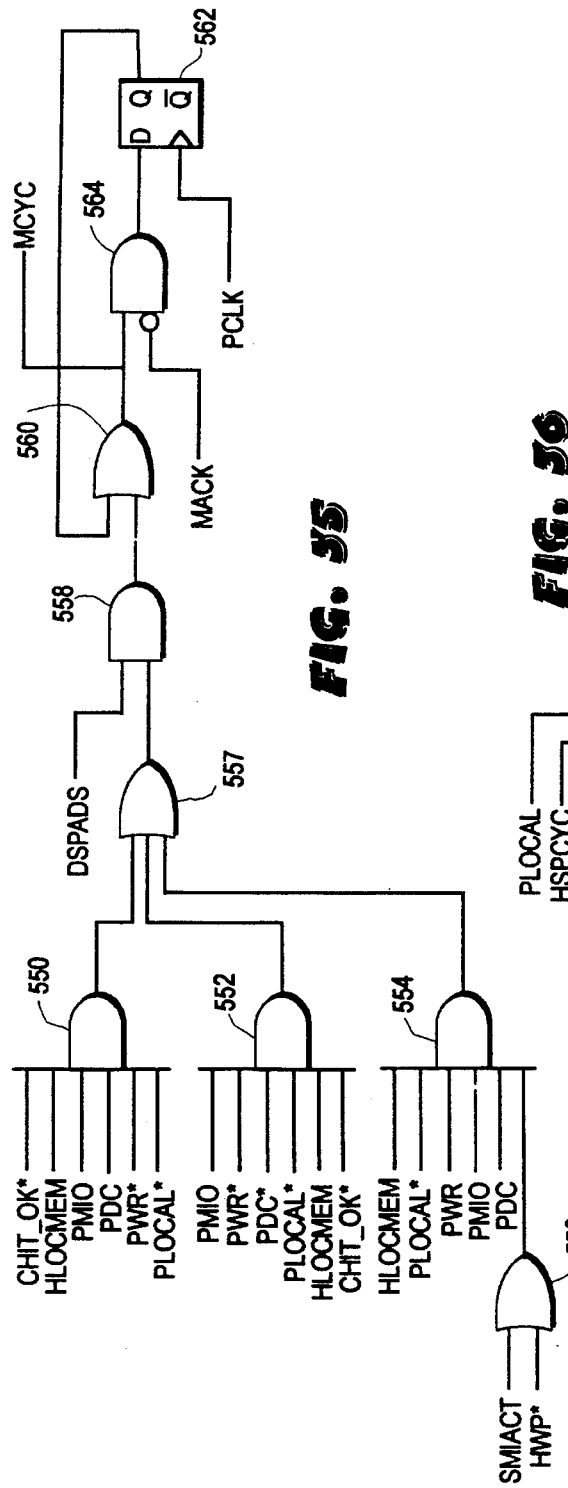

The MCYC logic is shown in FIG. 35. A six input AND gate 550 receives the PMIO, PDC, PWR*, PLOCAL*, CHIT_OK* and HLOCMEM signals to decode a main memory data read cycle which is not an L2 cache 154 hit. A six input AND gate 552 receives the PMIO, PDC*, PWR*, PLOCAL*, HLOCMEM and CHIT_OK* signals to decode a memory command read cycle which is not a L2 cache 154 hit. A six input AND gate 554 receives the PMIO, PDC, PWR, PLOCAL* and HLOCMEM signals and the output of a two input OR gate 556 which receives the SMIACT and HWP* signals. Thus this AND gate 554 decodes a memory data write cycle. It is noted that the SMIACT and HWP* signals are ORed in the OR gate 556. This is done so that areas of memory which are normally write protected, such as the system management memory, are not write protected during system management mode. Thus an area of conventional memory can be utilized as the SMM area without danger of being over written and yet it is fully accessible during SMM mode.

The outputs of the AND gates 550, 552, 554 are provided to the inputs of a three input OR gate 557 whose output is provided as one input to a two input AND gate 558. The second input of the AND gate 558 receives the DSPADS signal. The output of the AND gate 558 is provided as one input to a two input OR 560, whose second input receives the noninverted output of a D-type flip-flop 562. The output of the OR gate 560 is the MCYC signal and is provided to the input of a two input AND gate 564. The second input of the AND gate 564 is inverted and receives the MACK signal. The output of the AND gate 564 is provided to the D input of the flip-flop 562, which flip-flop 562 is clocked by the PCLK signal.

Figure 36:
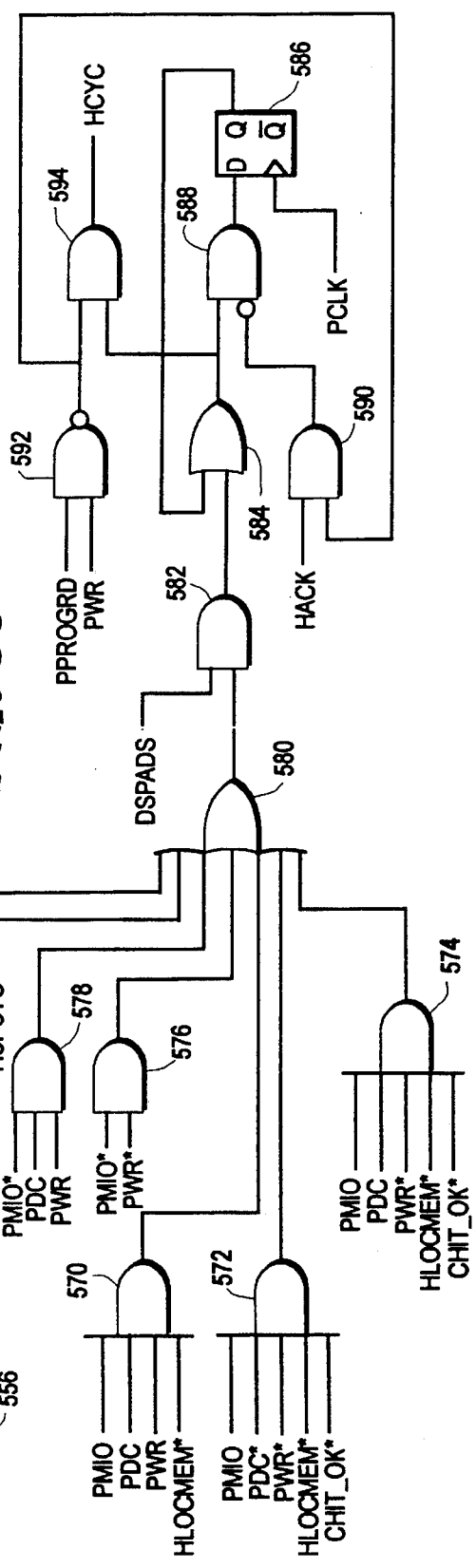

The development of the HCYC signal is shown in FIG. 36. A four input AND gate 570 receives the CHIT_OK*, PMIO, PDC, and PWR signals to decode a host bus memory data write operation. A five input AND gate 572 receives the PMIO, PDC*, PWR*, HLOCMEM* and HLOCMEM* signals to decode a host bus memory command read operation which is not a cache hit. A five input AND gate 574 receives the PMIO, PDC, PWR*, HLOCMEM* and CHIT_OK* signals to decode a host bus memory data read operation which is not a cache hit. A 2 input AND gate 576 receives the PMIO* and PWR* signals to decode host bus I/O read operations. A three input AND gate 578 receives the PMIO*, PDC and PWR signals to indicate a host bus I/O data write operation. The outputs of the AND gates 570, 572 and 574 and the AND gates 576 and 578 are provided as inputs to a seven input OR gate 580. The PLOCAL and HSPCYC signals, which indicate respectively processor bus local cycles and special cycles which are to be transmitted to the host bus, that is 80486 equivalent special cycles, provide the remaining inputs to the OR gate 580. The output of the OR gate 580 is provided as one input to a two input AND gate 582, whose second input receives the DSPADS signal. The output of the AND gate 582 is provided as one input to a two input OR gate 584. The second input to the OR gate is connected to the non-inverting output of a D-type flip-flop 586. The flip-flop 586 is clocked by the PCLK signal. The output of the OR gate 584 is provided as one input to a two input AND gate 588, whose second input is inverted and receives the output of a two input AND gate 590. The output of the AND gate 588 is provided to the D input of the flip-flop 586. The HACK signal is provided as one input to the AND gate 590 and the output of a two input NAND gate 592 provides the second input. The PPROGRD and PWR signals are the inputs to the NAND gate 592. The output of the NAND gate. 592 is also provided as one input to a 2 input AND gate 594, whose second input receives the output of the OR gate 584. The output of the AND gate 594 is the HCYC signal. This completes the description of the front end controller 400.

Figure 37:
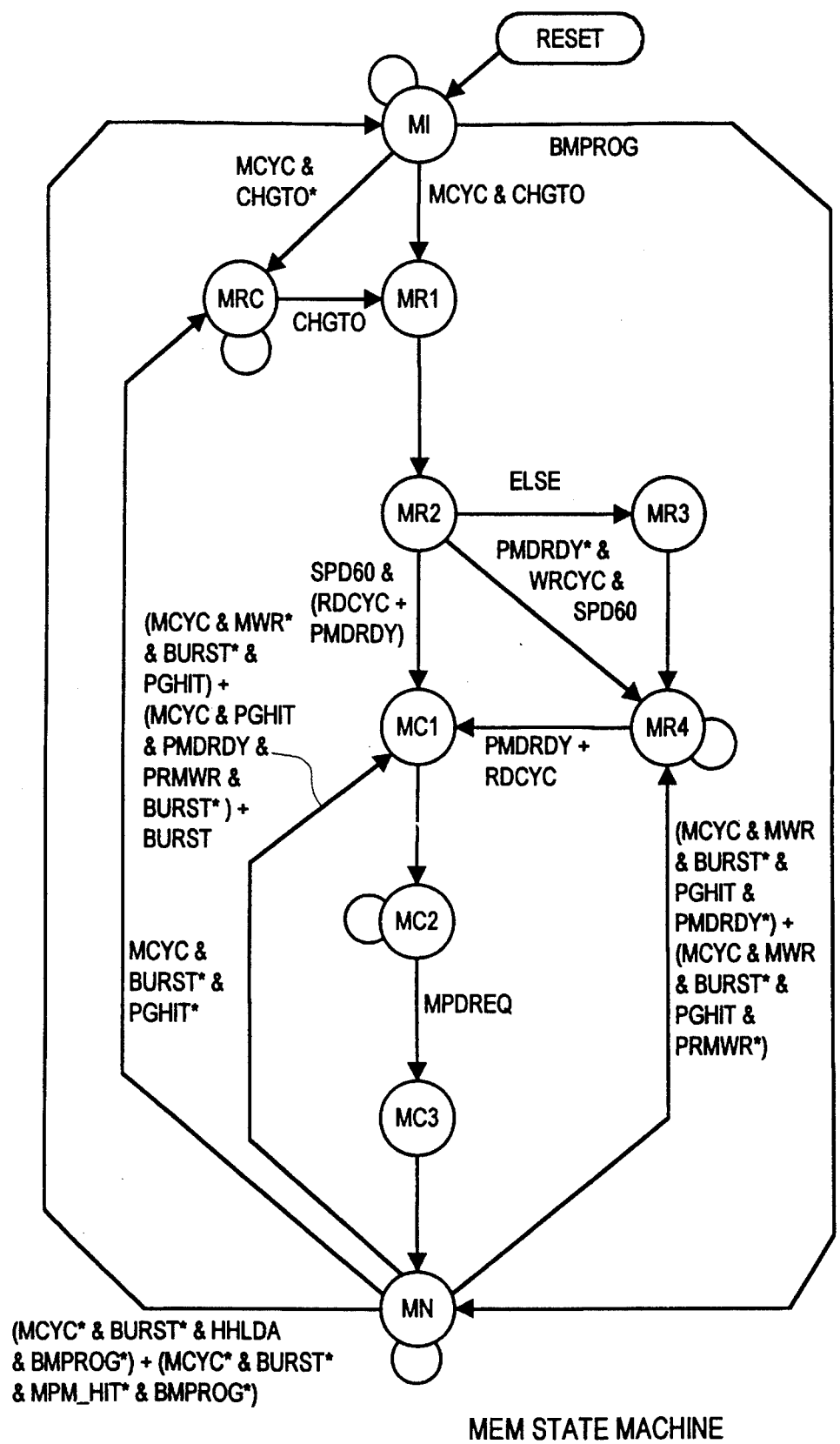

The memory control block 402 is shown in more detail in FIG. 12 and its state machines will be discussed at this time. The CPUMEM module 430 is responsible for the actual control of memory operations directed from the processor 152. The core of the CPUMEM module 430 is the MEM or memory state machine as shown in FIG. 37. Control proceeds to state MI or memory idle upon reset. In this state the state machine is idle and is precharging the DRAMs and the MRAS* signal is high. Control proceeds from state MI to state MRC if the MCYC signal is active, indicating that a memory cycle is being requested, and the CHGTO* or not charge time out signal is asserted, indicating that the DRAMs have not been fully precharged. Control proceeds from state MI to state MR1 or memory RAS1 if a cycle has been requested, as indicated by the MCYC signal, and the CHGTO signal is true, indicating that the precharge time has completed. Control proceeds from state MI to state MN when the BMPROG or bus master cycle in progress signal is asserted. In all other cases control remains at state MI. Control proceeds from state MRC to state MR1 when the CHGTO signal is active, indicating that the precharge time has been completed. Control proceeds from state MR1 to state MR2 in all cases. Control proceeds from state MR2 to state MC1, the first of the CAS states, if the DRAMs have a speed of 60 ns, as indicated by the LSPD60 or latched SPD60 signal from the DDF 164, and either a read cycle has been indicated or the PMDRDY or processor to memory data ready signal is active. Control proceeds from state MR2 to state MR4 for 60 ns DRAMs if a write cycle has been requested and the PMDRDY signal is not asserted. In all other cases control proceeds from state MR2 to MR3. Particularly, control proceeds from state MR2 to MR3 in the case of 80 ns DRAMs. Control proceeds from state MR3 to state MR4 in all cases. Control proceeds from MR4 to state MC1 if either a read cycle has been requested or the data is available as indicated by the PMDRDY signal. Control remains at state MR4 for all other cases.

Control always proceeds from state MC1 to state MC2. Control proceeds from state MC2 to state MC3 when the MPDREQ signal is asserted, indicating that the FECON block 400 is ready to accept data from the memory. In all other cases control remains at state MC2. Control always proceeds from state MC3 to state MN.

There are numerous exits from state MN. In state MN the MRAS* signal is low. Control proceeds from state MN to state MC1 if a burst cycle is occurring, if a non-burst memory page hit read has occurred as indicated by the MCYC, BURST*, MWR* and PGHIT signals being true or if the next cycle is a non-burst memory page hit, the previous cycle was a memory write, and the data is available, as indicated by the MCYC signal, BURST*, PGHIT, PMDRDY and PRMWR signals being asserted. The PRMWR signal indicates the previous memory cycle is a write cycle. This loop from state MN to state MC1 is the shortest loop and indicates a two wait state loop based on a 66 MHz clock. Thus, once page hits are obtained, the memory controller 156 can operate in two wait state per memory cycle mode for most page hit operations. Control proceeds from state MN to state MR4 on non-burst memory page hit writes where the data is not available, as indicated by the MCYC, BURST*, MWR, PGHIT and PMDRDY* signals being true. Control also proceeds from state MN to state MR4 if it is a non-burst, memory page hit with a write following a read operation, as indicated by the MCYC, BURST*, MWR, PGHIT and PRMWR* signals being true. Control proceeds from state MN to state MRC if another cycle has been requested and it is a non-burst, non-page hit, as indicated by the MCYC, BURST* and PHGHIT* signals being true. Control proceeds from state MN to state MI if an idle state is needed for non-burst, non-bus master cycles, non-memory cycles either because the memory performance monitor has indicated that the next cycle probably will not be a page hit and therefore it is appropriate to proceed to precharge the DRAMs to see if time can be saved in the case of a page miss, or if a hold request has been acknowledged by the processor 152. These conditions are indicated by the MCYC*, the BURST* signal, and the BMPROG* signals being true and either the HHLDA or MPM_HIT*. In all other cases control remains at state MN, which is thus effectively a second idle state, only in this case the MRAS* signal is held low. Particularly, if the memory performance monitor indicated that the next state is likely to be a page hit, control remains at state MN, awaiting the hit and a transfer to states MC1 or MR4.

As noted, the MEM state machine needs to know whether a burst is occurring. This information is provided by the BURST state machine shown in FIG. 38. This state machine beings operation at state A upon reset and proceeds to state B if a cache burst operation is occurring and a new cycle is being developed, based on the NEWCYC and CBURST signals. The NEWCYC signal is the AND of the MACK and MCYC signals, while the CBURST signal indicates a processor 152 write-back or L2 cache 154 send allocate line fill. In all other cases control remains at state A. Control proceeds from state B to state C when the MBRDY signal is received to indicate that 128 bits of data had been transferred to the memory system. Otherwise control remains at state B. Control proceeds from state C back to state A on the next occurrence of the MBRDY signal and otherwise remains at state C. Thus, once the beginning of a new burst cycle is indicated, control proceeds from state B to state C as data is transferred. The BURST signal is thus asserted during states B and C, while the BURST2 signal is asserted in state C and the EBURST signal is provided in state B.

The CHGTO or precharge timeout signal is provided by a simple counter. The counter is loaded with a default value of 4 whenever the MRAS signal is being asserted. Assertion of this signal is described below. On each rising edge of the PCLK signal when the MRAS signal is deasserted, that is the MRAS* signal is high, the counter counts down. When the counter reaches a value of 1, this is an indication that the precharge time has been completed for 60 ns DRAMs. When the counter counts down to 0, this is an indication that the precharge time has completed to 80 ns DRAMs. Therefore the CHGTO signal is provided after three counts for 60 ns DRAMs and four counts for 80 ns DRAMs from the beginning of the MRAS* signal deassertion.

The PGHIT or page hit signal is provided by a page hit detection block. This is relatively conventional block in that it contains a latch for processor address <27 .. 12> bits, with the latch operating on the processor memory address latch enable signal, which is active when addresses are being provided to the memories. The outputs of the latch are provided to one input of a comparator, while the active or current processor address <27 .. 12> bits are provided to the second input of the comparator. If they are equal, this is considered to be a page hit operation, so that a new row address need not be provided.

Certain miscellaneous logic is also contained in the CPUMEM module 430. The first function is the generation of the MRDY signal (FIG. 38A). The MRDY signal is provided as the output of a D-type flip-flop 740 clocked by the PCLK signal. The D input to the flip-flop 740 receives the output signal of a multiplexor 742, with the select input receiving the MWR signal. The zero input of the multiplexor 742 is connected to the output of an AND gate 744 which receives the EBURST* signal and a signal indicating that the next state of the MEM state machine is state MC2. The output of the AND gate 744 is also provided to the D input of a D-type flip-flop 746, which is clocked by the PCLK signal and whose output is the LMRDY or EMACK signal. The one input of the multiplexor 742 receives a signal indicating that the next state is MC3. This same signal is provided to the D input of a D-type flip-flop 748, which is clocked by the PCLK signal and whose output is the MBRDY signal.

The MACK or memory acknowledge signal is developed as shown in FIG. 38B. A signal indicating that the next state is state MN and the EBURST* signal are provided to the input of an AND gate 750. The output of the AND gate 750 is one input to an OR gate 752 whose other input is a signal indicating that the next state is state MI. The output of the OR gate is the NMACK signal is provided to the D input of a flip-flop 754. The flip-flop 754 is clocked by the PCLK signal and has the MACK signal as its noninverted output.

The MRASSC or master RAS set signal from the CPU section is the same as the signal indicating that the next state is state MR1. The MRASRC or master RAS reset from the CPU signal is shown as the output of a three input OR gate 756 in FIG. 38C. The next state MC3, MCYC, PGHIT*, and BURST2 signals are provided to an AND gate 758. The BURST*, PGHIT*, MCYC, and next state MN signals were provided to an AND gate 760. The outputs of the AND gate 758 and 760 are provided as inputs to the OR gate 756, along with a signal that indicates that the next state of the MEM state machine is state MI. The NMCASC or next cycle master CAS signal from the CPU section is equivalent to a signal indicating that the next state is state MC.

The NMALEC or next cycle memory address/enable signal from the CPU is provided as the output of an OR gate 762 as shown in FIG. 38D. The next state MC3 and EBURST* signals required as the inputs to an AND gate 764. The next state MN, EBURST*, and MCYC* signals are provided as the input to an AND gate 766. The outputs of the AND gate 764 and 766 and a signal indicating that the next state is MI are the inputs to the OR gate 762.

The NMADRINCC or next cycle memory address increment signal from the CPU section is equivalent to the next state being state MC3 during a BURST operation. The MALLBESC or memory all byte enables signal from the CPU section is provided during read cycles or during cache BURST operations. The NMWEC or next cycle memory write enable signal from the CPU section is provided as the output of an OR gate 768 as shown in FIG. 38E. The next state any MR or any MC signal and the MWR signals are the inputs to an AND gate 770. The next state NM, NXTCYC, PWR, PRMWR, and EBURST* signals are the inputs to an AND gate 772. The next state MN, MWR, and EBURST signals are the inputs to an AND gate 774. The outputs of the AND gates 770, 772, and 774 are the inputs to the OR gate 768.

The NDMPLE or next cycle memory data to processor data latch enable signal is equivalent to the next state of the state machine being MC3 during read operations. The NDMSELOC or next cycle memory data select a least significant bit from the processor section signal is provided as the output of an OR gate 776 as shown in FIG. 38F. The next state MC3 and next state MN signals are provided as inputs to an OR gate 778, whose output is provided to an AND gate 780, whose other input receives the EBURST signal. The next state MC1 and next state MC2 signals are the inputs to an OR gate 782 whose output is an input to an AND gate 784, whose other input receives the BURST2 signal. The outputs of the AND gates 780 and 784 are the inputs to the OR gate 776.

The NMDOEC or next cycle memory data output enable signal from the CPU section signal is provided by the output of a NOR gate 786, as shown in FIG. 38G. The next state any MR or any MC state signal and the indication that the machine is in state MC3 are provided as the inputs to an OR gate 788. The output the OR gate 788 is provided as an input to an AND gate 790, whose other input receives the MWR* signal. The next state NM, EBURST, and MWR* signals are the inputs to an AND gate 792. The next state MN, NXTCYC, PWR*, and EBURST* signals are the inputs to an AND gate 794. The outputs of the AND gates 790, 792, and 794 and the RDHLD signal are inputs to the NOR gate 786. The RDHLD signal is provided as the noninverted output of D-type flip-flop 796 which is clocked by the PCLK signal. The state MC3, PRMWR* and EBURST* signals are provided to an AND gate 798, whose output is connected to the D input of the flip-flop 796.

The IMALE signal is a one PCLK delayed version of the MACK signal. The signal is used to latch the PWR signal to develop the MWR signal, to latch the PDC signal to develop the MDC signal and to latch the SPD60 or memory speed 60 signal to develop the LSPD60 signal.

The PMALE or processor memory address latch signal used with the page hit detector is developed when the HHLDA signal is low, the MACK signal is true, the MCYC signal is true. The NXTCYC signal is produced as the output of an OR gate 800 as shown in FIG. 38H. The SPADS and PMIO signals are provided as the inputs to an AND gate 802, whose output is one input to the OR gate 800, with the MCYC signal being the other input to the OR gate 800.

Figure 39:
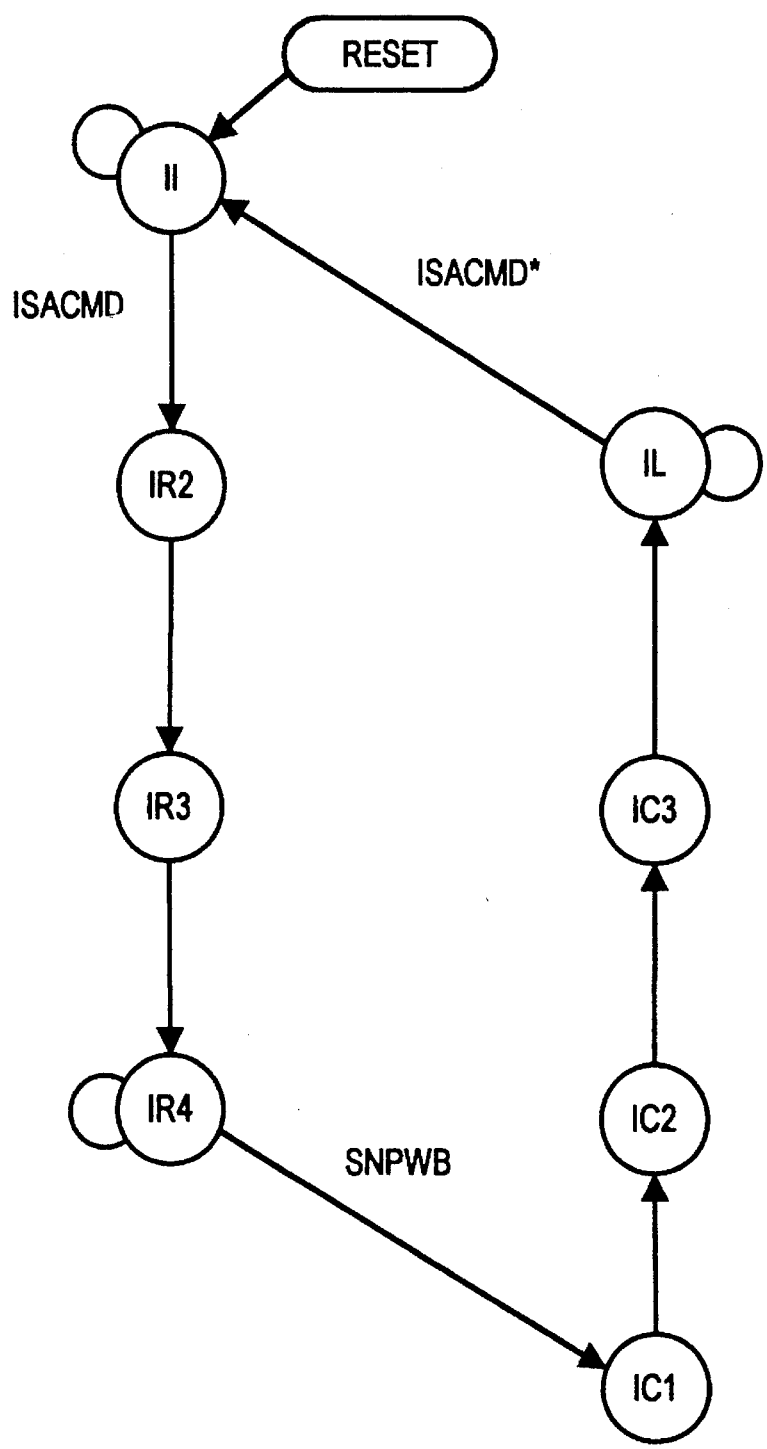

There are also additional types of bus masters which could operate in the computer system C. One of these is an ISA or Industry Standard Architecture bus master which would be located in the EISA slots 108. As these bus masters can address main memory, it is appropriate to have a control module, ISABM 432, and a state machine for use with their operation. The state machine is the ISA state machine of FIG. 39. The state machine starts at state II upon reset. This is the ISA idle state. When an ISA command is not active, control remains at state II. When an ISA command is active, with the definition of the signal defined below, control proceeds from state II to state IR2. Control proceeds from state IR2 to state IR3 on the next PCLK signal clock edge and then from state IR3 to state IR4. If a snoop write-back is occurring, that is the write-back cache in the processor 152 has determined that a read hit has occurred and a write-back is appropriate, control remains at state IR4 until this operation is completed. When the snoop write-back is completed, control proceeds from state IR4 to state IC1. Then, on successive positive edges of the PCLK signal, control proceeds from state IC1 to state IC2 to state IC3 and then to state IL. Control remains in state IL as long as the ISACMD signal is activated. Control proceeds from state IL to state II when the ISA command has been completed.

Figure 40:
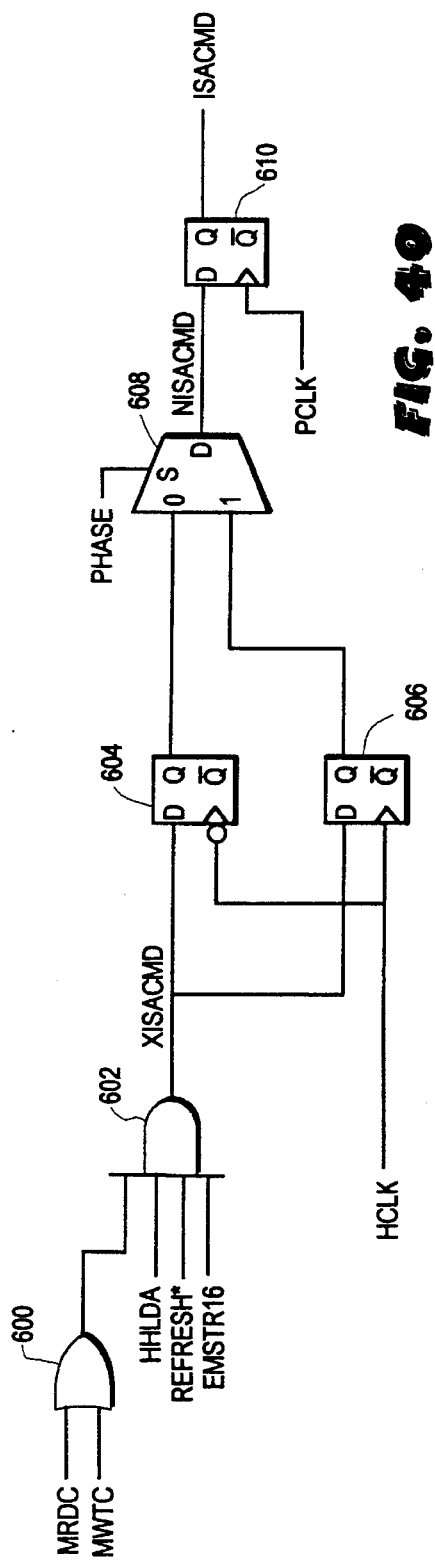

The development of the ISACMD signal is shown in FIG. 40. The MRDC and MWTC signals are provided as two inputs to an OR gate 600. The output of the OR gate is one input to a four input AND gate 602. The other inputs to the AND gate 602 are the HHLDA, REFRESH* and EMSTR16 signals. Thus the output of the AND gate 602 is active when an ISA bus master has control of the EISA bus E and is actively running a cycle. The output of the AND gate 602 is the XISACMD signal and is provided to the D input of a D-type flip-flop 604. The inverted clock input of the flip-flop 604 receives the HCLK or host bus clock signal, which is developed by dividing the PCLK signal by two for a 66 MHz PCLK signal. The output of the AND gate 602 is also provided to D input of a D-type flip-flop 606, whose positive clock input receives the HCLK signal from the host bus H. The noninverted outputs of the flip-flops 604 and 606 are the zero and one inputs, respectively, of a 2:1 multiplexor 608. The select input to the multiplexor 608 is provided by the PHASE signal, which indicates that the PCLK signal is in phase with the HCLK signal, that is, the two rising edges are aligned. The PHASE signal is the noninverted output of a D-type flip-flop which is clocked by the PCLK signal and receives the HCLK* signal at its D input. The output of the multiplexor 608 is provided to the D input of a D-type flip-flop 610 whose clocking input receives the PCLK signal. The noninverted output of the flip-flop 610 is the ISACMD signal.

As with memory state machine, the ISA state machine also provides the signals for controlling the address/control buffer chips 168 and the data buffer 158. The MRASSI or master RAS set ISA signal is active when the ISA state machine is in state IL, the ISACMD signal is true and the cycle is being addressed to the main memory. The MRASRI or master RAS reset by ISA signal is asserted in state IL when the ISACMD signal is not asserted. The NMCASI or next cycle master CAS by ISA signal is asserted when any of the next states is state IC1, IC2 and IC3, when the operation is to main memory and the operation is not to write protected memory or is a read operation. The NMWEI or next state MWE from the ISA portion signal is asserted when the next state will be IR4 or one of the IC1, IC2 or IC3 states, an ISA write operation is being requested and it is not to write protected space. The MALLBESI or memory all byte enables by ISA signal is asserted during read cycles when the ISACMD signal is asserted. The NDMHLEI or next memory data to host data latch enable signal from the ISA system signal is provided during writes in state IR2 or during reads in state IC2. The DHOEI or host data output enable by ISA signal is provided during ISA read operations when the ISACMD signal is asserted. The NMDOEI signal is negated when for read operations the next state will be the IR4, IC1, IC2 or IC3 states, the current state is state IC3, or the RDHLD signal is asserted.

Figure 41:
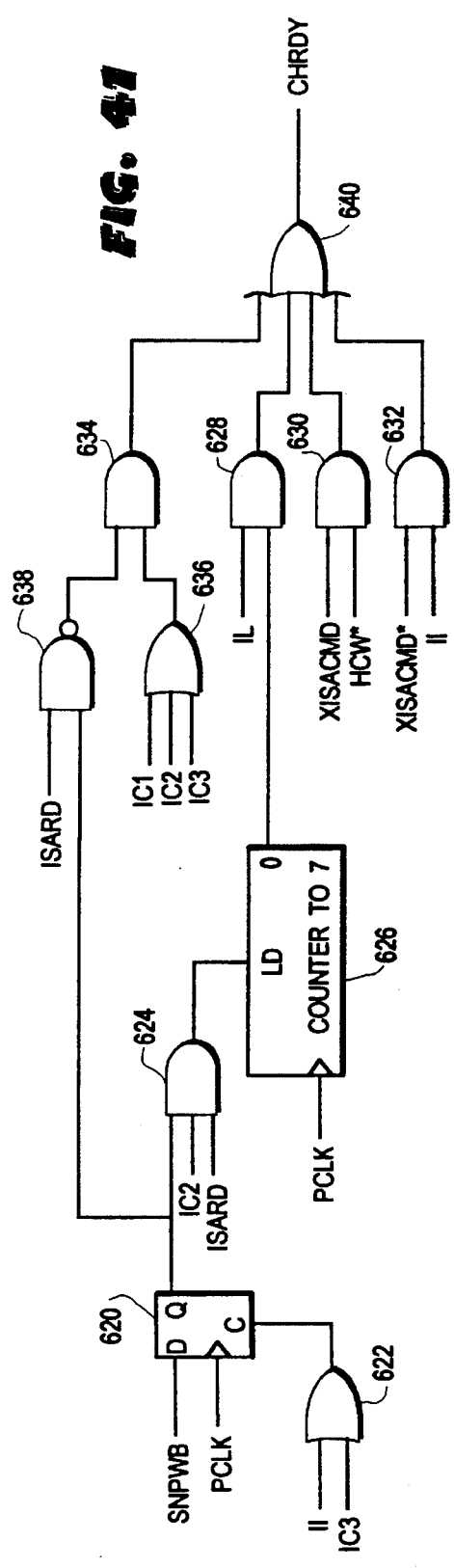

The ISABM logic 432 is also responsible for providing the CHRDY signal. The logic for this is shown in FIG. 41. The SNPWB signal is provided to the D input of a D-type flip-flop 620. The PCLK signal clocks the flip-flop 620. The synchronous clear input receives the output of a two input OR gate 622 which receives as its inputs signals indicating that the ISA state machine is in state II or state IC3. The noninverted output of the flip-flop 620 is provided as one input to a three input AND gate 624, whose other two inputs receive the indication that the state machine is in state IC2 and that a read operation is occurring. The output of the AND gate 624 is provided to the load input to a 7 to 0 down counter 626. The PCLK signal clocks the counter 626. The output of the counter 626 is a zero signal, which is referred to as the CHRDYTO or CHRDY time out signal. This signal is provided as one input to a two input AND gate 628, with the other input receiving an indication that the state machine is in state IL. The XISACMD signal and the HCW* or not write-back signal are provided as the inputs to a two input AND gate 630. The XISACMD, signal and an indication of state II are provided as the inputs to a two input AND gate 632. A two input AND gate 634 receives the output of an OR gate 636 and the output of a NAND gate 638. The inputs to the NAND gate 638 are the ISARD signal, indicating a read operation by an ISA bus master, and the output of the flip-flop 620. The inputs to the OR gate 636 are indications that the ISA state machine is in state IC1, IC2 or IC3. The outputs of the AND gates 628, 630, 632 and 634 are provided as the inputs to an OR gate 640, whose output is the CHRDY signal.

Figure 42:
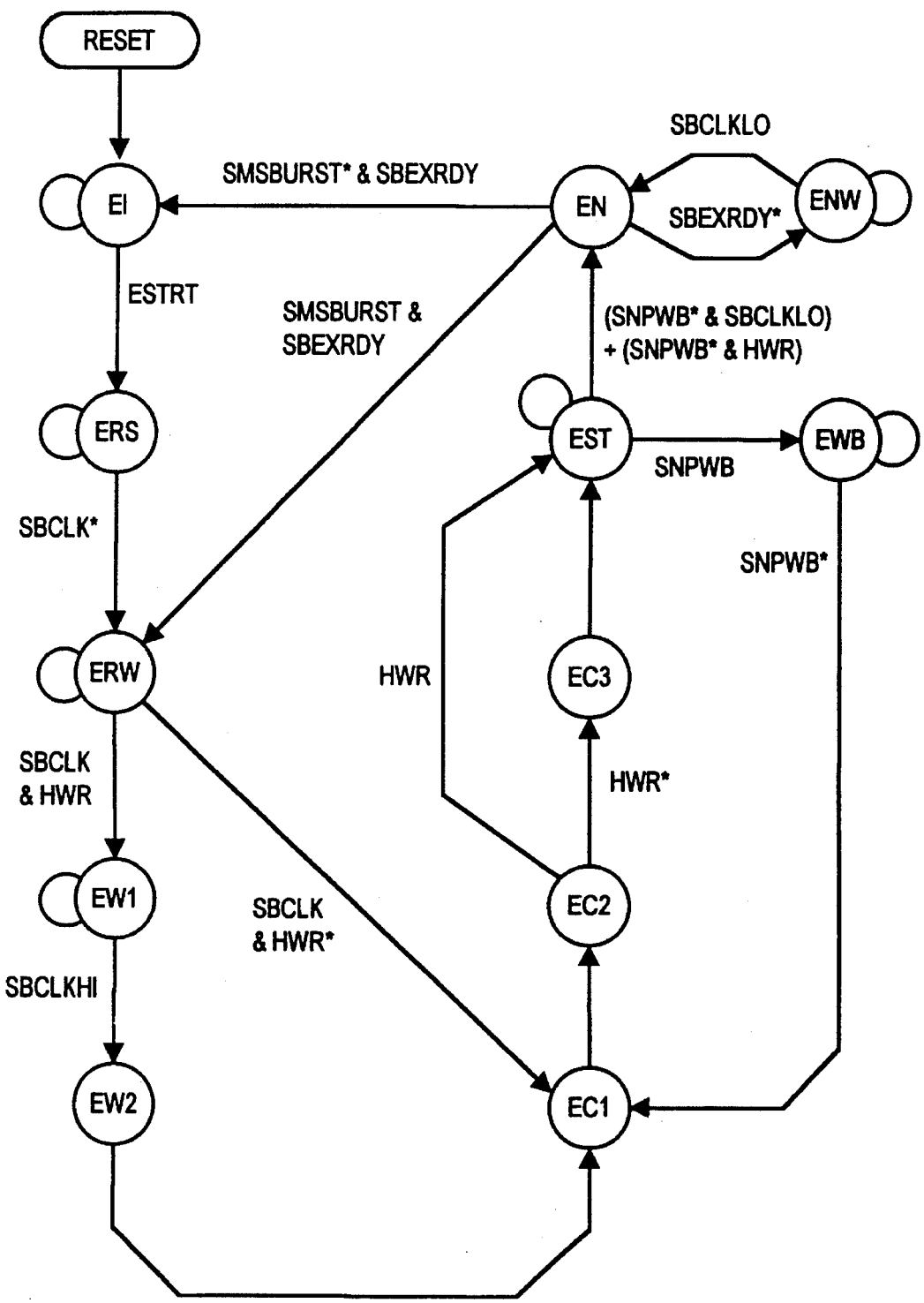

Just as an ISA bus master has a separate control module 432, an EISABM module 434 is provided and it includes a state machine referred to as the EISA state machine which is shown in FIG. 42. The state machine begins operation after reset at state EI or EISA idle. It remains in this state until the EISA START or ESTRT signal is received. The ESTRT signal is true when the START, SBCLK, HMIO, REFRESH*, EMSTR16* and HHLDA signals are true and the PCLK signal is in phase with the HCLK signal. At that time it proceeds to state ERS. Control remains at state ERS until the PCLK synchronized BCLK or SBCLK signal is not asserted. Control then proceeds to state ERW. Control remains in this state while the SBCLK signal is not asserted. Control proceeds from state ERW to state EW1 in the case of the SBCLK signal being asserted and a write operation occurring. Control remains in state EW1 when both the SBCLK signal and BCLK signals are not asserted, as indicated by the SBCLKHI signal. When they are both asserted, control proceeds from state EW1 to state EW2. Control proceeds to state EC1 from EW2 in all cases on the next PCLK signal cycle. Control proceeds directly from state ERW to state EC1 when the SBCLK signal is true and a read operation is occurring.

Control proceeds from state EC1 to state EC2 on the next rising edge of the PCLK signal. Control proceeds from state EC2 to state EC3 during read operations and then to state EST on the next PCLK signal edge. Control proceeds directly from state EC2 to state EST for write operations. If a snoop write-back is occurring, control proceeds from state EST to state EWB, where it remains during the write-back operation. When the write-back is completed, control proceeds from state EWB to state EC1 to reexecute the operation which was interrupted by the write-back. If a snoop write-back is not occurring and both the SBCLK and BCLK signals are low, as indicated by the SBCLKLO signal, or if a snoop write-back is not occurring and a write has occurred, control proceeds from state EST to state EN. In all other cases control remains at state EST. Control proceeds from state EN to state ENW if the synchronized EXRDY or SBEXRDY signal is not asserted. The SBEXRDY signal is the EXRDY signal first synchronized to the falling edge of the BCLK signal and then synchronized to the PCLK signal in phase with the HCLK signal. Control remains in state ENW when either of the SBCLK and BCLK signals are asserted and moves to state EN on the SBCLKLO signal. Control proceeds from state EN to state ERW if an EISA burst is occurring and the operation is ready, as indicated by the SMSBURST and SBEXRDY signals. The SMSBURST signal is the MSBURST signal synchronized to the PCLK signal when both the BCLK and HCLK signals are low. If a burst is not occurring and the cycle is completed, as indicated by the SBEXRDY signal being high, control proceeds from state EN to state EI to enter idle state.

Just as the ISABM and CPUMEM modules 432 and 430 had to develop the various signals for controlling the address/control buffers 166 and the data buffer 158, so does the EISABM module 434. One signal which is produced is the HSTRETCH* signal, which is provided to the EISA bus controller 110 to extend the BCLK signal to provide certain incremental timing without having to take a full BCLK wait state. The logic for developing the HSTRETCH* signal is shown in FIG. 43. A D-type flip-flop 650 is clocked by the PCLK signal and has its input tied to the non-inverting output. The state ERW and RESET signals are inputs to a two input OR gate 652, whose output is provided to the synchronous clear input of the flip-flop 650. The state EWB indication is provided to the synchronous set input of the flip-flop 650.

The noninverted output of the flip-flop 650 is also provided to one input of a two input AND gate 654, whose second input receives the EC or state EC1, 2 or 3 indication. The output of the AND gate 654 is provided to the D input of a D-type flip-flop 656. The output of a two input AND gate 658, which receives the PHASE and PCLK signals, is provided to the clock input of the flip-flop 656. The noninverted output of the flip-flop 656 is provided to one input of a three input OR gate 660, whose other two inputs receive a signal indicating that the next state will be state EC1, EC2 or EC3 or a signal indicating that the current state is state EC1, EC2 or EC3. The output of the OR gate 660 is provided as one input to a three input AND gate 662. The HWR, and HLOCMEM signals are the remaining inputs to the AND gate 662 to indicate a main memory read. A two input AND gate 664 receives the SNPWB and EI* or EISA state machine not in state EI signals. The output of the AND gate 664 and the output of the AND gate 662 are the two inputs to an OR gate 666, whose output is provided to the D input of a D-type flip-flop 668. The PHASE and PCLK signals are provided to an AND gate 670, whose output clocks the flip-flop 668. The noninverted output of the flip-flop 668 and the output of the AND gate 664 are provided as the two inputs to a NOR gate 672, whose output is the HSTRETCH* signal.

The MRASSE or master RAS set by EISA portion signal is provided either when the next state will be state ERW or the MRASSR signal is being provided. The MRASSR signal is the set signal based on the refresh state machine being in state RB. The refresh state machine will be described below. The MRASRE or master RAS reset by EISA signal is provided when either the next state is state EI and the current state is state EN, indicating a transfer to idle, or the MRASSR signal is asserted. The MRASSR signal indicates that the refresh state machine is in state RC and the SBCLKLO signal is asserted. The NMCASR or next cycle master CAS refresh signal is asserted when the refresh state machine is in states RA or RB. The NMCASE or next, master CAS by EISA cycle signal is asserted either when the NMCASR signal is asserted or when the next state is state EC, a main memory operation occurring and it is either not write protected or is a read operation. The NMWEE or next cycle memory write enable by EISA signal is provided when the next state is either EW2, EC, or EWB, and a not write protected write to main memory is occurring. The NMALEE signal is provided when the next state is other than states EC1, EC2 or EC3. The MALLBESE signal is provided during read operations when the state is other than EI or ERS or when the refresh state machine is not in state RI. The NDMHLEE or next cycle MDHD latch enable by EISA signal is provided during state EW1 for reads and state EC2 for writes. The NDHOEE or next cycle HD output enable by EISA signal is provided during the ERW states which are reads to local memory and is provided to the input of a latch which has its open or enable period on the high level of the CMD* signal. The output of the latch is the DHOEE signal. The NMDOEE or next cycle MD output enable by EISA signal is not asserted when read operations are occurring and the next state is state ERW, EC1, EC2, EC3, or EBW, the state is state EC1, EC2, or EC3 or the state following an EC1, EC2 or EC3 state, i.e. the first entry into state EST.

Figure 44:
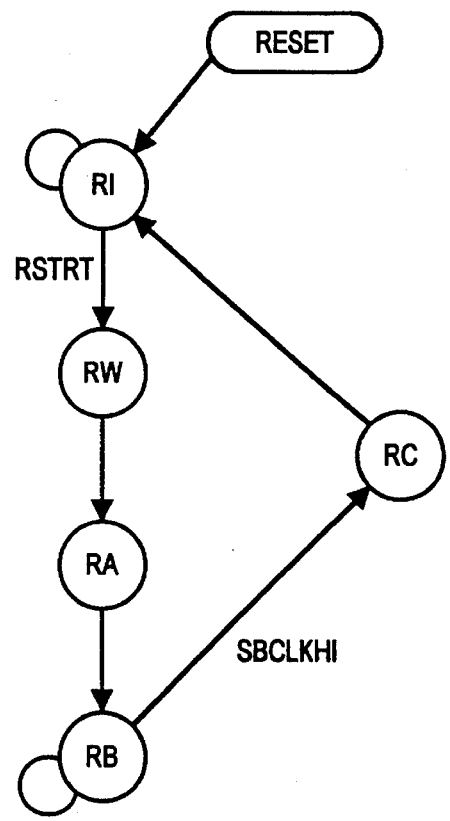

The REFRESH state machine used in the REFSM module 442 is shown in FIG. 44. It commences operation after reset in state RI, where it remains until it sees the RSTRT or refresh start signal. The RSTRT signal is provided when the SBCLK signal, the START signal, the REFRESH signal and the HHLDA signal are asserted. This is the indication of the beginning of the start portion of a refresh cycle on the EISA bus. When the RSTRT signal is asserted, control proceeds from state RI to state RW. Control proceeds to state RA and then to state RB on successive PCLK signal rising edges. Control remains at state RB until the SBCLKHI signal is asserted. At that time it proceeds to state RC and then to state RI.

The MABCON module 436 provides the various MRAS*, MCAS*, MALLBES*, MALE, MWE*, MSELCA*, and MADRINC* signals to the address/control buffers 166. The MRAS or master RAS signal and MRAS* signal are provided at the outputs of a JK flip-flop which receives at its J input the OR of the MRASSC, MRASSI and MRASSE signals and at its K input receives the OR of the MRASRC, MRASRI and MRASRE signals. This flip-flop is clocked by the PCLK signal. The MCAS* signal is provided as the inverted output of a D-type flip-flop clocked by the PCLK signal and receiving at its D input the OR of the NMCASC, NMCASI and NMCASE signals. The NMSELCA signal is produced by the AND of the MRAS signal, the SPD60 signal and a signal indicating bus master cycle is not in progress. This signal is provided to the D input of a flip-flop which is clocked by the output of an AND gate which receives the MRAS and PCLK signals. The inverted output is the MSELCA* signal. The MALLBES* signal is provided as the output of a multiplexor which receives as its select input the signal indicating that a write-back is not occurring and has as its zero input the output of a NOR gate which receives the MALLBESE and MALLBESI signals and as its one input the inverse of the MALLBESC signal. The MALE signal is provided at the output of a D-type flip-flop whose input receives the AND of the NMALEC and NMALEE signals and is clocked by the PCLK signal. The MADRINC* signal is produced at the noninverted output of a D-type flip-flop which receives the NMADRINCC* signal and is clocked by the PCLK signal. The MWE* signal is produced by the inverted output of a D-type flip-flop which receives at its D input the OR of the NMWEI and NMWEE signals and is clocked by the PCLK signal when no write-back is in progress.

The MDBCON module 438 provides the various selects, latches and output enable signals to the data buffer 158 by combining them from various other sources. The MDSEL<1 . . 0> signals are provided by the output of two D-type flip-flops whose inputs receive the NDMSEL<1 . . 0> signals and are clocked by the PCLK signal. The NDMSEL<1> signal receives a signal indicating that a write-back is not in progress, while the NDMSEL<0> signal receives the output of an AND gate which receives at its inputs the NDMSELOC signal and the BMNOWB* signal. The MDHDLE signal is provided at the non-inverting output of a D-type flip-flop clocked by the PCLK signal whose D input receives the output of an OR gate which receives the NDMHLEI and NDMHLEE signals. The MDPDLE signal is provided at the output of a PCLK signal clocked D-type flip-flop which receives at its input the NDMPLE signal. The MDOE* signal is provided as the inverted output of a D-type flip-flop which receives at its D input the AND of the NMDOEI and NMDOEE signals and is clocked by an AND gate whose inputs are the synchronized BMNOWB and PCLK signals. The HDOE* signal is provided at the output of a NOR gate which receives the DHOEI and DHOEE signals.

Figure 45:
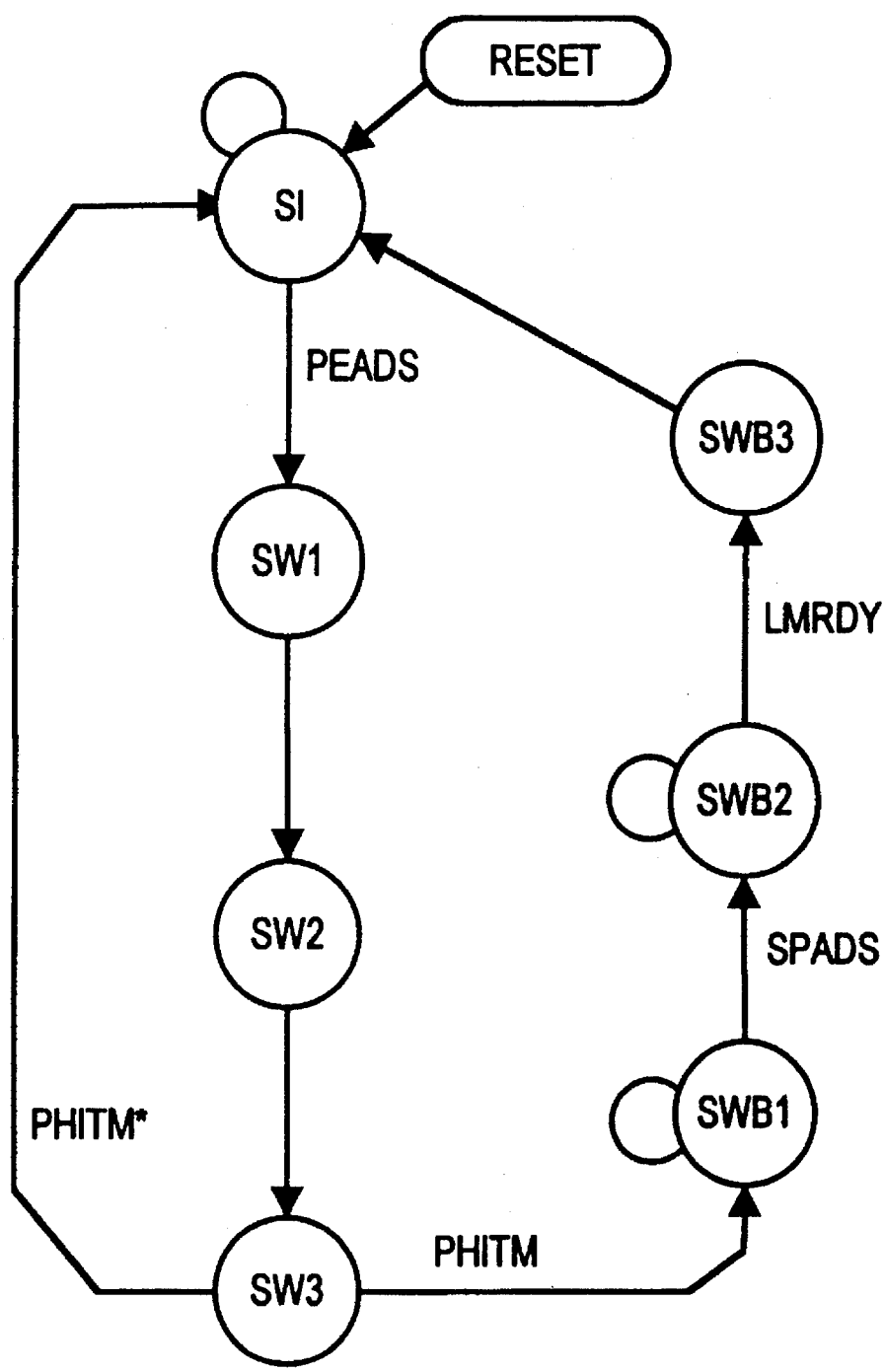

One other function in the MCON module 402 is the SNPCON or snoop control module 440. This module 440 is responsible for providing snoop strobes to be used by the various caches and to provide an indication that a write-back is occurring. This module 440 utilizes the snoop state machine shown in FIG. 45. This state machine commences at state SI upon reset. When the PEADS or processor external address signal is not received, control remains at state SI. The PEADS signal is provided at the output of a D-type flip-flop which is clocked by the PCLK signal and receives at its D input the output of an AND gate which receives the HNCA* signal to indicate a cacheable address and the OR of the SNPSTBI and SNPSNBE signals. The SNPSTBE signal is produced during state ERW when the SBCLK signal is asserted. The SNPSTBI signal is asserted when the NISACMD signal is true and the ISACMD signal is not true. When it is received, control proceeds to state SW1 and then to states SW2 and SW3 on succeeding PCLK signal rising edges. If there is no indication that a processor cache hit has occurred, control returns to state SI. If a hit has occurred, control proceeds to state SWB1. Control remains at state SWB1 until the SPADS signal is received. Control then proceeds to state SWB2. Control remains in this state until the LMRDY signal is received, at which time control proceeds to state SWB3 and from there to state SI. The SNPWB or snoop write-back in progress signal is provided when the state machine is in states SWB1, SWB2 or SWB3.

Various other miscellaneous signals are produced in the MCON module 402. For example, the BMPROG or bus master in progress signal is produced by the ORing of the BMPROGI and BMPROGE signals. The BMPROGI signal is the ISACMD signal, while the BMPROGE signal is provided when the EISA state machine is not in state EC or the refresh state machine is not in state R1. The BMNOWB or bus master in progress and not writing back signal is produced by the ANDing of the BMPROG bus master in progress and SWBPROG* or synchronized write-back in progress signals. The SWBPROG signal is provided when the snoop state machine is in state SWB1 or the next state is state SWB2.

The MDHDSEL<1 . . 0> signals are produced by the HA<3 . . 2> signals, which are produced as follows. The NHALEI and NHALEE signals are ANDed to form the NHALEBM signal. The NHALEE signal is active when the next state of the EISA state machine will be state EI, ENW or EN, the state is EI or ERS or if the state is EC2, a write is occurring and it is not a snoop write-back. The NHALEI signal is the inverse of the ISACMD signal. The NHALEBM signal in turn is used as the selection input for multiplexors connected to the D inputs of two D-type flip-flops, which are clocked by the PCLK signal. The one input of the multiplexors receives the HA<3> and HA<4> signals from the HA bus as being driven by the bus master. The zero input of the multiplexors receives the noninverted output of the flip-flops. The noninverted outputs of the flip-flops is also provided to the inputs of two latches. The OR of the BMLEI and BMLEE signals is provided as the enable input for the latches. The BMLEI signal is asserted when the ISA state machine is in state IR2. The BMLEE signal is asserted when the EISA state machine is in state ERW. The noninverted outputs of the latches are the BM_HA<3 . . 2> signals, which are also the MDHDSEL<1 . . 0> signals.

Figure 46:
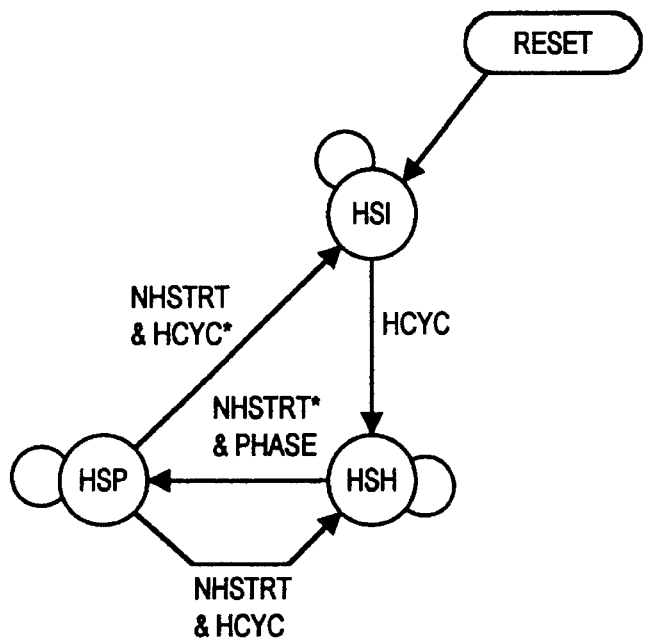

The HCON module 404 also includes a number of state machines and modules to develop its necessary signals. The first of these modules is the HSYNC or host sync module 446. The HSYNC state machine is shown in FIG. 46. Control proceeds on reset to state HSI, where control remains while the HCYC signal from the FECON module 400 is not received. As soon as the HCYC signal is received, control proceeds to state HSH, where it remains until the NHSTRT or next cycle host start signal is true or when phase is not properly asserted, that is, the PCLK and HCLK signals are do not have their rising edges aligned. If the NHSTRT signal is not asserted and the phase is proper, control proceeds to state HSP. Control remains in state HSP while the NHSTRT signal is not asserted. If the NHSTRT signal is asserted at the same time as the HCYC signal, indicating another cycle is requested, control returns to state HSH. If the NHSTRT signal is asserted and the HCYC signal is not asserted, control returns to state HSI to idle.

The NHACK or next cycle HACK signal is provided during transfers when the next state will be state HSI or when the current state is state HSP and the NHSTRT signal is asserted. The HACK signal is provided at the output of a D-type flip-flop clocked by the PCLK signal and receiving the NHACK signal at its D input. The HREQ or host cycle requested signal is asserted when the next state is the HSH state, during the HSH state or when the HATO signal is not asserted. The HATO signal indicates that the necessary address cycles have been completed.

Figure 47:
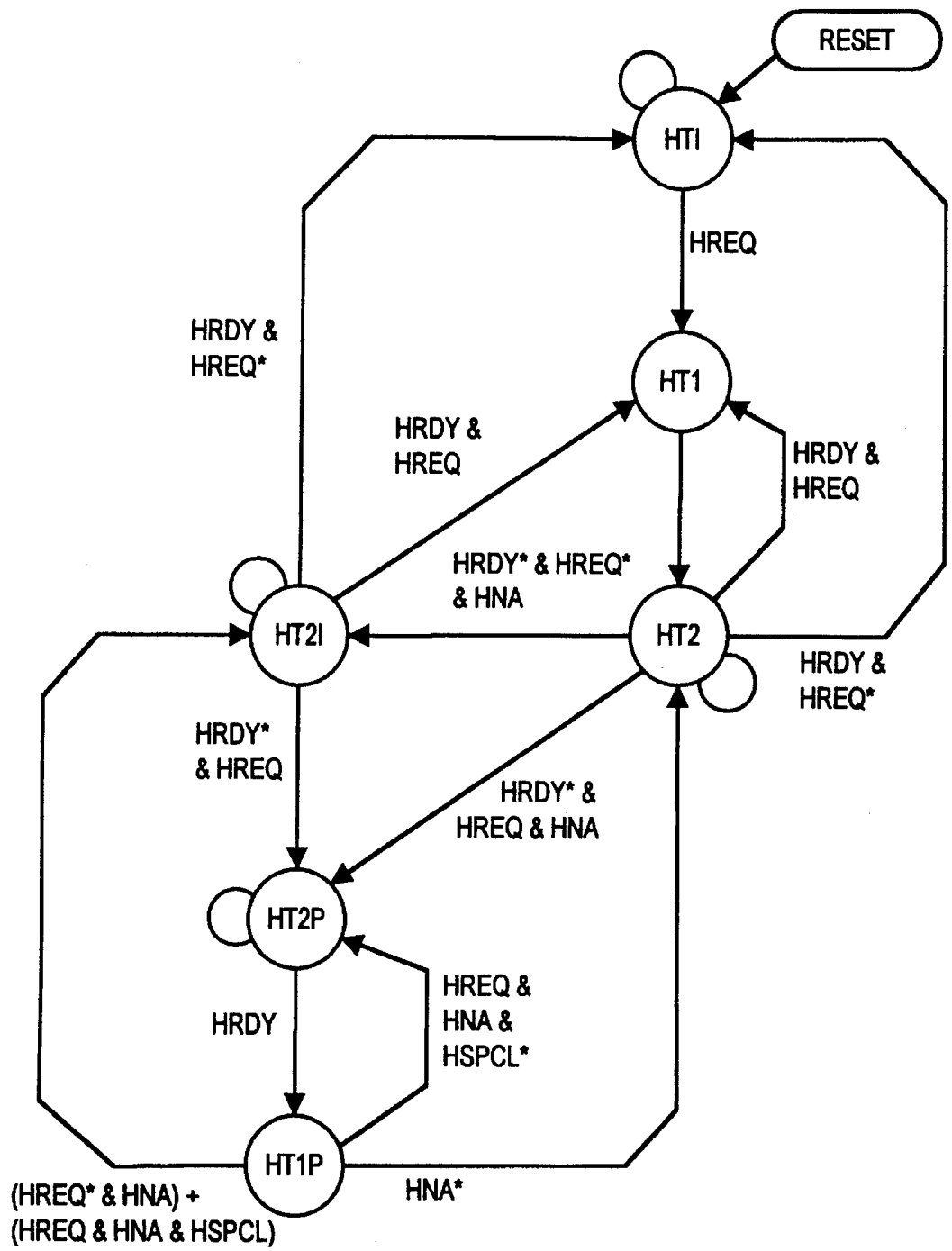

The next control module utilized in the HCON module 404 is the HOST module 448, which uses the HOST state machine shown in FIG. 47. This module 448 provides the control of signals on the host bus when the memory controller 156 is acting as a bus master. Control commences at state HTI upon reset and remains in that state while the HREQ signal is not asserted, indicating that a host bus cycle has not been requested. When the HREQ signal is asserted, control proceeds to state HT1. On the next rising edge of the PCLK signal, control proceeds to state HT2. Control returns from state HT2 back to state HT1 if the HRDY signal is asserted and the HREQ signal is asserted, indicating that one cycle has completed and another is pending. Control returns from state HT2 back to state HTI when the HRDY signal is asserted indicating that the host operation is completed and the HREQ signal is not asserted. Control proceeds from state HT2 to state HT2I if the HRDY signal is not asserted, the HREQ signal is not asserted and the HNA signal is asserted. This initiates pipelining of the host bus H and is an idle state. Control proceeds from state HT2 to state HT2P if the HRDY signal is not asserted, the HREQ signal is asserted and the HNA signal is asserted. This is the pipelined and not idle condition. Thus HT2I and HT2P are pipelined states. For all other conditions, control remains at state HT2.

Control proceeds from state HT2I back to state HT1 when the HRDY signal and the HREQ signal are both present, indicating an exit from pipelining and a new cycle request. Control Proceeds from state HT2I to state HTI when the HRDY signal is received and the HREQ signal is not active. Control returns to state HTI to begin idling. If the HRDY signal is not asserted and the HREQ signal is asserted, control proceeds from state HT2I to state HT2P. In all other cases control remains at state HT2I. Control proceeds from state HT2P to state HT1P when the HRDY signal is asserted. Otherwise control remains at state H2P. Control returns from state HT1P to state HT2P when the HREQ signal is asserted, indicating a new cycle is requested; the HNA signal is asserted, indicating that a new pipelined address can be provided and it is not a special cycle on the host bus. Control proceeds from state HT1P to state HT2I if the HREQ signal is not asserted and the HNA signal is asserted or if the HREQ signal is asserted, the HNA signal is asserted and its a special cycle. Control proceeds from state HT1P to state HT2 if the HNA signal is not asserted, indicating that pipeline mode is being exited.

A signal referred to as NHADS is asserted when the next state will be HT1 or HT2P and the operation is not to the main memory. The HADS* signal is asserted by the inverted output of a D-type flip-flop which receives the NHADS signal at its D input during the PHASE signal and the noninverted output during the PHASE* signal and which is clocked by the PCLK signal. The NLHADS signal is asserted when the next state is HT1 or HT2P and it is a transfer operation with the main memory. The LHADS signal is asserted as the noninverted output of a D-type flip-flop which receives the NLHADS signal at its D input during the PHASE signal and the noninverted output during the PHASE* signal and which is clocked by the PCLK signal.

Figure 48:
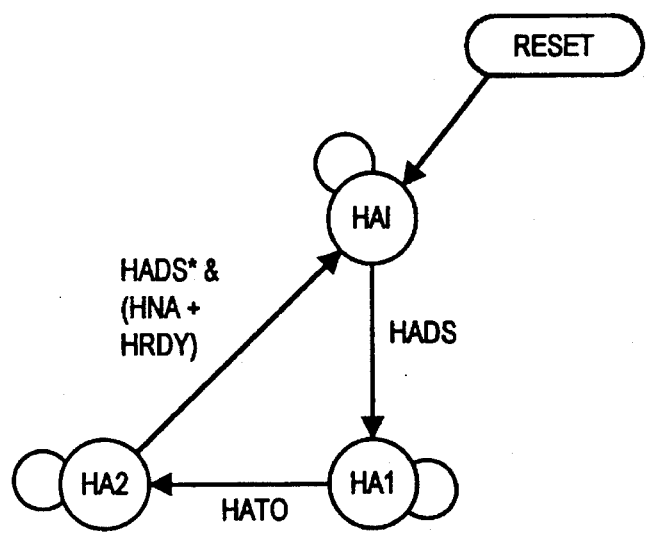

The HACON or host address control module 452 is used to develop the HBE and HA signals. A state machine referred to as the HADD or host address state machine is shown in FIG. 48. The state machine begins operation at state HAI upon reset. Control proceeds to state HA1 when the HADS signal is asserted and in other cases remains in state HAI. Control remains at state HA1 while the HATO signal is not asserted, indicating that the final host address cycle has not been executed. When the HATO signal is asserted, indicating that the final cycle has been completed, control proceeds from state HA1 to state HA2. The HATO signal is provided by a down counter which is loaded with a value indicating how many 32 bit cycles must be run to complete the cycle in progress. Control proceeds from state HA2 to state HAI when the HADS signal is not asserted and either the HNA or HRDY signals are asserted. At other times control remains at state HA2. The NHSTRT signal is asserted when the next state is HAI or when the present state is HAI. The NHASLE signal or next host address latch enable signal is provided when the next state is HAI and the NHACK signal is asserted or when the next state is HA2 and the HADS signal is not asserted. The HALE signal is provided as the noninverted output of a D-type flip-flop clocked by the PCLK signal and receiving the NHASLE signal at its D input. The HALE signal is used to latch the processor cycle definition signals to the host bus and to latch the addresses in the transceiver latch 160.

Figure 49:
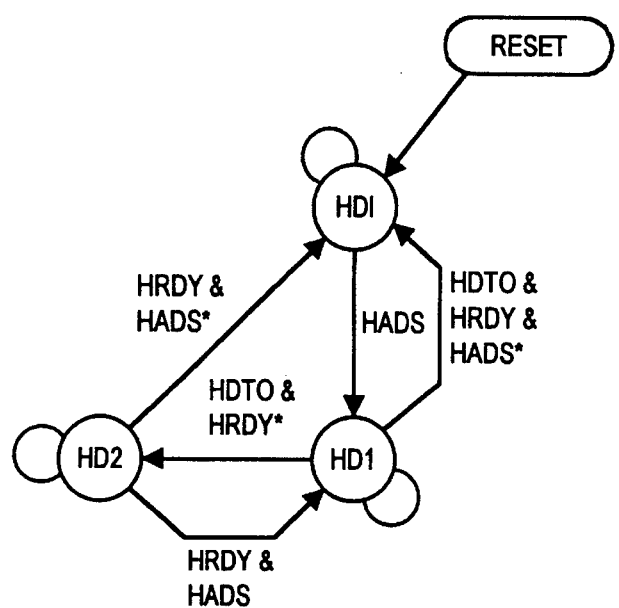

The HDCON or host data control module 454 also utilizes a state machine. In this case the state machine is the HDAT or host data state machine shown in FIG. 49. The state machine tracks the host bus cycles with respect to the data so that the data buffer 158 can be operated properly. The state machine begins at state HDI upon reset and remains in that state while the HADS signal is not asserted. Control proceeds to state HD1 when then HADS signal is asserted. Control returns from state HD1 to state HDI when the HDTO signal is asserted, the HRDY signal is asserted and the HADS signal is not asserted, indicating that all of the data has been transferred and a new cycle is not being requested. The HDTO signal is similar to the HATO signal, except it counts data transfers. Different counters are necessary because of pipelining. Control proceeds from state HD1 to state HD2 when the HDTO signal is asserted and the HRDY signal has not been asserted, indicating that the final transfer is not completed. Control remains at state HD1 in all other cases. Control proceeds from state HD2 back to state HD1 when the HRDY signal is asserted and the HADS signal is asserted, indicating that the previous cycle has completed and a new cycle is being requested. Control proceeds from state HD2 to state HDI when the HRDY signal is asserted and the HADS signal is not asserted, indicating that the cycle is completed and a new cycle is not requested. Control remains at state HD2 while the HRDY signal is not asserted. The HPROG or host cycle in progress signal is provided when the next state of the state machine will be state HD1. The HEND or host cycle ending signal is provided in state HD2.

The HDCON module 454 is also responsible for providing signals to the data buffer 158 as described. To this end the HDSEL<1..0> signals are developed. The HDSEL<1> signal is the HHLDA signal. The HDSEL<0> signal is developed by the output of a D-type flip-flop clocked by the PCLK signal when in phase and has a zero value provided to the D input when the host data cycle is in progress, the previous data transfer has completed and a cache line fill is in progress or when the host data cycle is in progress, the previous data transfer has counted out, a cache line fill is not occurring and the lower 4 byte enables of the processor 152 are being utilized. The D-input receives a one value when data start has been initiated as indicated by the HTDO signal being true and a host cycle in progress and neither a host cache line fill is occurring nor the upper four byte enables are to be utilized. The inverse of the output of the flip-flop is provided to its input when a cycle is not occurring and the HRDY signal is asserted. In all other cases the output of the flip-flop remains the same.

The HDOE* signal, which is an AND combination of the HDOEM* signal provided from the MCON module 402 and a signal referred to as HDOEH*. The HDOEH* signal is provided as the output of a D-type flip-flop clocked by the combination of the PCLK signal and the PHASE signal. If a host cycle is in progress, the input receives the inverse of the HDWR signal. If the HEND signal and the HRDY signal are both true, then a one is provided, so that on the next PCLK edge which is in phase the HDOEH* signal is deasserted. The HDPDLE<1..0> signals are provided at the outputs of two J-K flip-flops. The flip-flops are clocked by the PCLK signal. The K inputs to the flip-flops receive the respective outputs of the flip-flops. The J inputs to the flip-flops are the ANDed combination of the PHASE signal, the HERDY signal, a signal referred to as HDLWR and, for bit 1 the DHLO* signal indicating that the higher double word is being operated on, or for bit 0 the HDLO signal indicating that the lower double word is being operated on. The HDLWR signal is provided at the output of a D-type flip-flop which is clocked by the PCLK signal ANDed with the PHASE signal and the HPROG signal. The input receives the inverse of the HDWR signal.

Figure 50:
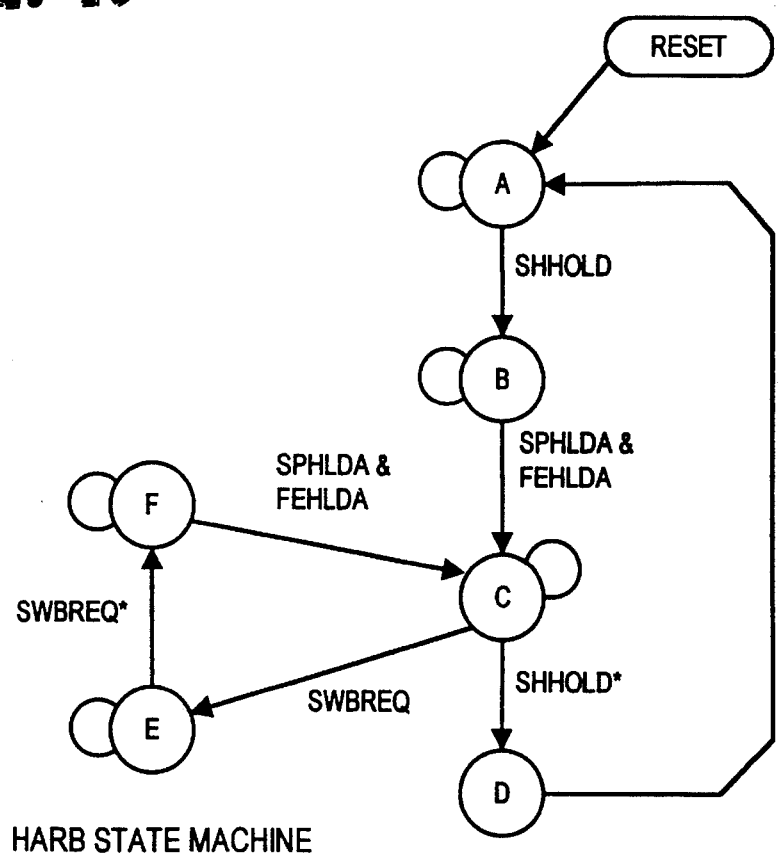

The HARB or host bus arbitrator 408 utilizes a state machine, the HARB state machine of FIG. 50. The state machine begins operation upon reset in state A, where it remains until the SHHOLD or synchronized HHOLD signal is asserted. Control then proceeds to state B. Control remains in state B until the SPHLDA or synchronized PHLDA signal and the FEHLDA signal are asserted. Control then proceeds to state C. Control proceeds from state C to state D when the SHHOLD* signal is asserted. Control proceeds from state D to state A in all cases. Control proceeds from state C to state E when the SWBREQ signal is asserted. In all other cases control remains at state C. Control proceeds from state E to state F when the SWBREQ* signal is asserted and while the SWBREQ or synchronized write-back request signal is asserted remains in state E. Control proceeds from state F to state C when the SPHLDA signal and the FEHLDA signals are asserted. Otherwise control remains at state F. The AHOLD or address hold signal provided to the processor 152 is developed at the output of a D-type flip-flop which receives at its input the output of an OR gate which receives the NPAHOLD signal and the CAHOLD signal. The NPAHOLD signal is asserted when the next state will be state C, state D, state E or state F. The CAHOLD signal is provided from the cache controller 406 during read allocate cache line fill cycles of the L2 cache 154. The NPHOLD signal is asserted when the next state will be state B, state C, state D or state F. The PHOLD signal is asserted to the processor 152 from the output of a D-type flip-flop which receives at its input the NPHOLD signal and is clocked by the PCLK signal. The NHHLDA signal is asserted when the next state will be state C, state E or state F. The HHLDA signal is provided by the output of a D-type flip-flop which receives at its input the NHHLDA signal and is clocked by the combination of the PCLK and PHASE signals.

Figure 52:
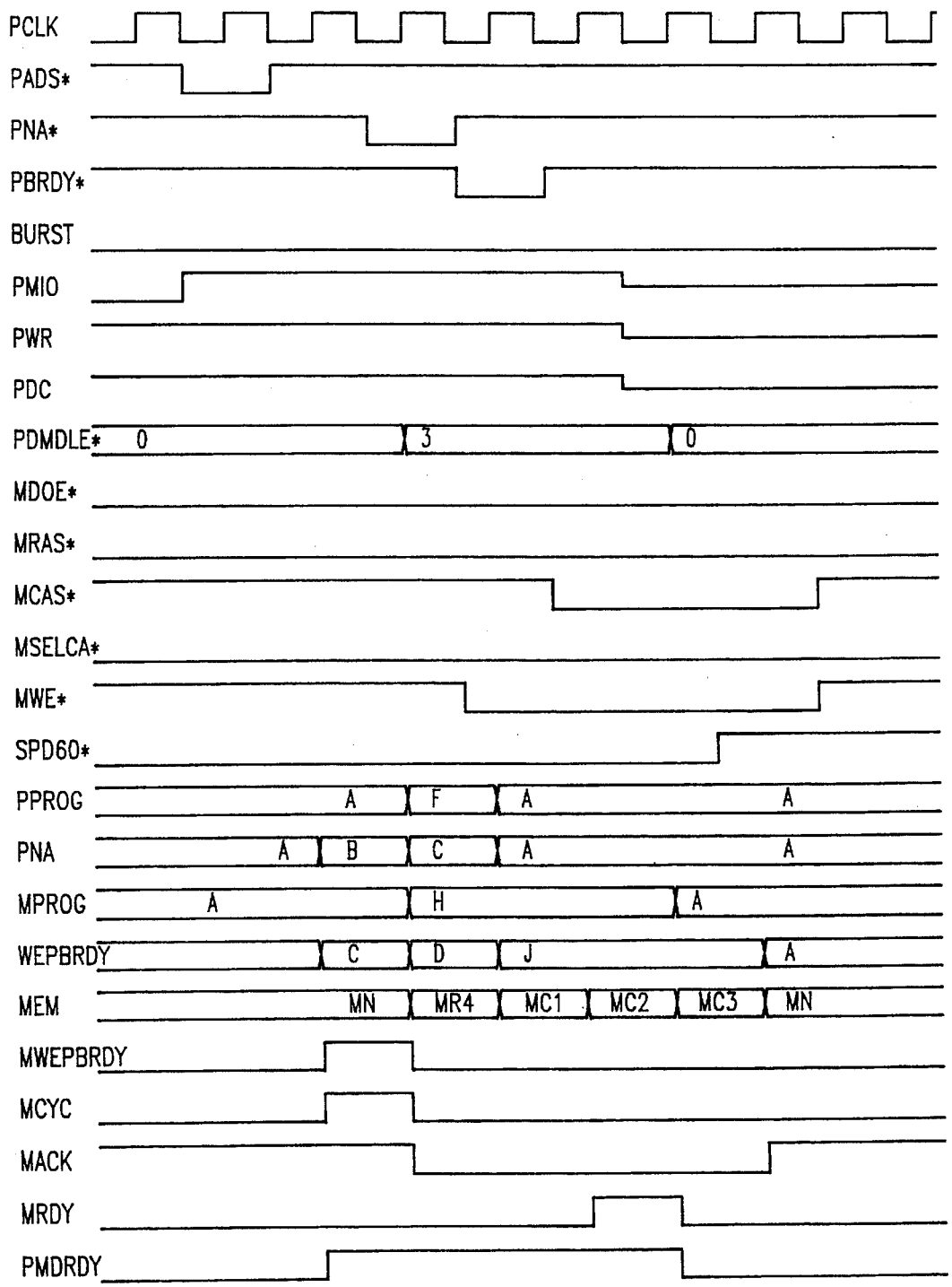
FIGS. 52–69 are timing diagrams of various cycles of the memory controller of FIG. 4.
Figure 53:
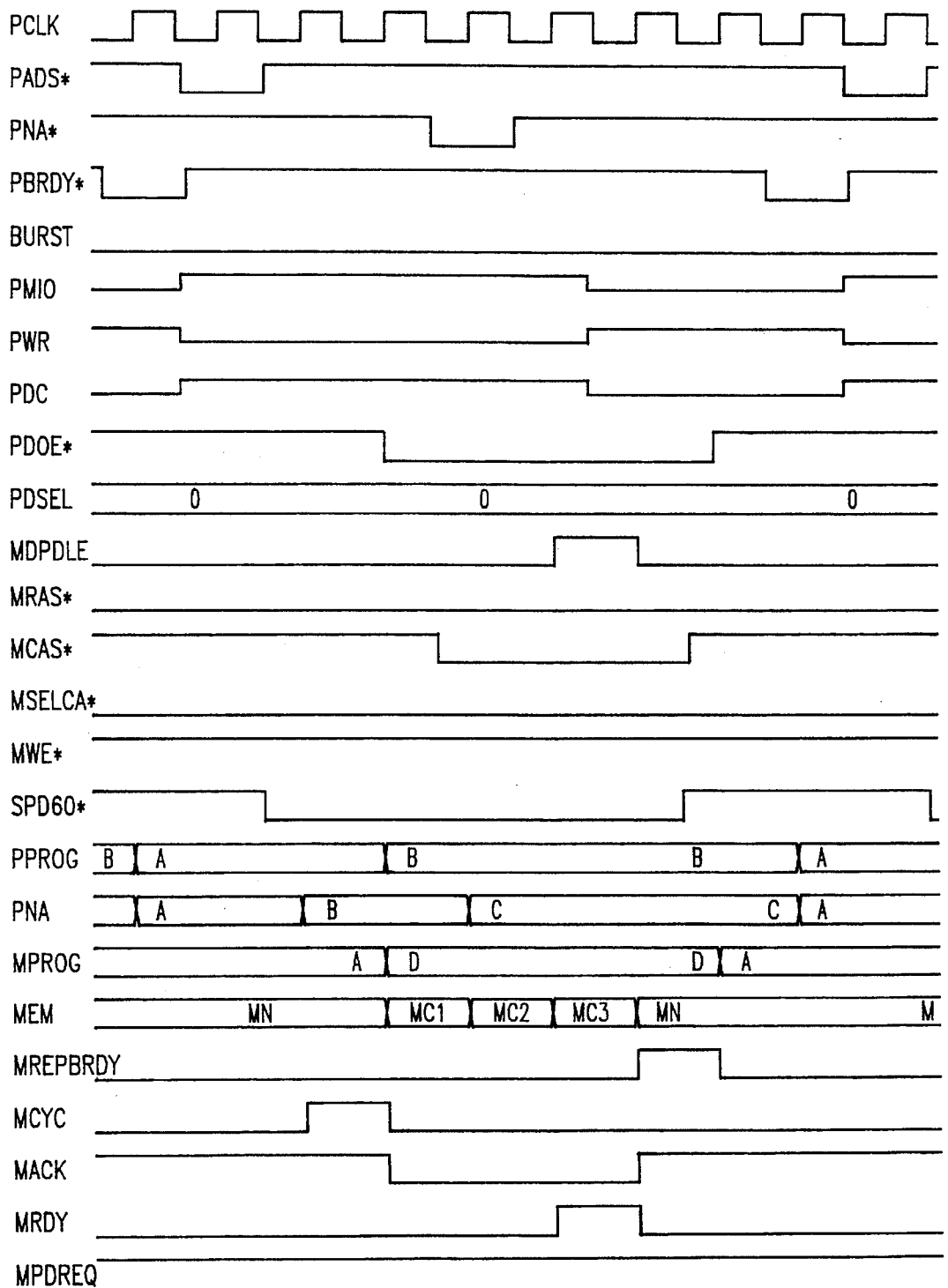
Figure 54:
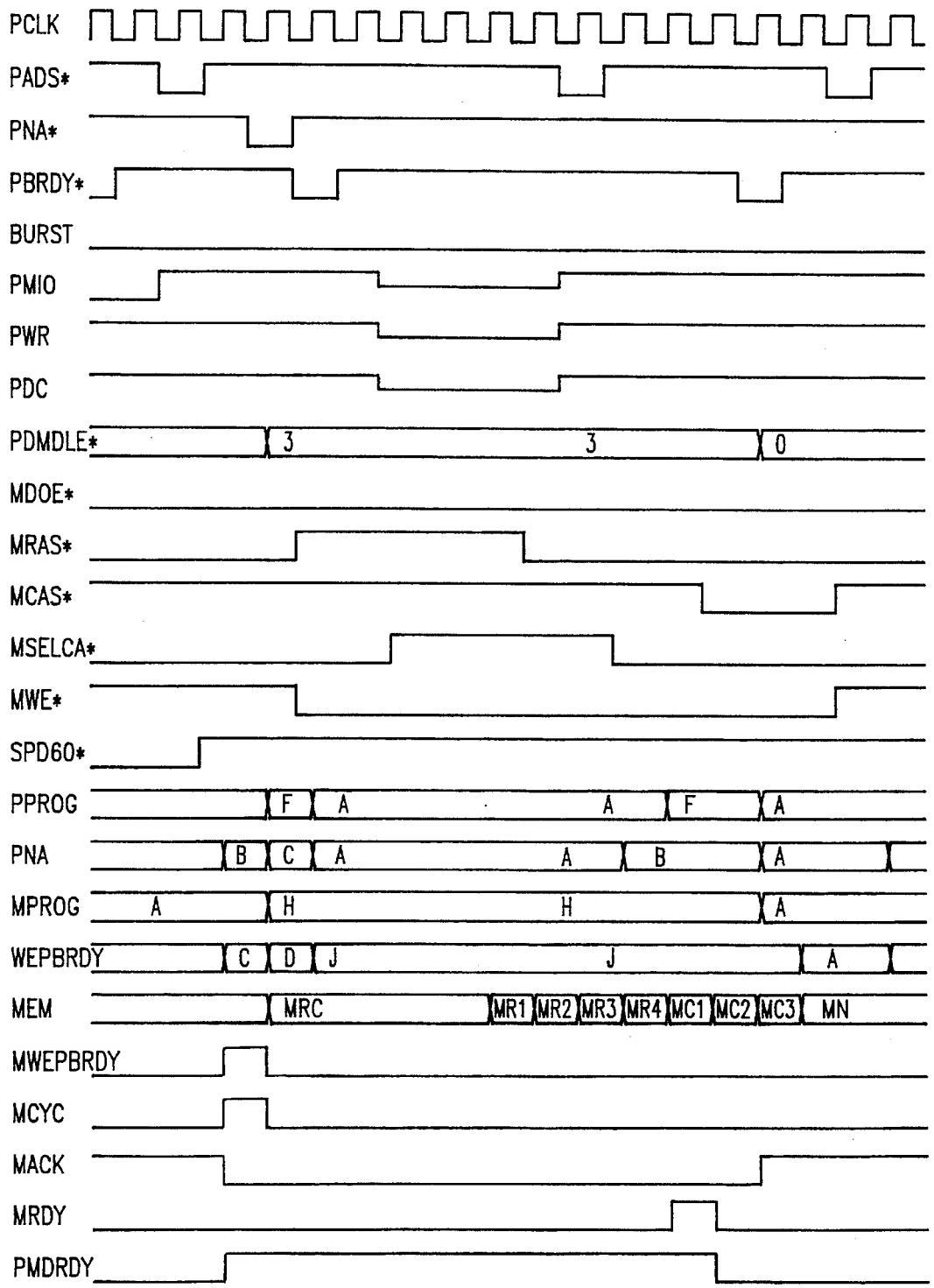
Figure 55:
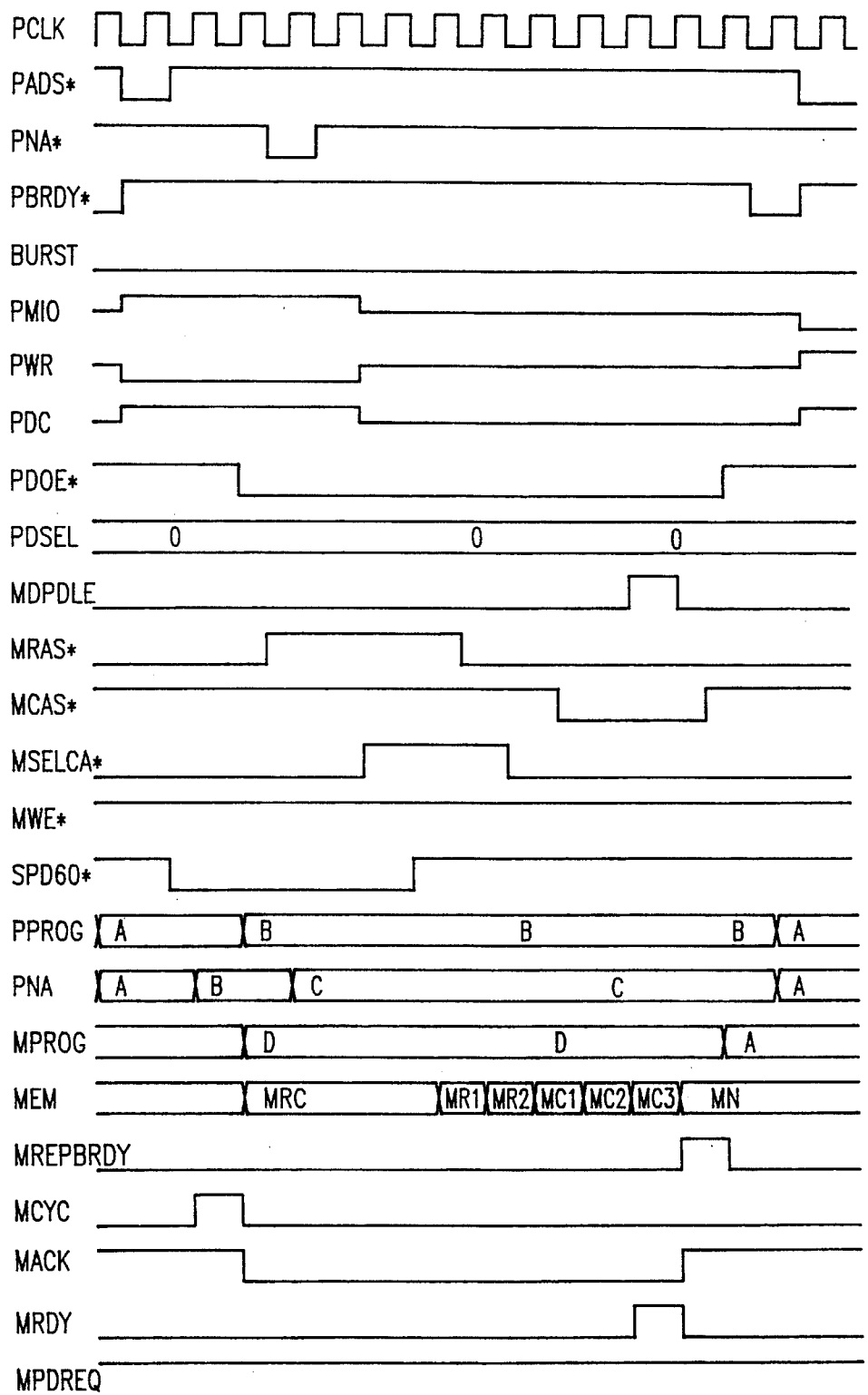
Figure 56:
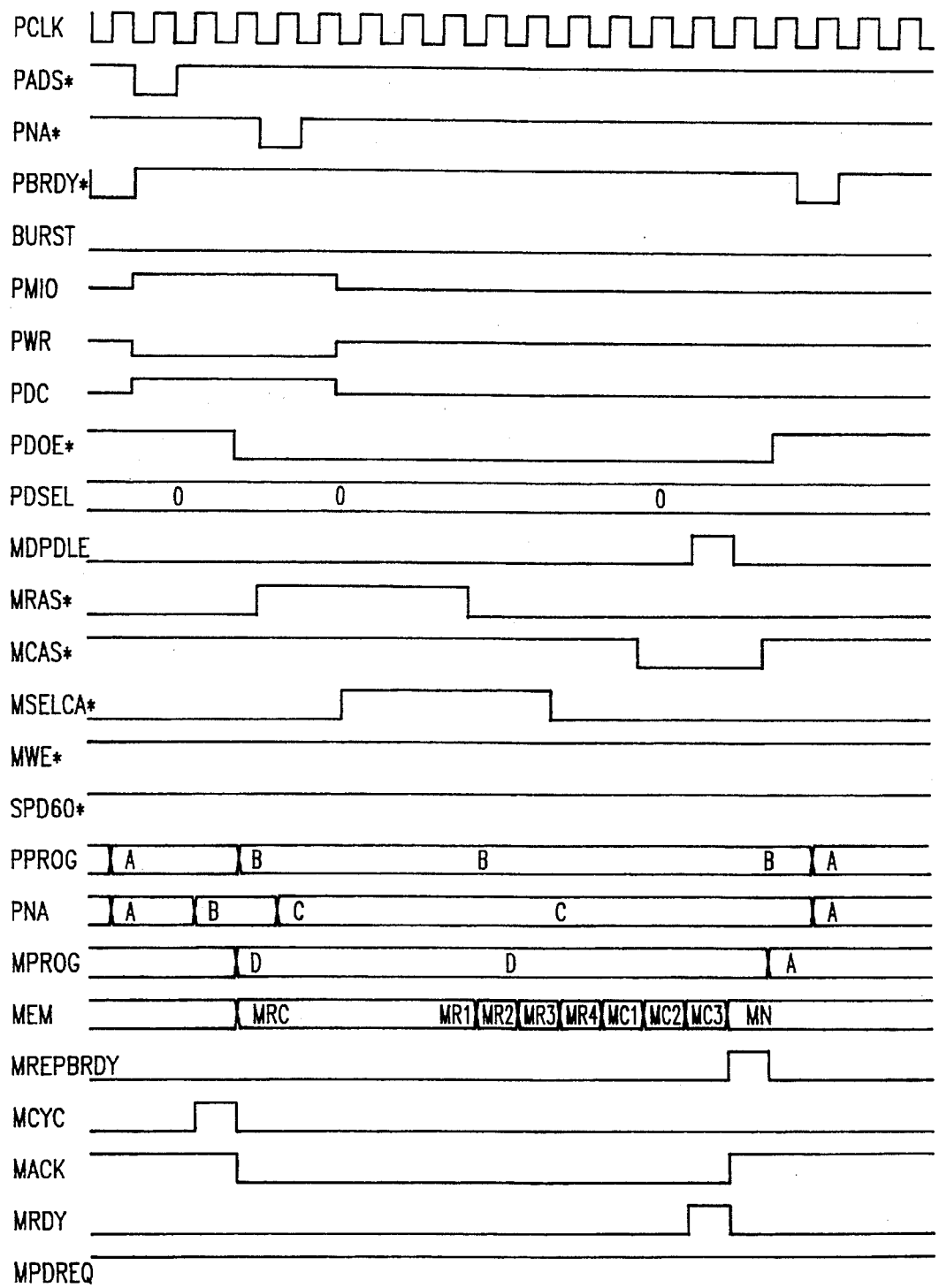
Figure 57:
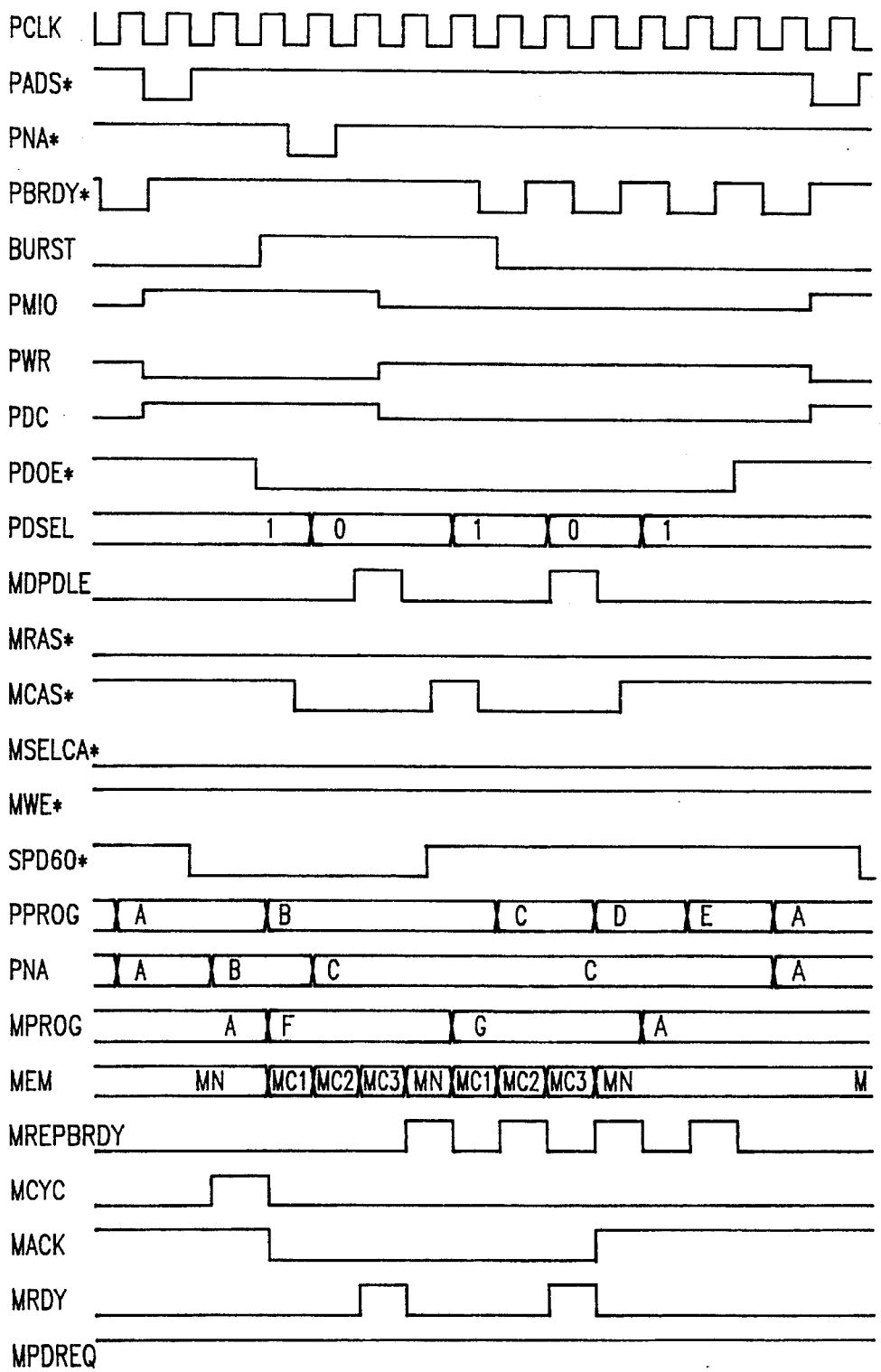
Figure 58:
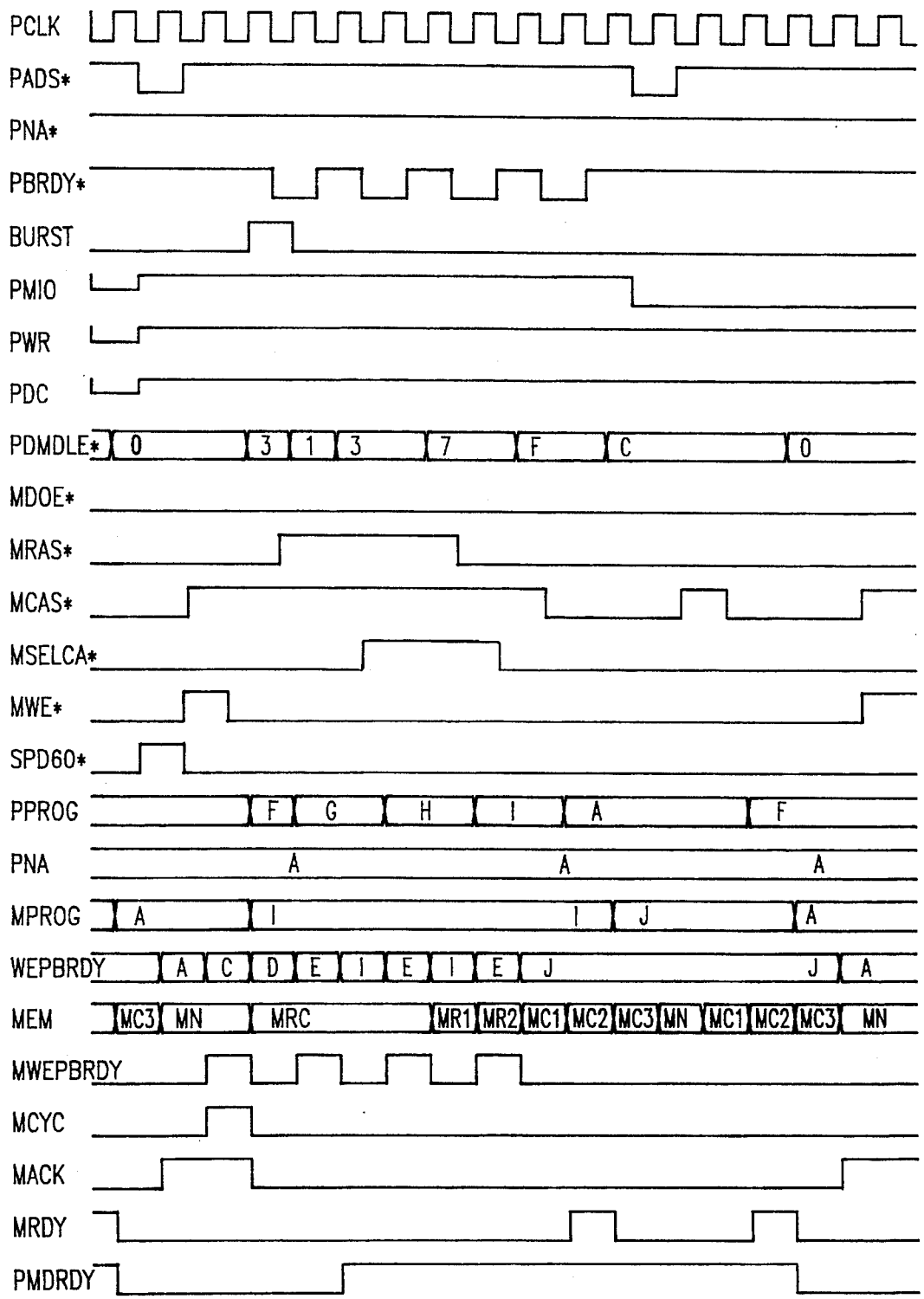
Figure 59:
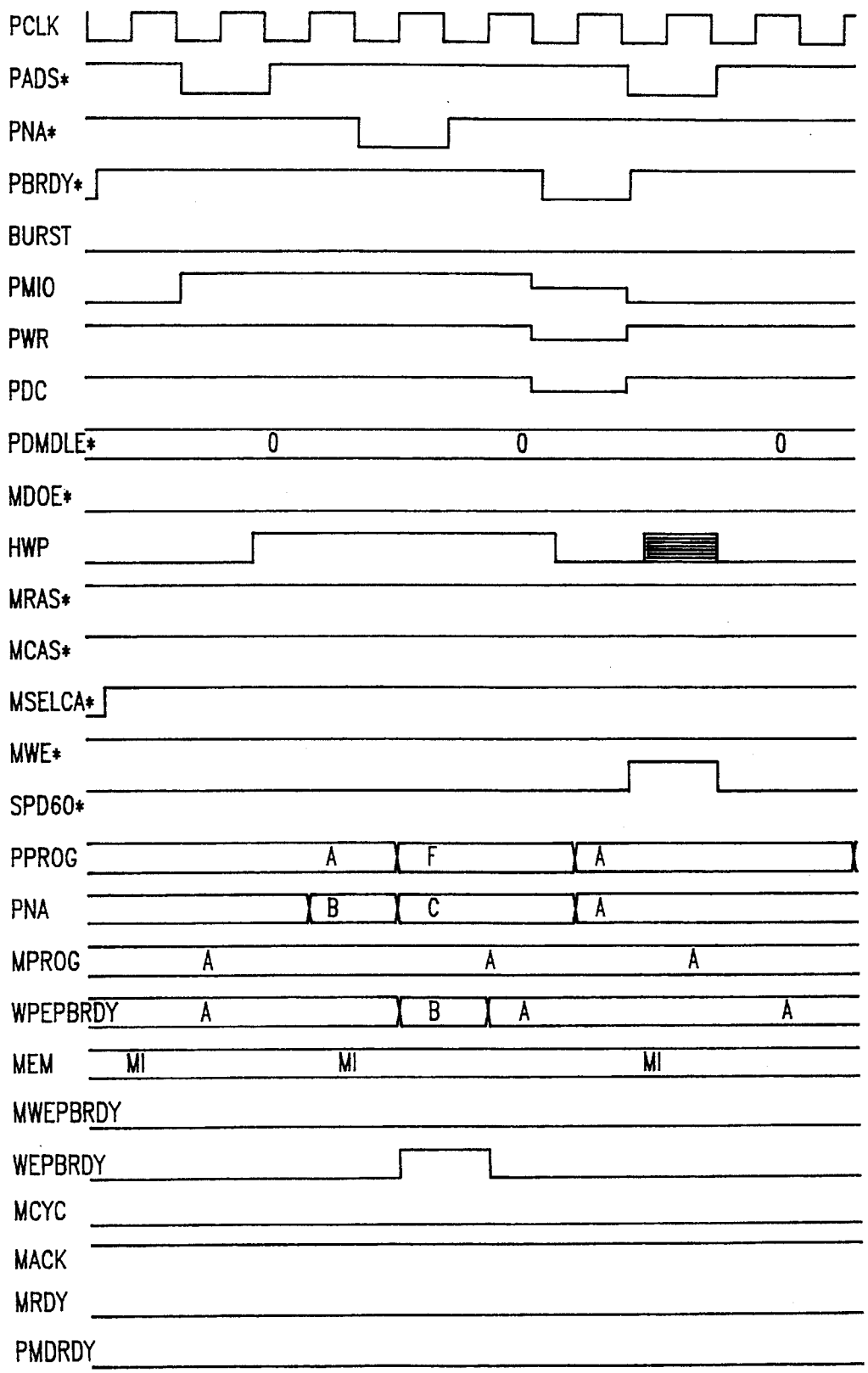
Figure 60:
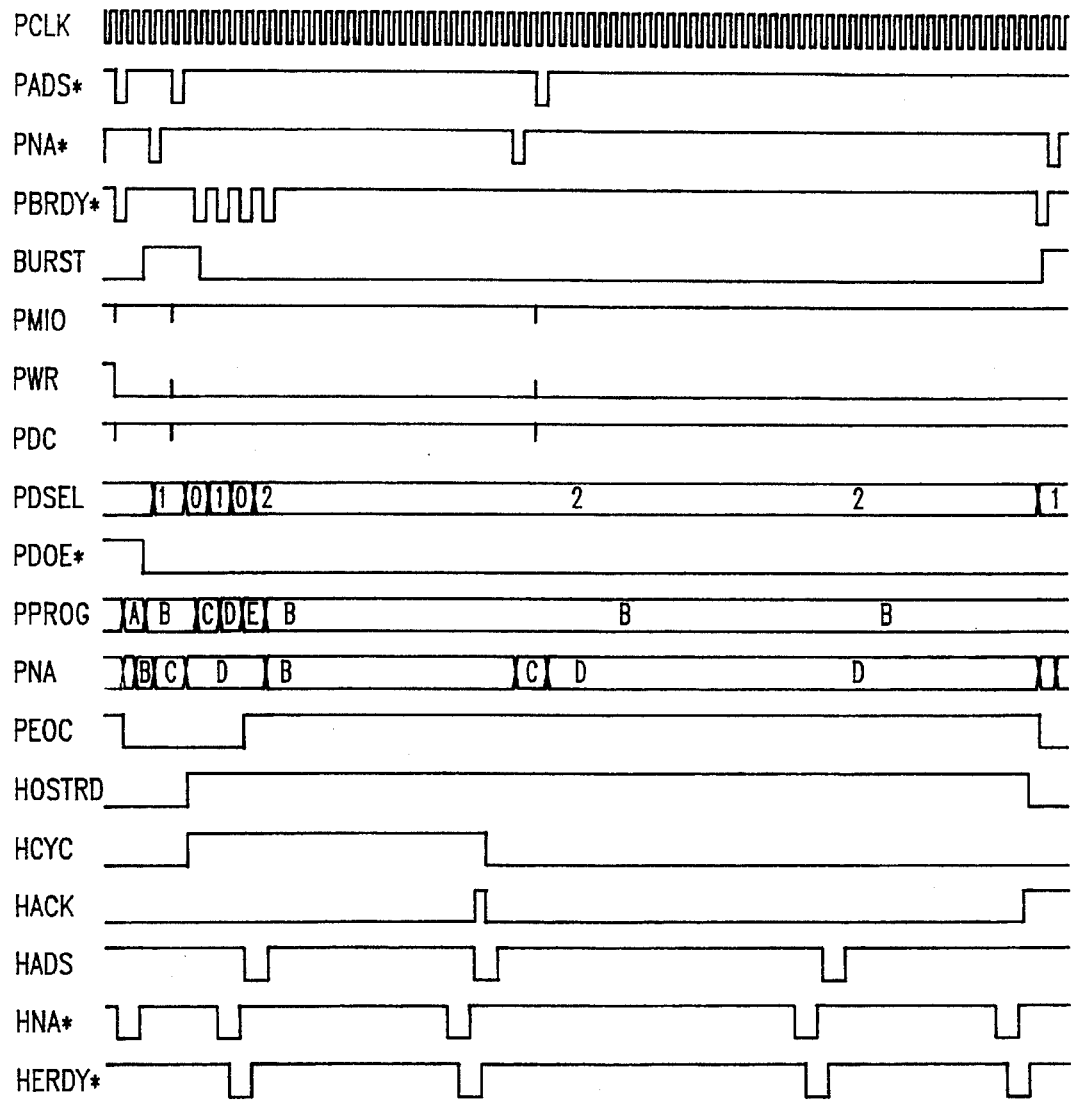
Figure 61:
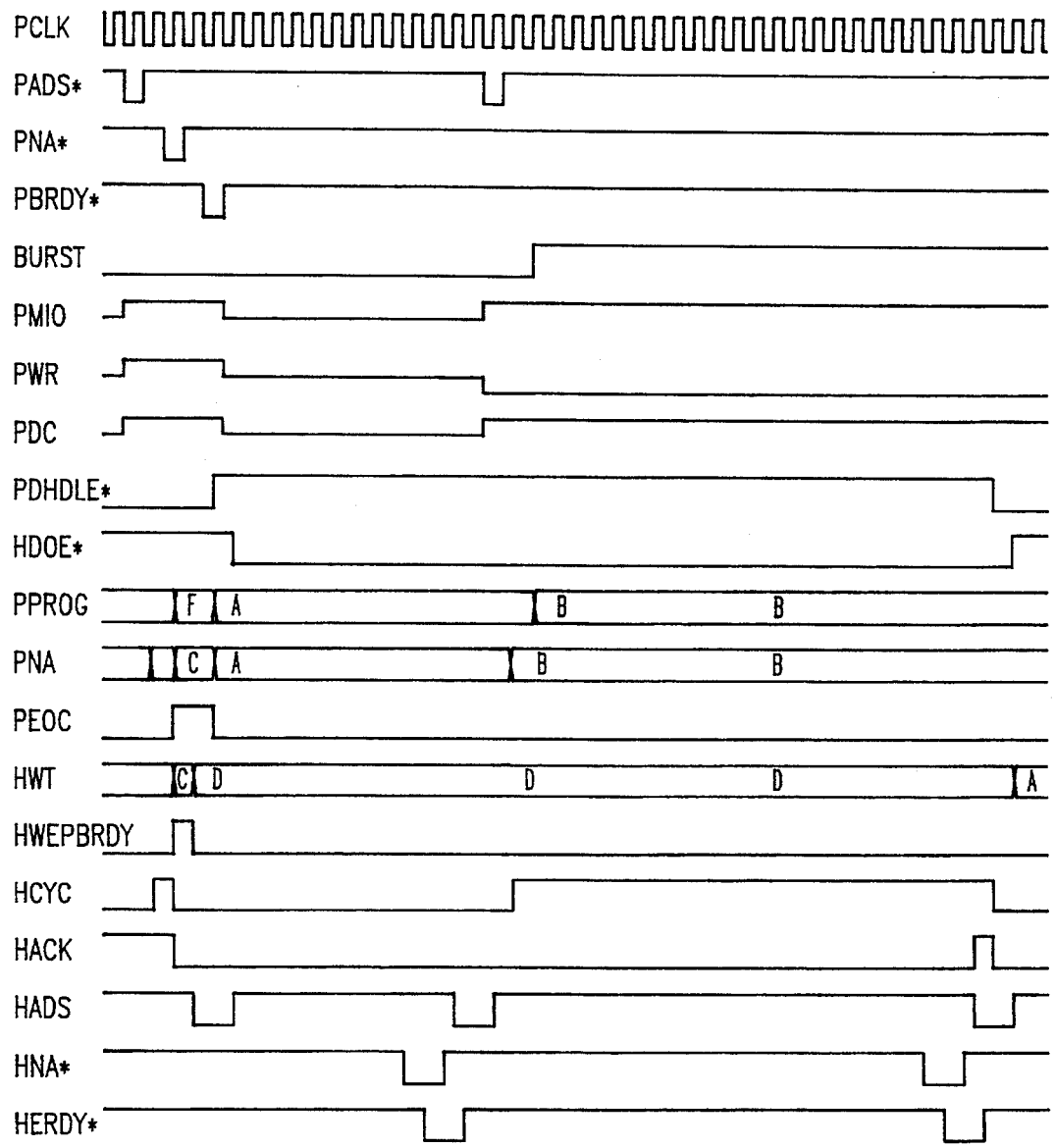
Figure 62:
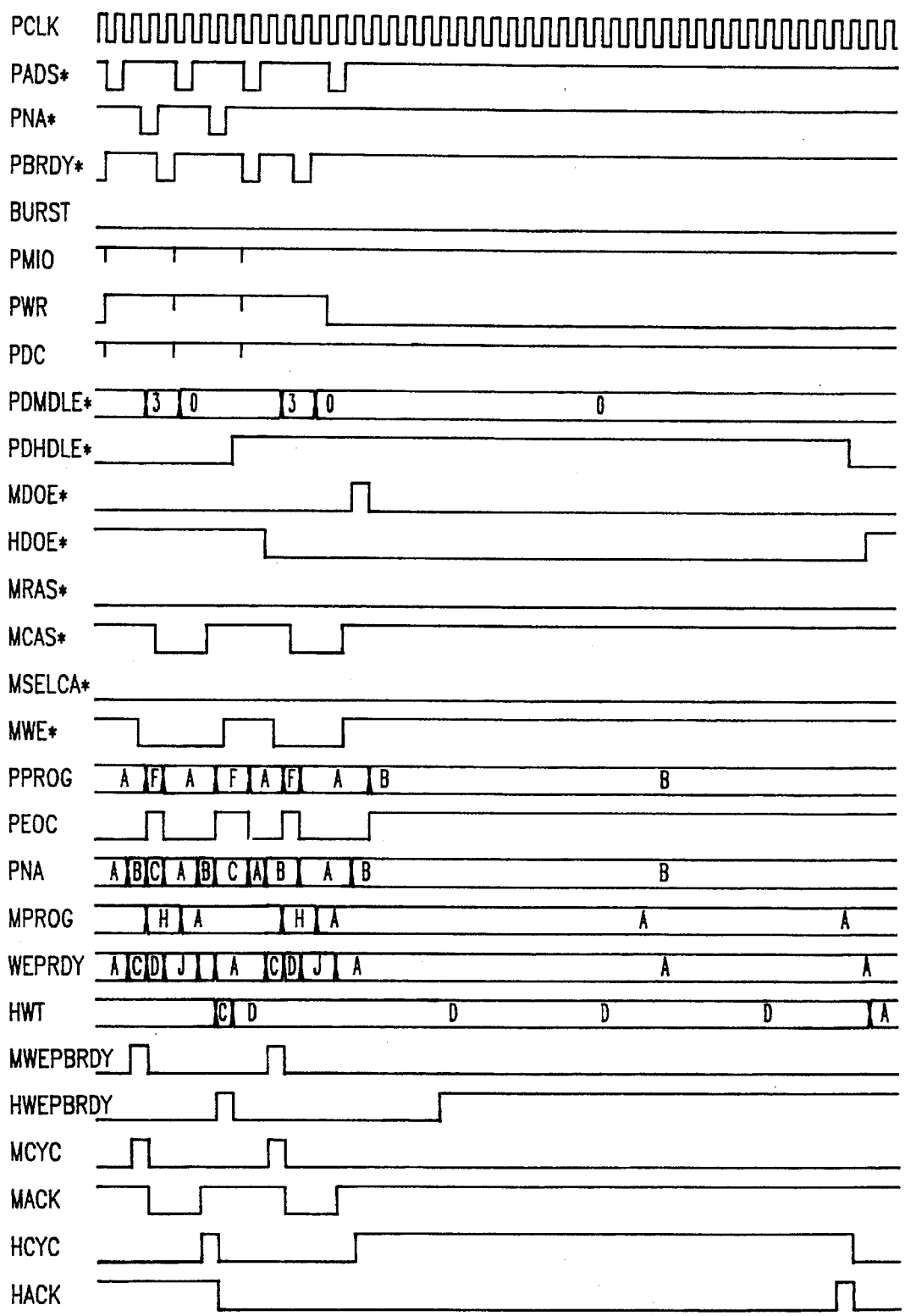
Figure 63:
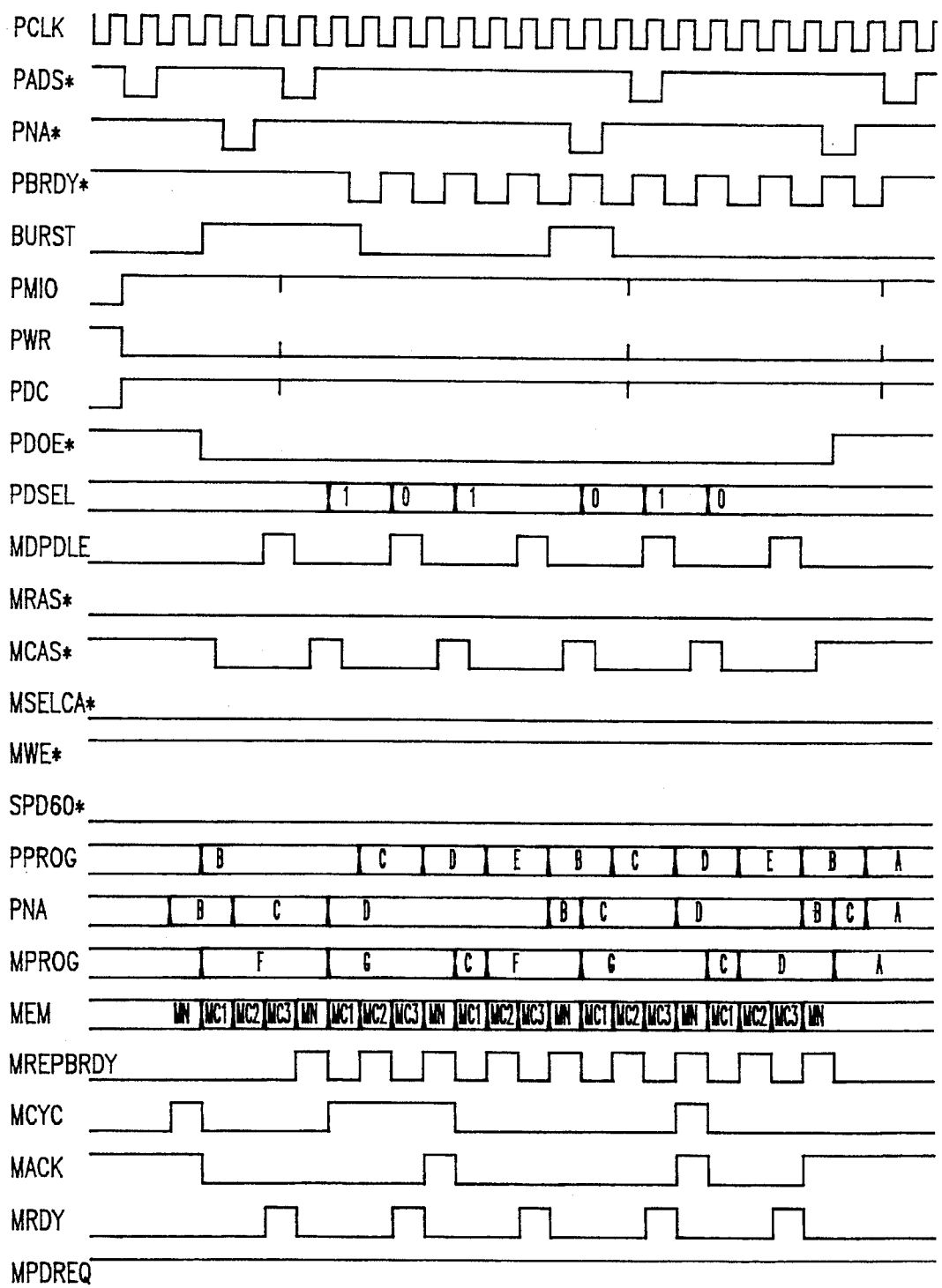
Figure 64:
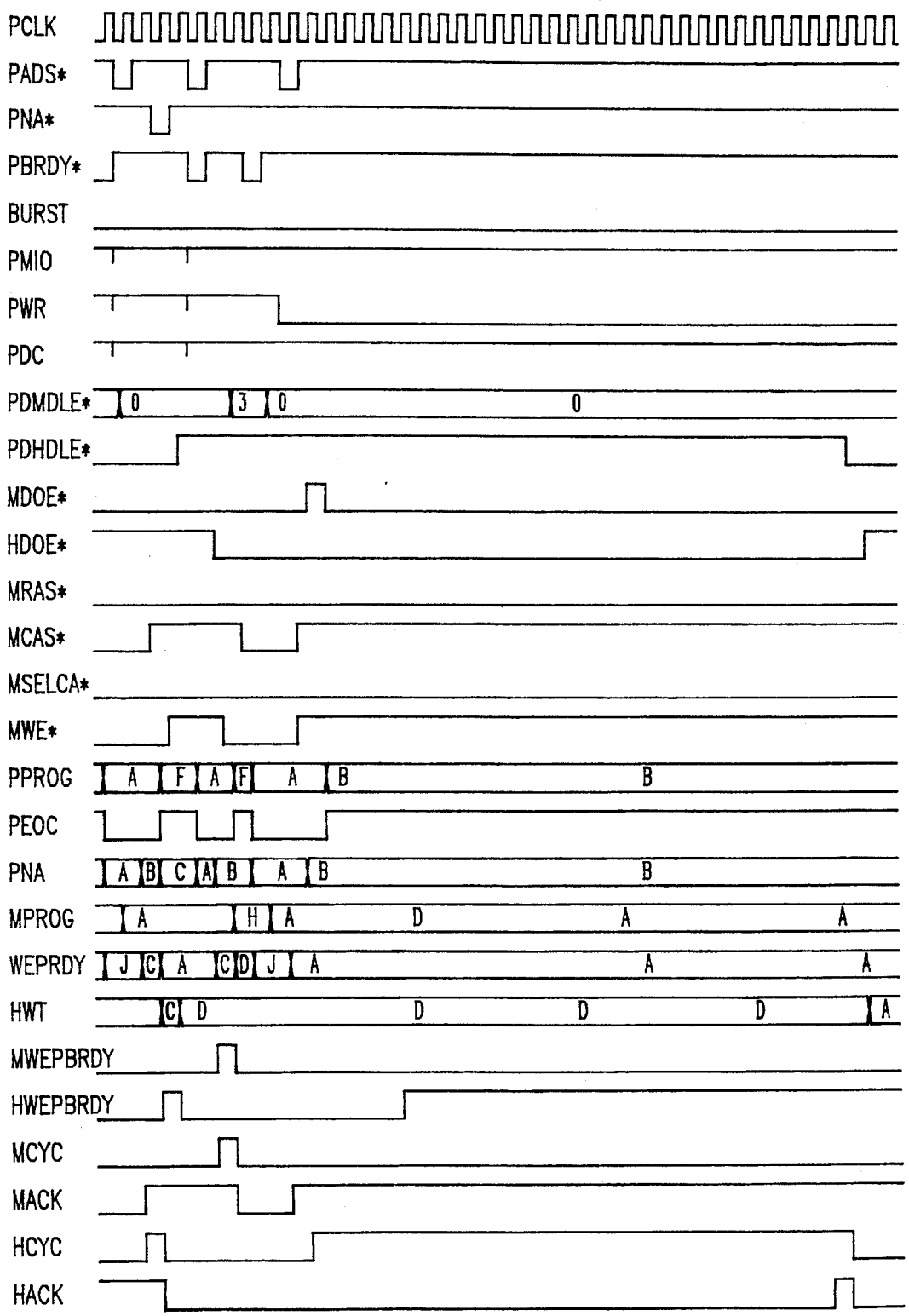
Figure 65:
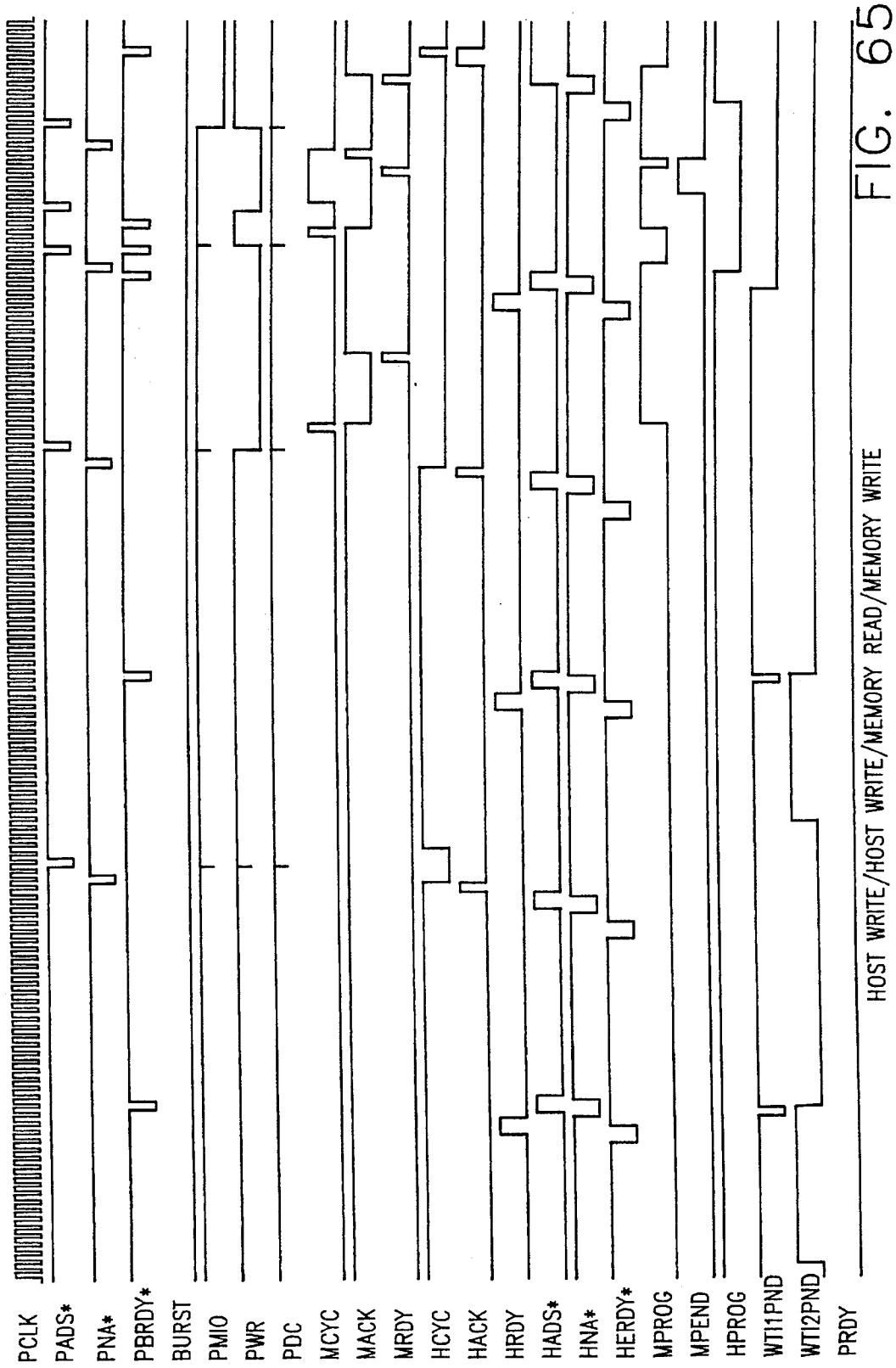
Figure 66:
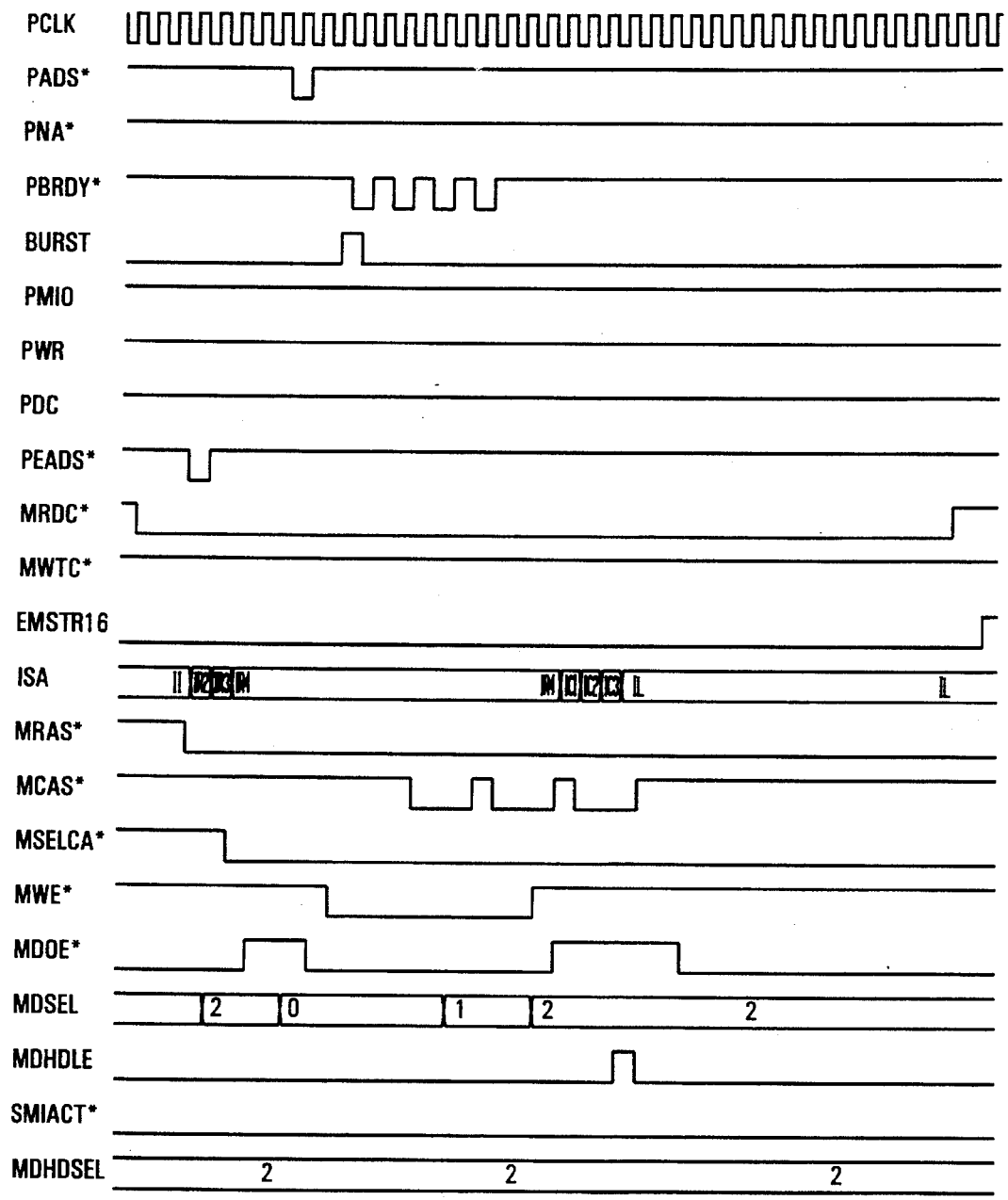
Figure 67:
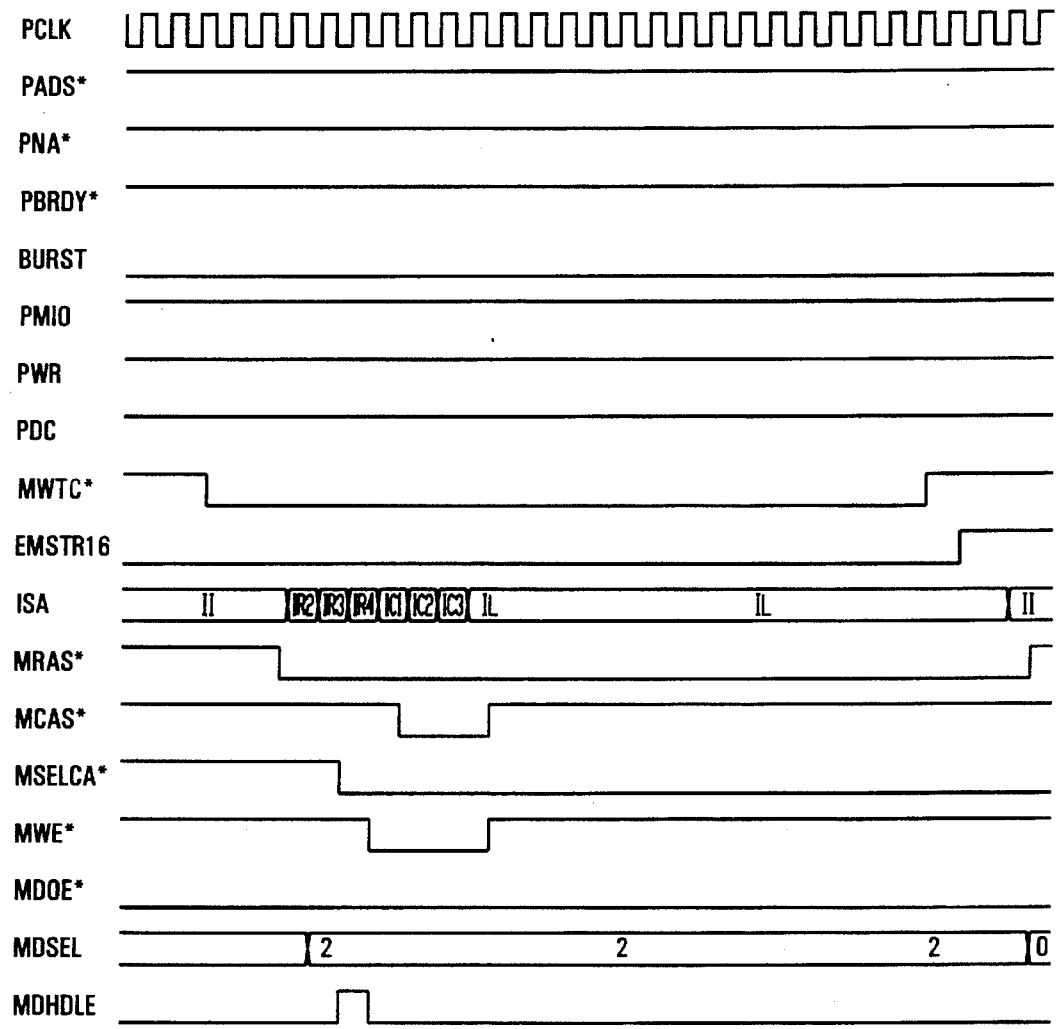
Figure 68:
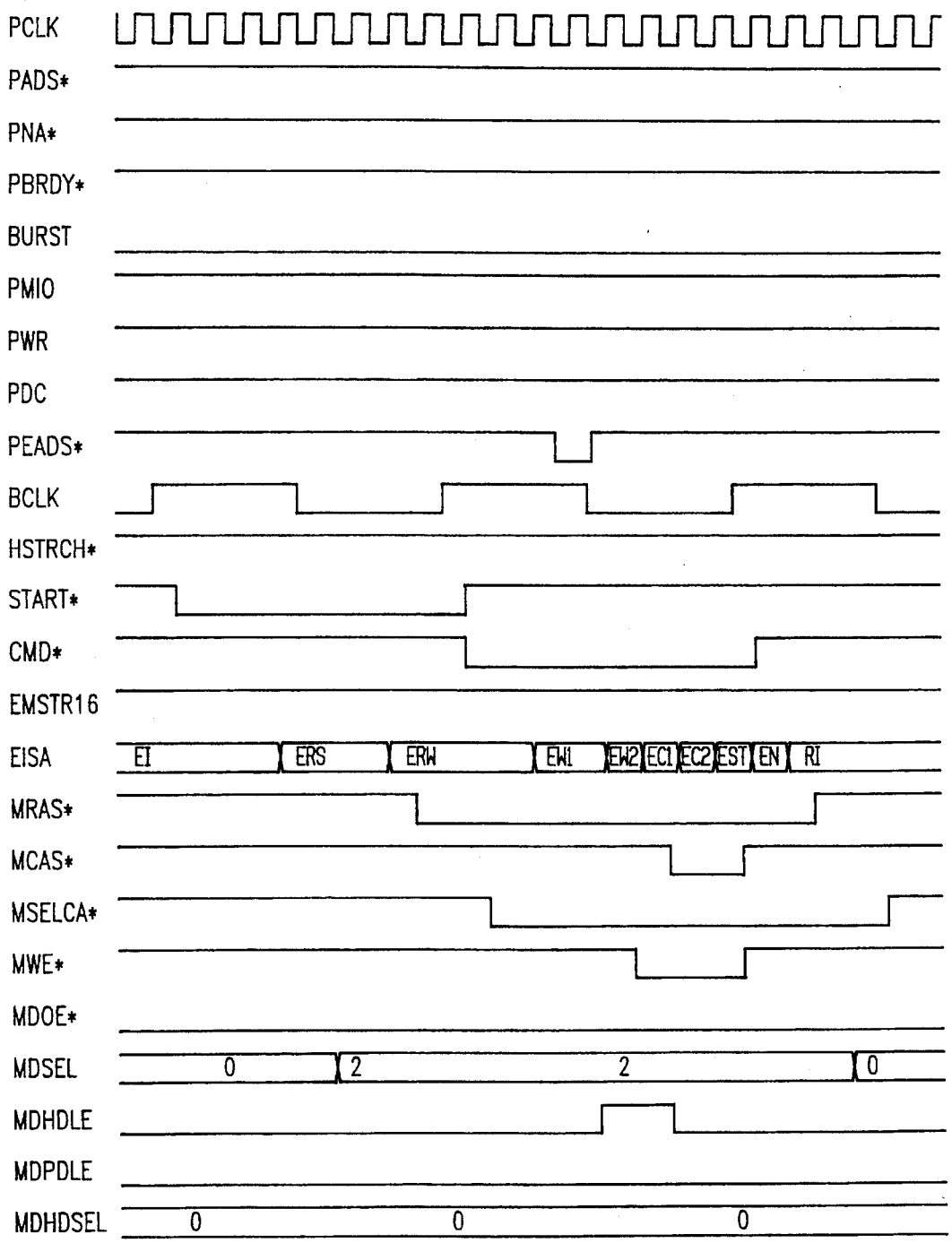
Figure 69:
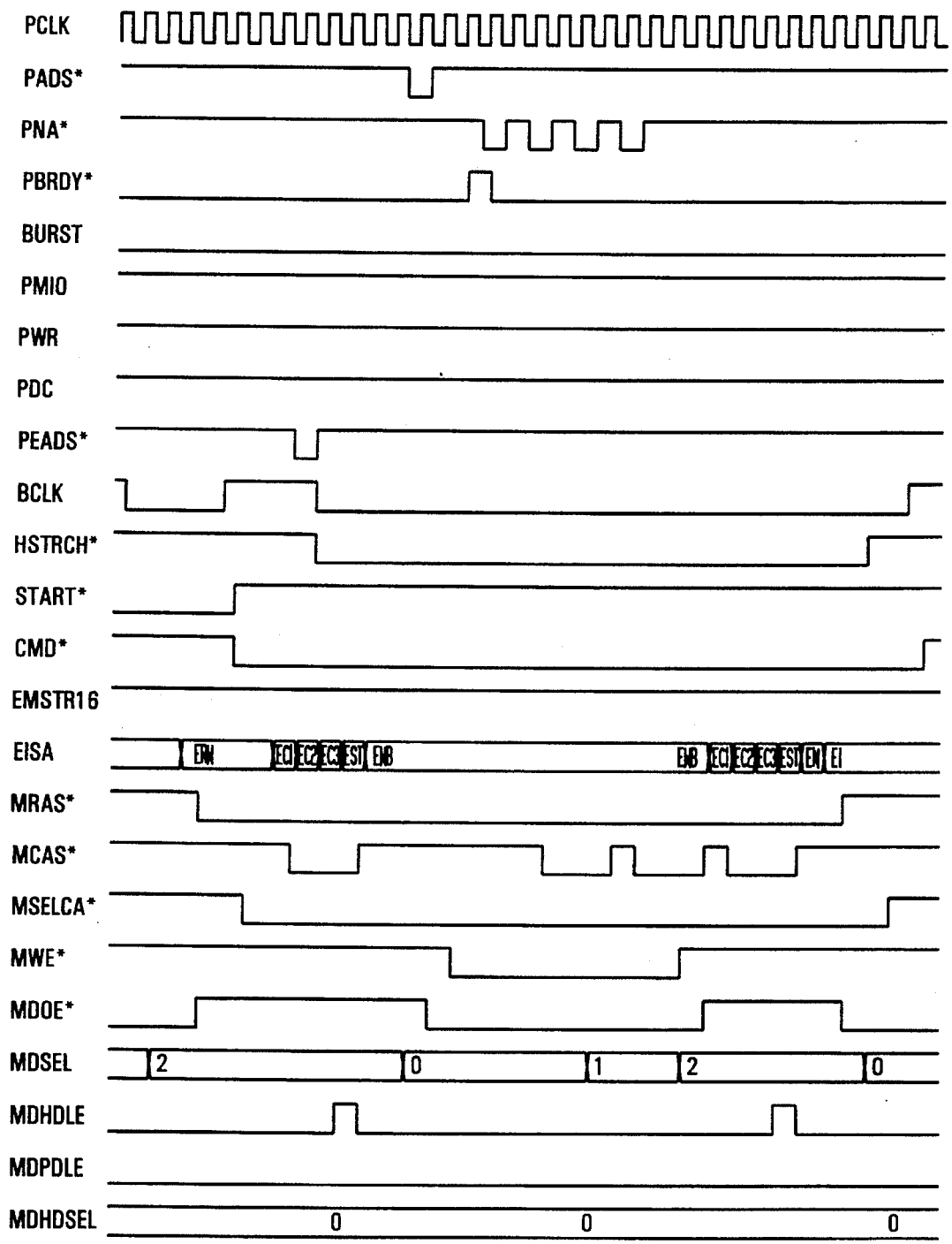

FIGS. 52 to 69 are a number of timing diagrams illustrating operation of numerous signals according to the memory controller of the present invention. In many cases the states of the various state machines are shown to allow coordination with the state machine drawings. FIG. 52 illustrates a 64 bit processor to memory page hit write to 60 ns memory. FIG. 53 illustrates a 64 bit processor page hit read from 60 ns memory. FIG. 54 illustrates a 64 bit processor to memory page miss write to 80 ns memory. FIG. 55 illustrates a 64 bit processor page miss read from 60 ns memory. FIG. 56 illustrates a 64 bit processor page miss read from 80 ns memory, for close comparison with FIG. 55. FIG. 57 illustrates a page hit cache line fill from 60 ns memory. FIG. 58 illustrates a page miss write-back to 60 ns memory. FIG. 59 illustrates a write to write protected memory. FIG. 60 illustrates a 64 bit processor pipelined read from the host bus H following a host read, while FIG. 61 illustrates a non-pipelined 64 bit processor write to the host bus H. FIG. 62 illustrates concurrent processor write cycles to the memory first and to the host bus H. FIG. 63 illustrates concurrent processor read cycles from memory. FIG. 64 illustrates concurrent processor write cycles to the host bus H first and to the memory. FIG. 65 illustrates concurrency by showing an EISA bus E write, followed by a host bus H write, followed by a memory read and pipelining of the next cycle. FIG. 66 illustrates an ISA bus master write, while FIG. 67 illustrates an ISA bus master read cycle. FIG. 68 shows an EISA bus master write cycle, while FIG. 69 illustrates an EISA bus master read hit to a modified location. As noted, these are illustrative samples of timing of the memory controller 156 and one skilled in the art could readily develop the remaining possibilities.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A memory system for a computer, the computer providing memory cycles including addresses and control signals, the computer having a processor, the memory system comprising:

a plurality of dynamic random access memory devices, each dynamic random access memory device including address inputs and control inputs, said control inputs including a row address strobe input, a column address strobe input and a write enable input;

a memory controller receiving the address and control signals from the computer for producing master row address strobe, master column address strobe and master write enable signals and a signal indicating selection of row addresses or column addresses; and means receiving the address signals from the computer and said master row address strobe, master column address strobe, master write enable and address selection signals and connected to said plurality of dynamic random access memory devices for providing address, row address strobe, column address strobe and write enable signals to said dynamic random access memory device inputs, wherein said address, row address strobe, column address strobe and write enable signals are provided to said plurality of dynamic random access memory devices from a single integrated circuit;

said means for providing address, row address strobe, column address strobe and write enable signals to said dynamic random access memory device inputs further including a plurality of flip-flops connected to said dynamic random access memory device inputs, said flip-flops clocked by a common clock signal and receiving said address, row address strobe, column address strobe and write enable signals, so that said address, row address strobe, column address strobe and write enable signals are provided to said plurality of dynamic random access memory devices synchronously by said flip-flops, and wherein said flip-flops are located on said single integrated circuit device and provide the final output of said single integrated circuit device.

2. The memory system of claim 1, wherein said means for providing address, row address strobe, column address strobe and write enable signals to said dynamic random access memory device inputs includes a multiplexor, said multiplexor receiving the address signals provided by the computer and said address selection signal and providing address signals for provision to said dynamic random access memory devices, so that the computer address signals are provided as row and column addresses to said dynamic random access memory devices, and wherein said multiplexor is located on said single integrated circuit device.

3. The memory system of claim 1, wherein said dynamic random access memory devices are organized in a plurality of banks and the memory system further comprises:

means for providing signals indicating selection of a bank of said dynamic random access memory devices, and wherein said means for providing address, row address strobe, column address strobe and write enable signals to said dynamic random access memory devices includes means for combining said bank selection signals and said master row address selection signal to provide row address selection signals qualified for each bank of said dynamic random access memory devices, and wherein said row address strobe qualifying combining means is located on said single integrated circuit device.

4. The memory system of claim 3, wherein the computer provides signals indicating the data portion units to be provided, wherein said dynamic random access memory devices are organized to provide a plurality of data portions, wherein said means for providing address, row address strobe, column address strobe and write enable signals to said dynamic random access memory devices further includes means for combining the data portion unit signals with said master column address signal to provide column address signals qualified for each data portion of said dynamic random access memory devices, and wherein said column address strobe qualifying combining means is located on said single integrated circuit device.

5. The memory system of claim 1, wherein the computer provides signals indicating the data portion units to be provided, wherein said dynamic random access memory devices are organized to provide a plurality of data portions, wherein said means for providing address, row address strobe, column address strobe and write enable signals to said dynamic random access memory devices includes means for combining the data portion unit signals with said master column address signal to provide column address signals qualified for each data portion of said dynamic random access memory devices, and wherein said column address strobe qualifying combining means is located on said single integrated circuit device.

6. The memory system of claim 1, wherein the memory cycles provided by the computer include burst cycles, wherein said memory controller further produces a signal indicating address increment during burst cycles, wherein said means for providing address, row address strobe, column address strobe and write enable signals to said dynamic random access memory devices further includes means for incrementing the value of said address signals provided to said dynamic random access memory devices when said address increment signal is provided, and wherein said address signal value incrementing means is located on said single integrated circuit device.

7. A memory system for a computer system, the computer providing memory cycles including address, control signals and signals indicating the data portion units to be provided, wherein the memory cycles provided by the computer include burst cycles, the computer having a processor, the memory system comprising:

a plurality of dynamic random access memory devices, each dynamic random access memory device including address inputs and control inputs, said control inputs including a row address strobe input, a column address strobe input and a write enable input, said dynamic random access memory devices are organized in a plurality of banks and to provide a plurality of data portions;

means for providing signals indicating selection of a bank of said dynamic random access memory devices;

a memory controller receiving the address and control signals from the computer for producing master row address strobe, master column address strobe and master write enable signals, a signal indicating selection of row addresses or column addresses and a signal indicating address increment during burst cycles; and means receiving the address signals from the computer, said master row address strobe, master column address strobe, master write enable, address selection and address increment signals from said memory controller and said bank selection signals and connected to said plurality of dynamic random access memory devices for providing address, row address strobe, column address strobe and write enable signals to said dynamic random access memory device inputs, wherein said address, row address strobe, column address strobe and write enable signals are provided to said dynamic random access memory devices from a final output of a single integrated circuit device, wherein said means for providing address, row address strobe, column address strobe and write enable signals to said dynamic random access memory device inputs includes a multiplexor, said multiplexor receiving the address signals provided by the computer and said address selection signal and providing address signals for provision to said dynamic random access memory devices, so that the computer address signals are provided as row and column addresses to said dynamic random access memory devices, a plurality of flip-flops having outputs connected to said dynamic random access memory device inputs, said flip-flops clocked by a common clock signal and receiving said address, row address strobe, column address strobe and write enable signals, so that said address, row address strobe, column address strobe and write enable signals are provided synchronously by said flip-flops; means for combining said bank selection signals and said master row address selection signal to provide row address selection signals qualified for each bank of said dynamic random access memory devices; means for combining the data portion unit signals with said master column address signal to provide column address signals qualified for each data portion of said dynamic random access memory devices; and means for incrementing the value of said address signals provided to said dynamic random access memory devices when said address increment signal is provided, and wherein said flip-flops provide said final output of said single integrated circuit device.

* * * * *